US012687555B2

(12) United States Patent
Kumagai et al.

(10) Patent No.: US 12,687,555 B2
(45) Date of Patent: Jul. 21, 2026

(54) TRANSPORT METHOD, CONTROL METHOD, AND ANALYSIS SYSTEM

(71) Applicant: Sysmex Corporation, Kobe (JP)

(72) Inventors: Atsushi Kumagai, Kobe (JP); Daigo Fukuma, Kobe (JP); Keisuke Kuwano, Kobe (JP); Toru Uemura, Kobe (JP); Koyo Hiroyama, Kobe (JP)

(73) Assignee: Sysmex Corporation, Kobe (JP)

( * ) Notice: Subject to any disclaimer, the term of this patent is extended or adjusted under 35 U.S.C. 154(b) by 567 days.

(21) Appl. No.: 18/322,778

(22) Filed: May 24, 2023

(65) Prior Publication Data

US 2023/0384336 A1 Nov. 30, 2023

(30) Foreign Application Priority Data

May 31, 2022 (JP) ................................. 2022-089011

(51) Int. Cl.
G01N 35/02 (2006.01)
G01N 35/00 (2006.01)

(52) U.S. Cl.
CPC ..... G01N 35/026 (2013.01); G01N 35/00663 (2013.01); G01N 35/00732 (2013.01);
(Continued)

(58) Field of Classification Search
CPC .......... G01N 2035/00435; G01N 2035/00445; G01N 2035/00673; G01N 2035/00752; G01N 2035/00891; G01N 2035/0401; G01N 2035/0465; G01N 35/00594; G01N 35/00603; G01N 35/00663; G01N 35/00732; G01N 35/0092; G01N 35/026; G01N 35/04; G01N 35/00; G01N 35/02
See application file for complete search history.

(56) References Cited

U.S. PATENT DOCUMENTS

2005/0037502 A1 2/2005 Miller
2013/0316461 A1* 11/2013 Fujita ................. G01N 33/5005
436/63

(Continued)

FOREIGN PATENT DOCUMENTS

EP 3751284 A1 12/2020
JP 2009-500619 A 1/2009
(Continued)

OTHER PUBLICATIONS

Extended European search report issued on Feb. 13, 2024 in a counterpart European patent application No. 23175565.3.
(Continued)

*Primary Examiner* — Jennifer Wecker
*Assistant Examiner* — Jonathan Bortoli
(74) *Attorney, Agent, or Firm* — Crowell & Moring LLP

(57) ABSTRACT

Disclosed is a transport method to be performed in an analysis system configured to transport a specimen to an analyzer configured to analyze an analyte contained in the specimen, the transport method comprising: cooling and preserving, in a cooling-and-preserving part, a quality control specimen containing an analyte having a known concentration; and controlling transport of the quality control specimen between the cooling-and-preserving part and the analyzer on the basis of a status of the analyzer.

19 Claims, 58 Drawing Sheets

(52) U.S. Cl.
   CPC .................... *G01N 35/0092* (2013.01); *G01N 2035/00673* (2013.01); *G01N 2035/00752* (2013.01); *G01N 2035/00891* (2013.01)

(56) References Cited

U.S. PATENT DOCUMENTS

| | | | |
|---|---|---|---|
| 2015/0192598 A1* | 7/2015 | Yasuzawa | G01N 35/1081 |
| | | | 422/67 |
| 2018/0209999 A1* | 7/2018 | Han | G01N 35/00613 |

FOREIGN PATENT DOCUMENTS

| | | |
|---|---|---|
| JP | 2010-121936 A | 6/2010 |
| JP | 2014-048215 A | 3/2014 |
| JP | 2015-057617 A | 3/2015 |
| JP | 2015-135282 A | 7/2015 |
| JP | 2019-521359 A | 7/2019 |
| JP | 2019-525116 A | 9/2019 |
| JP | 2020-94843 A | 6/2020 |
| WO | WO 2011/093442 | 8/2011 |

OTHER PUBLICATIONS

Partial European search report issued on Oct. 12, 2023 in a counterpart European patent application No. 23175565.3.

Japanese Language Office Action issued in Japanese Application No. 2022-089011, dated Feb. 10, 2026, with English translation (13 pages).

Submission of Publications issued in Japanese Patent Application No. 2022-089011, dated Sep. 4, 2025 (with English Translation) (81 pages).

Notice of Submission of Publications issued in Japanese Application No. 2022-089011, dated Sep. 9, 2025 (with English Translation) (2 pages).

* cited by examiner

REAR

LEFT ←——→ RIGHT

FRONT

REAR

LEFT ←→ RIGHT

FRONT 1005     1000

1000A

1001

Device
state

Unit
operation

Schedule

Setting

1000B

Operation
history

Error
history

Service

| Pos | Level | Lot | Test | Exp. Date |
|---|---|---|---|---|
| 1 | Level 1 | A01XXXX | 3 | 2021/3/30 |
| 2 | Level 1 | A01XXXX | 24 | 2021/3/30 |
| 3 | Level 2 | B01XXXX | 0 | 2021/4/5 |
| 4 | Level 2 | A002XXX | 7 | 2021/6/30 |
| 5 | Level 2 | A002XXX | 24 | 2021/10/1 |
| 6 | Level 2 | B002XXX | 24 | 2021/10/1 |
| 7 | Level 2 | C001XXX | 24 | 2021/5/1 |
| 8 | Level 3 | D001XXX | 5 | 2021/4/1 |
| 9 | - | | | |

FIG. 46A
FIG. 46B
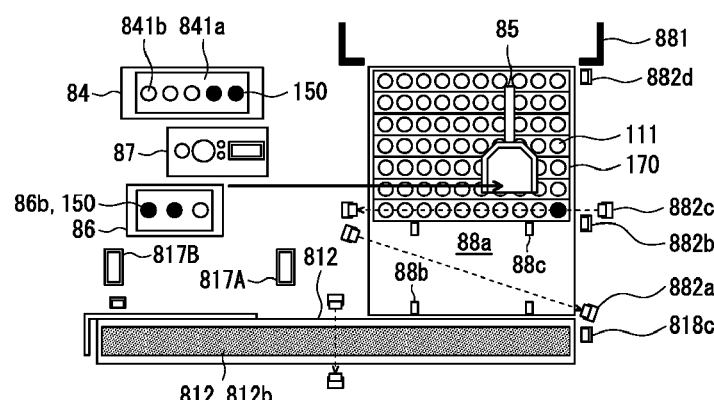
FIG. 46C
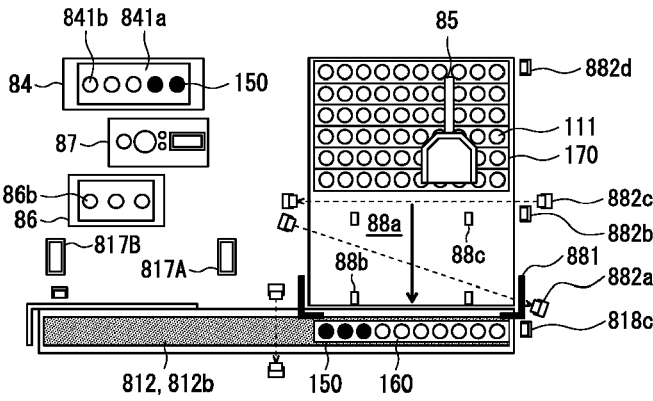

CASE A

AUTO-QC CONDITION
· LEVELS: LEVEL 1 AND LEVEL 2
· TARGET UNITS: XN1, XN2, XN3, AND XN4
· QC OVER MULTIPLE BLOCKS: POSSIBLE

CASE B

AUTO-QC CONDITION
· LEVELS: LEVEL 2 AND LEVEL 3
· TARGET UNITS: XN1, XN2, XN3, AND XN4
· QC OVER MULTIPLE BLOCKS: POSSIBLE

CASE C

AUTO-QC CONDITION
· LEVELS: LEVEL 1, LEVEL 2, AND LEVEL 3
· TARGET UNITS: XN1, XN2, XN3, AND XN4
· QC OVER MULTIPLE BLOCKS: POSSIBLE

CASE D

AUTO-QC CONDITION
· LEVELS: LEVEL 1 AND LEVEL 2
· TARGET UNITS: XN1, XN2, XN3, AND XN4
· QC OVER MULTIPLE BLOCKS: IMPOSSIBLE

CASE E

AUTO-QC CONDITION
· LEVELS: LEVEL 1 AND LEVEL 2
· TARGET UNITS: XN1, XN2, XN3, AND XN4
· QC OVER MULTIPLE BLOCKS: POSSIBLE
· RETEST SETTING: ENABLED (EACH UNIT × 2)

CASE F

| Pos | Level | Lot | Test | Exp. Date |
|-----|-------|-----|------|-----------|
| 1 | Level 1 | P001 | 12 | 2021/3/30 |
| 2 | Level 1 | P002 | 24 | 2021/3/30 |
| 3 | Level 1 | P002 | 24 | 2021/4/5 |
| 4 | Level 2 | Q001 | 12 | 2021/6/30 |
| 5 | Level 2 | Q002 | 24 | 2021/10/1 |
| 6 | Level 2 | Q002 | 24 | 2021/10/1 |
| 7 | | | | |
| 8 | | | | |
| 9 | | | | |

AUTO-QC CONDITION
- LEVELS: LEVEL 1 AND LEVEL 2
- TARGET UNITS: XN1, XN2, XN3, AND XN4
- QC OVER MULTIPLE BLOCKS: POSSIBLE
- INTER-LOT DIFFERENCE CHECKING FUNCTION: ON

TRANSPORT METHOD, CONTROL METHOD, AND ANALYSIS SYSTEM

RELATED APPLICATIONS

This application claims priority from prior Japanese Patent Application No. 2022-089011, filed on May 31, 2022, the entire content of which is incorporated herein by reference.

BACKGROUND OF THE INVENTION

1. Field of the Invention

The present invention relates to a transport method to be performed in a specimen analysis system, and in particular, to a transport method for a quality control specimen containing an analyte having a known concentration.

2. Description of the Related Art

Conventionally, a specimen analysis system including an analyzer for analyzing a specimen containing cells derived from an organism such as blood cells has been widely known. In such a system, it is necessary to periodically perform measurement quality control through confirmation that there is no abnormality in a measurement result from the analyzer, by using a quality control substance containing an analyte having a known concentration.

Japanese Laid-Open Patent Publication No. 2010-121936 discloses a specimen processing system including a cooling chamber in which quality control specimens are stored. In the system of Japanese Laid-Open Patent Publication No. 2010-121936, one specimen with the earliest expiration date among the quality control specimens stored in the cooling chamber is selected, the selected specimen is automatically transported to an analyzer, and quality control measurement is performed.

A quality control specimen might degrade depending on the period during which the quality control specimen is left outside of a temperature-controlled environment (for example, a cooling chamber). Japanese Laid-Open Patent Publication No. 2010-121936 discloses a system for automatically transporting a quality control specimen stored in the cooling chamber to the analyzer. In the system for automatically transporting such a quality control specimen to the analyzer, the period during which the quality control specimen is left outside of the temperature-controlled environment is elongated depending on the status of the analyzer, and this elongation might lead to degradation of the quality control specimen.

SUMMARY OF THE INVENTION

The scope of the present invention is defined solely by the appended claims, and is not affected to any degree by the statements within this summary.

A transport method of the present invention is a transport method to be performed in an analysis system configured to transport a specimen to an analyzer configured to analyze an analyte contained in the specimen, the transport method including: cooling and preserving, in a cooling-and-preserving part, a quality control specimen containing an analyte having a known concentration; and controlling transport of the quality control specimen between the cooling-and-preserving part and the analyzer on the basis of a status of the analyzer.

BRIEF DESCRIPTION OF THE DRAWINGS

FIG. 34 shows an example of a database related to QC specimens and stored in a control part of the supply unit;

FIGS. 46A, 46B, and 46C show operations of the supply unit during automatic QC;

DETAILED DESCRIPTION OF THE PREFERRED EMBODIMENTS

Hereinafter, a transport method and an analysis system according to each of exemplary embodiments of the present disclosure will be described in detail with reference to the drawings. The embodiments described below are merely examples, and the present disclosure is not limited to the following embodiments. In addition, selective combinations of constituents in a plurality of embodiments and modifications described below are included in the scope of the present disclosure.

Figure 1:
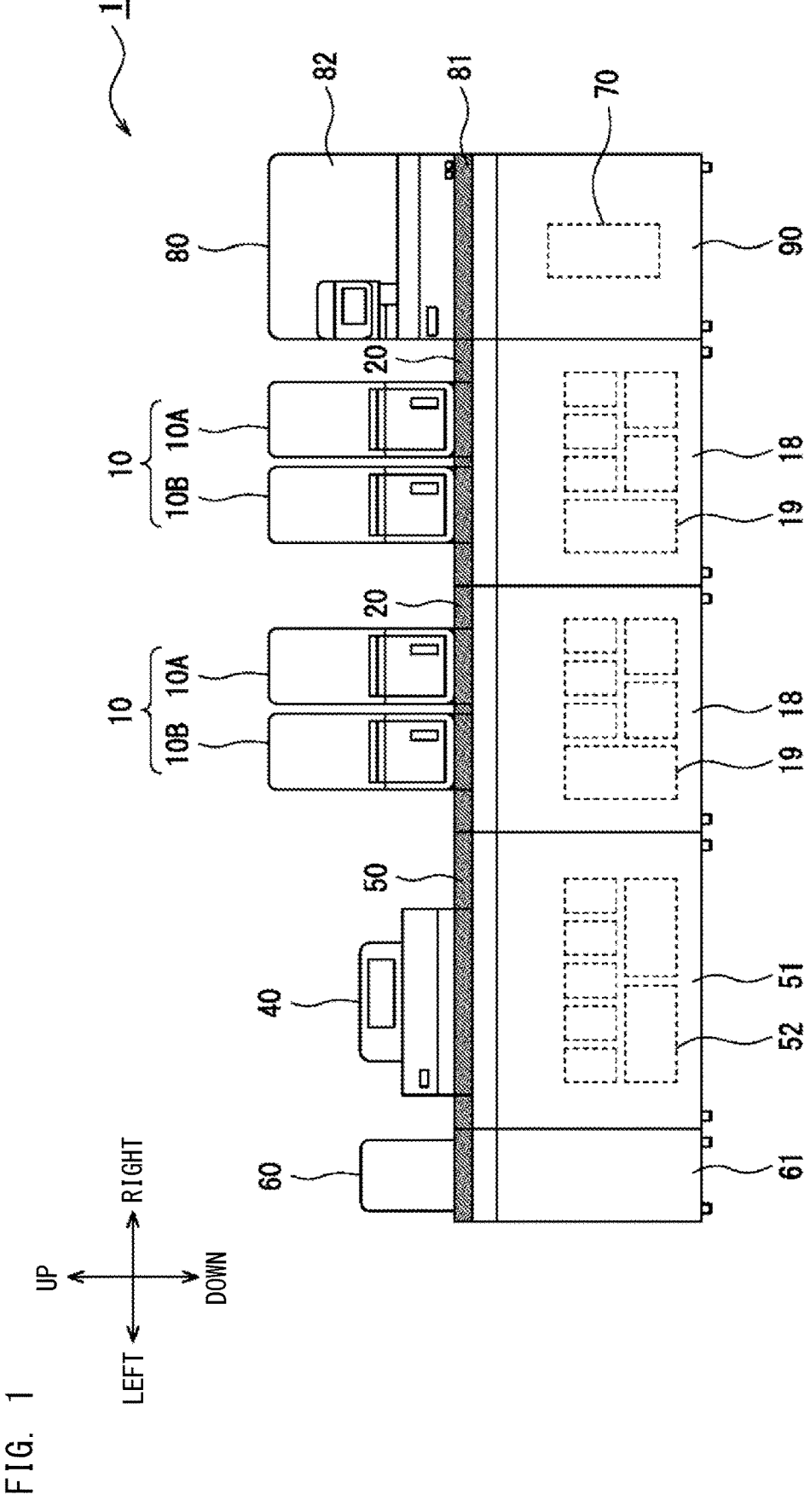
FIG. 1 schematically shows a specimen analysis system.
Figure 2:
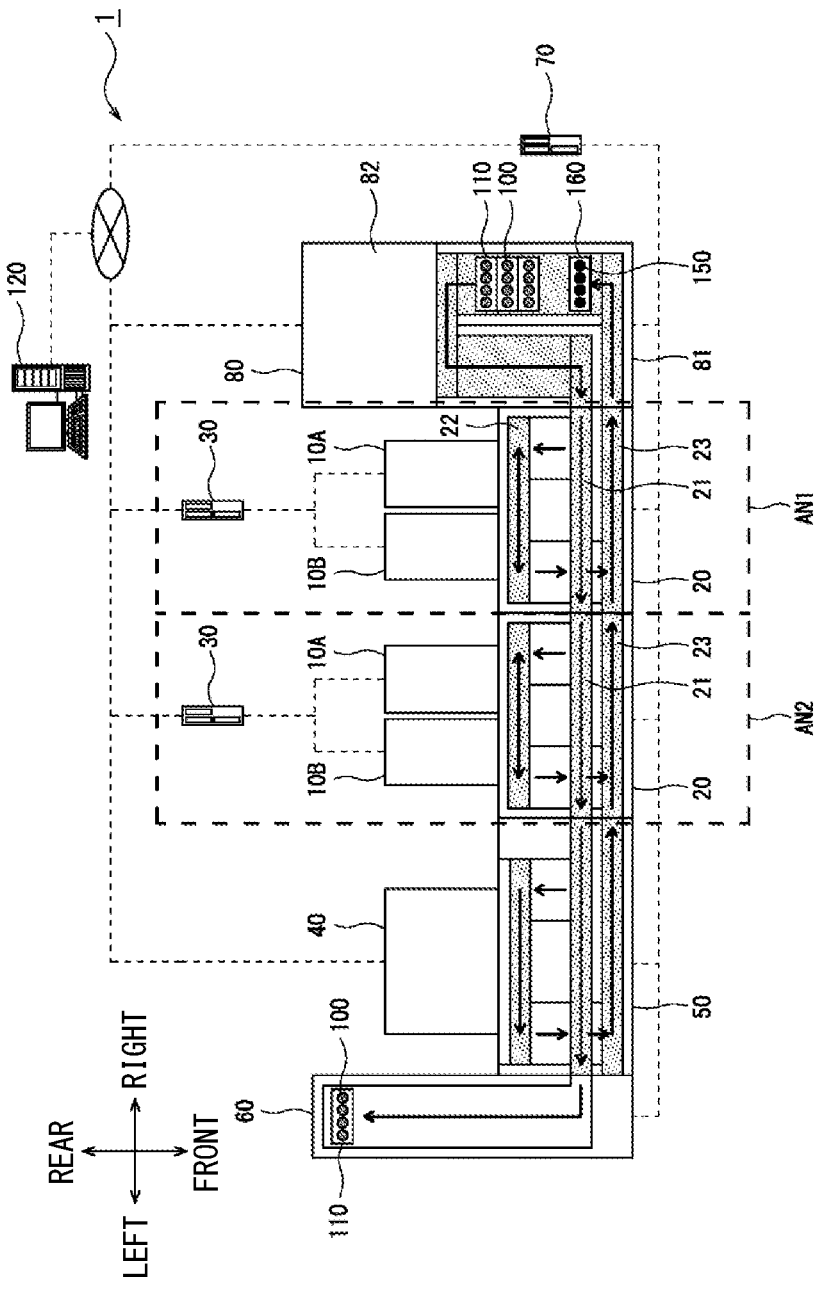
FIG. 2 schematically shows the specimen analysis system.

FIG. 1 and FIG. 2 each schematically show an overall configuration of a specimen analysis system 1 according to an exemplary embodiment. A transport controller 70, a supply unit 80, and each of control units 30 of the specimen analysis system 1 can control, on the basis of a status of a corresponding analyzer for analyzing an analyte contained in a specimen, a quality control specimen between the analyzer and the supply unit 80 including a cooling-and-preserving part 84 for cooling and preserving each of QC specimens. For example, the transport controller 70 can selectively execute, on the basis of the status of the analyzer, either of (1) first transport control regarding measurement of the quality control specimen by the analyzer and (2) second transport control regarding shortening of a time during which the quality control specimen is left in an indoor environment. Since the period during which a quality control specimen is left outside of a temperature-controlled environment (for example, in the indoor environment) can be controlled, degradation of the quality control specimen can be suppressed.

As shown in FIG. 1 and FIG. 2, the specimen analysis system 1 includes two analyzers AN1 and AN2. Each of the analyzers AN1 and AN2 includes a first measurement unit 10A, a second measurement unit 10B, a transport unit 20, and a control unit 30. In each of the analyzers, the first measurement unit 10A and the second measurement unit 10B are each a device for measuring a specimen containing cells derived from an organism and are disposed to be adjacent to each other. Hereinafter, the two measurement units that compose the analyzer are collectively referred to as a "measurement block". The transport unit 20 is disposed frontward of the measurement block 10. In the present specification, terms indicating directions such as a front-rear direction, a left-right direction, and an up-'down direction shown in the drawings are used for convenience of description.

The specimen analysis system 1 includes the two analyzers AN1 and AN2. Each of the analyzers AN1 and AN2 includes the measurement block 10, the transport unit 20, and the control unit 30. The two analyzers are disposed to be adjacent to each other in the left-right direction. In each of the analyzers AN1 and AN2, one control unit 30 is provided with respect to two measurement units. The first measurement unit 10A and the second measurement unit 10B are each configured as a device for counting blood cells in a blood specimen and have hardware configurations identical to each other. As the blood specimen, whole blood is used.

The specimen analysis system 1 includes, on an upstream side relative to the two analyzers AN1 and AN2, the supply unit 80 in which specimen racks 110 are set. Each of the specimen racks 110 stores thereon a plurality of specimen containers 100. Each of the specimen containers 100 is a container accommodating a blood specimen for blood cell measurement, i.e., whole blood. The supply unit 80 is disposed to be adjacent to one of the two analyzers that is disposed on the upstream side, i.e., the analyzer AN1. The supply unit 80 includes a conveyor part 81 for transporting the specimen rack 110 to the analyzer AN1. In the present embodiment, a user sets the specimen rack 110 in the conveyor part 81.

The conveyor part 81 is connected to the transport unit 20 of the analyzer AN1 and configured to be able to relay the set specimen rack 110 to the transport unit 20. As described in detail later, in the supply unit 80, QC specimen containers 150 each accommodating a quality control substance containing cells having a known concentration are set in addition to the specimen containers 100. The supply unit 80 includes a preservation adjustment unit 82 in which each of the QC specimen containers 150 is cooled and preserved; and the temperature of the quality control substance is adjusted to a measurement temperature, and then the QC specimen container 150 is sent to the conveyor part 81. The preservation adjustment unit 82 includes: a control part 82a which controls operation of the supply unit 80; and a monitor 91 which displays information about the supply unit 80, e.g., the number of the QC specimen containers 150 in stock and schedule items for automatic QC, and which receives operation from a user. The monitor 91 is connected to the control part 82a and controlled in terms of display by the control part 82a. Each of the QC specimen containers 150 accommodates a quality control substance in an amount that allows the quality control substance to be used for a plurality of times of measurement. For example, one QC specimen container 150 accommodates a quality control substance in an amount that allows the quality control substance to be measured 24 times by any of the measurement units. Hereinafter, an amount corresponding to one time of measurement is also referred to as "1 test".

The upstream side of the specimen analysis system 1 means a side on which a specimen rack 110 is set and starts to be transported, i.e., a side on which the supply unit 80 is disposed. Meanwhile, a downstream side of the specimen analysis system 1 means a side on which transport of the specimen rack 110 is ended. In FIG. 1 and FIG. 2, the right side of each drawing sheet is the upstream side of the specimen analysis system 1, and the left side of the drawing sheet is the downstream side of the specimen analysis system 1. The specimen rack 110 set in the supply unit 80 is sent to the transport unit 20 and relayed to any of the measurement units through a function of the transport unit 20.

The transport unit 20 includes a plurality of rack transport paths through which specimen containers 100 can be supplied so as to be sorted to the first measurement unit 10A and the second measurement unit 10B. The transport unit 20 includes: a first transport path 21 which receives a specimen rack 110 from the upstream side (right side) of the specimen analysis system 1 and through which the specimen rack 110 is transported to the downstream side (left side) of the specimen analysis system 1; and a second transport path 22 extending to be parallel to the first transport path 21 and disposed on the measurement block side relative to the first transport path 21. Through the second transport path 22, the specimen rack 110 is transported in the left-right direction. On the second transport path 22, there are take-out positions P2 (see FIG. 10 or the like described later) at each of which a specimen container 100 is taken out from the specimen rack 110 and taken into the corresponding measurement unit.

The transport unit 20 further includes a third transport path 23. The third transport path 23 extends to be parallel to the first transport path 21 and is disposed on the front side of the specimen analysis system 1 relative to the first transport path 21. That is, in the transport unit 20, the three rack transport paths arranged in the front-rear direction are provided in the order of the third transport path 23, the first transport path 21, and the second transport path 22 from the front side. As described in detail later, the third transport path 23 is configured to transport a rack from the downstream side to the upstream side of the specimen analysis system 1. Therefore, as for the third transport path 23 alone, the left side thereof is the upstream side of the transport path, and the right side thereof is the downstream side of the transport path.

The specimen analysis system 1 further includes a processing unit 40, a transport unit 50, and a collection unit 60. The processing unit 40 is a device for making a smear preparation of a blood specimen. The collection unit 60 is a device for collecting a specimen container 100 (specimen rack 110) having been used. The processing unit 40 is disposed to be adjacent to one of the two analyzers that is disposed on the downstream side, i.e., the analyzer AN2. The collection unit 60 is disposed on the downstream side of the specimen analysis system 1 relative to the processing unit 40 so as to be adjacent to the processing unit 40.

The transport unit 50 includes a rack transport path through which a specimen rack 110 is transported to the processing unit 40, and is disposed frontward of the processing unit 40. The transport unit 50 is connected to the transport unit 20 of the analyzer AN2 and the collection unit 60. If the specimen rack 110 does not include any specimen container 100 for which a smear preparation is required to be made, this specimen rack 110 passes by the processing unit 40 and is transported through the transport unit 50 to the collection unit 60.

In the specimen analysis system 1, as units for transporting specimens, the supply unit 80, the transport units 20 corresponding to the analyzers AN1 and AN2 on the upstream side and the downstream side, the transport unit 50 disposed frontward of the processing unit 40, and the collection unit 60 are disposed in order from the upstream side, and adjacent ones of the units are connected to each other. In the specimen analysis system 1, continuous rack transport paths through which specimen racks 110 can be transported in the left-right direction from the supply unit 80 to the collection unit 60 are formed. In the example shown in FIG. 1 and FIG. 2, adjacent ones of the units are directly connected to each other. However, another transport path, another unit, or the like may be interposed between these units.

In the specimen analysis system 1, each of the measurement blocks and the corresponding transport unit 20 are placed on a wagon 18. The wagon 18 stores therein a reagent container 19 accommodating a reagent to be used by the measurement units. Likewise, wagons 51, 61, and 90 are provided to the processing unit 40 and the transport unit 50, the collection unit 60, and the supply unit 80. The wagons 18, 51, 61, and 90 preferably have the same height or preferably can be adjusted to have the same height such that the rack transport paths extend along a horizontal plane. The wagon 51 on which the processing unit and the transport unit 50 are placed also stores therein a reagent container 52 accommodating a reagent such as a staining liquid.

The specimen analysis system 1 further includes the transport controller for managing transport of specimen racks 110 and QC specimen racks 160. The transport controller 70 is stored in the wagon 90 below the supply unit 80. The transport controller 70 transmits signals to and receives signals from the transport units 20 and 50, the collection unit 60, and the supply unit 80, to control rack transport on the rack transport paths of each unit. In the specimen analysis system 1, each unit and the transport controller 70 are communicably connected to a host computer 120 via a communication network. A control part 71 of the transport controller 70 is connected to a monitor 92 and can cause the monitor 92 to display, for example, the situation of transport of a QC specimen.

The specimen analysis system 1 is installed in, for example, a laboratory of a hospital. In this case, an example of the host computer 120 is a laboratory information system (LIS) that is connected to a plurality of test instruments and that manages specimen information and measurement orders in a centralized manner. In the host computer 120, information about each of specimen containers 100 and information about each of QC specimen containers 150 are registered.

In the present specification, a rack storing thereon no container is referred to as an empty rack 170 (see FIG. 13 or the like described later). A rack resulting from storing a specimen container 100 in the empty rack 170 is referred to as a specimen rack 110. A rack resulting from storing a QC specimen container 150 in the empty rack 170 is referred to as a QC specimen rack 160.

In the specimen analysis system 1, a specimen rack 110 set in the supply unit 80 is transported to the first transport path 21 of the adjacent transport unit 20. If the transport destination is not the analyzer AN1 on the upstream side, the specimen rack 110 carried onto the first transport path 21 is transported through the first transport path 21 to the transport unit 20 of the analyzer AN2 on the downstream side. Meanwhile, if the transport destination is the analyzer AN1 on the upstream side, the specimen rack 110 is transported from the first transport path 21 to the second transport path 22 of the analyzer AN1, and a first test and, as necessary, a retest are performed by the measurement block of the analyzer AN1. The corresponding control unit 30 is configured to transmit results of the first test and the retest to the host computer 120.

When first tests and necessary retests are ended for all specimen containers 100 stored in the specimen rack 110, the transport controller 70 inquires, for each of the specimen containers 100, of the host computer 120 about whether or not a smear preparation needs to be made by the processing unit 40. If the specimen rack 110 includes a specimen container 100 for which a smear preparation needs to be made, the transport destination of this specimen rack 110 is set to be the processing unit 40, and this specimen rack 110 is supplied to the processing unit 40 via the transport paths of the transport units 20 and 50.

If the specimen rack 110 does not include any specimen container 100 for which a smear preparation needs to be made, the transport destination of the specimen rack 110 is set to be the collection unit 60, and the specimen rack 110 is transported to the collection unit 60 via the transport paths of the transport units 20 and 50. In the case of making a smear preparation by the processing unit 40 as well, the specimen rack 110 is transported to the collection unit 60 after the smear preparation is made.

Figure 3:
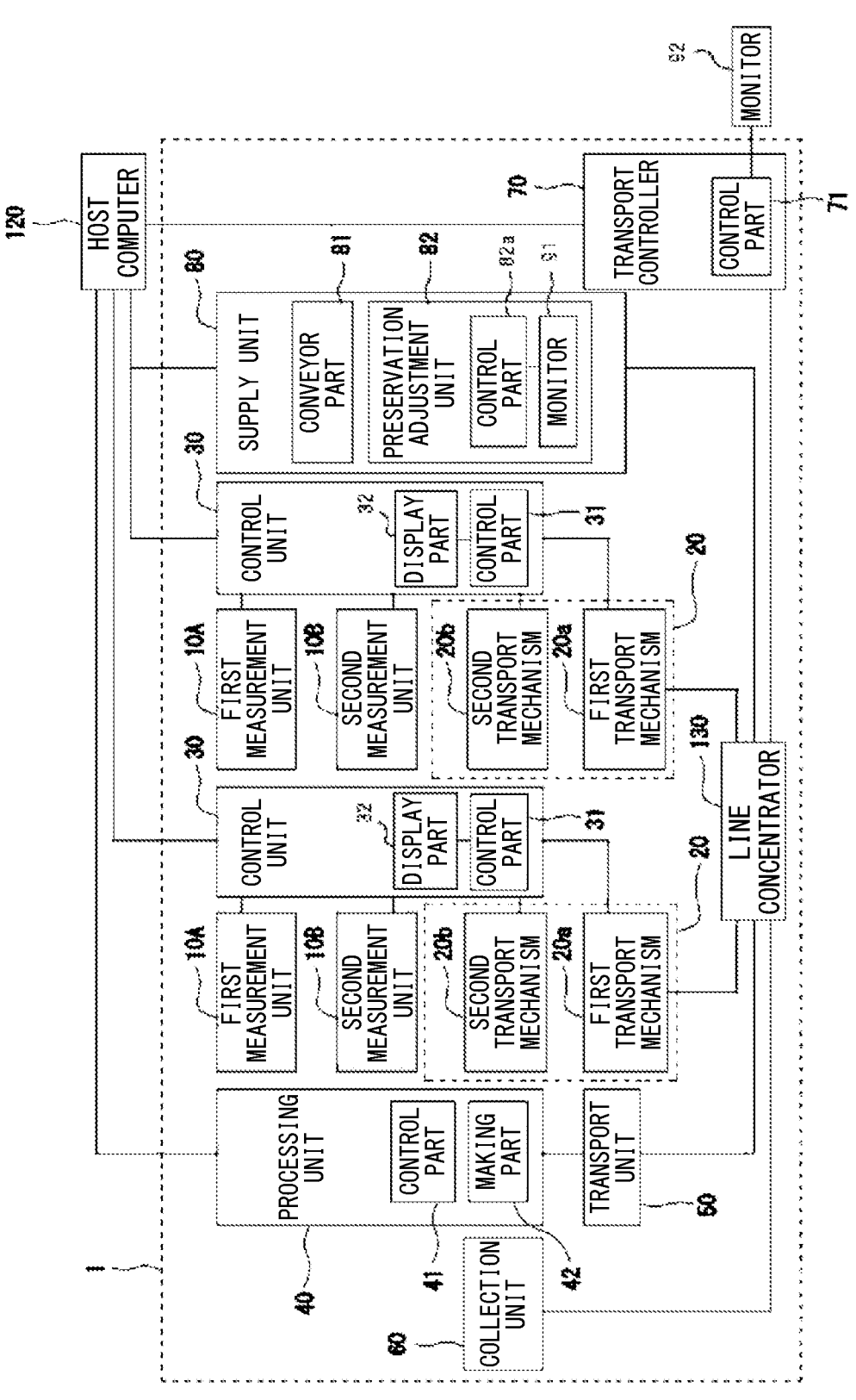
FIG. 3 is a block diagram showing the relationship in mutual connection between units composing the specimen analysis system.

FIG. 3 is a block diagram showing the relationship in connection between the units composing the specimen analysis system 1. As shown in FIG. 1 to FIG. 3, each of the control units 30 is communicably connected to the measurement units in the same corresponding analyzer and controls the measurement units in the same analyzer. The control unit 30 controls the first measurement unit 10A and the second measurement unit 10B and controls a portion of the corresponding transport unit 20, for example. The control unit 30 is configured to receive measurement data of a specimen from each of the first measurement unit 10A and the second measurement unit 10B and generate a measurement result of the specimen according to a measurement item.

The transport unit 20 includes: a first transport mechanism 20a, a transport operation of which is controlled by the transport controller 70; and a second transport mechanism 20b, a transport operation of which is controlled by the control unit 30. The first transport mechanism 20a includes a portion related to rack transport performed through the first transport path 21 and the third transport path 23. The second transport mechanism 20b includes a portion related to rack transport performed through the second transport path 22, a first storing part 24, and a second storing part 25 (see FIG. 10). The control unit 30 is communicably connected to the first measurement unit 10A, the second measurement unit 10B, the first transport mechanism 20a, and the second transport mechanism 20b.

The control unit 30 is, for example, a personal computer. The control unit 30 includes a control part 31. The control part 31 includes, as main constituents, a processor, a storage, and an input/output interface. The processor is implemented by, for example, a CPU, and reads out and executes a control program installed in the storage, thereby controlling an operation of each part of the measurement units and the transport unit. The processor further executes an analysis program installed in the storage, thereby analyzing measurement data transmitted from each of the measurement units. Consequently, the processor counts or quantifies a component in blood contained in the specimen, such as red blood cells, white blood cells, platelets, or hemoglobin. The storage includes: a nonvolatile memory such as an ROM, an HDD, or an SSD; and a volatile memory such as an RAM. The control unit 30 is connected to the measurement units and the transport unit via LAN cables. The control unit 30 is further provided with a display part 32. The display part 32 is connected to the control part 31 and can display, for example, an analysis result of a specimen and an analysis result of a QC specimen which are obtained through analysis of the measurement data by the control part 31.

The plurality of units composing the specimen analysis system 1 are communicably connected via a line concentrator 130. The line concentrator 130 is implemented by, for example, a hub. In the present embodiment, the first transport mechanisms 20a of the two analyzers, the transport unit 50, the collection unit 60, the transport controller 70, and the supply unit 80 are communicably connected via the line concentrator 130. In addition, as described above, each unit and the transport controller 70 are communicably connected to the host computer 120. The control unit 30 (control part 31), for example, inquires of the host computer 120 about a measurement order to obtain the measurement order, and controls the measurement units on the basis of the obtained measurement order.

The processing unit 40 includes a control part 41 and a making part 42. The control part 41 includes, for example, a processor and a storage incorporated in the processing unit 40 and controls the making part 42 on the basis of a control program installed in the storage. The making part 42 is configured to, when a specimen container 100 for which a smear preparation is to be made is transported to a predetermined position on the rack transport path of the transport unit 50, suction a specimen from the specimen container 100 and make a smear preparation. The operation of the making part 42 is controlled by the control part 41. The collection unit 60 collects a specimen rack 110 for which measurement has been completed by either of the two analyzers; and a specimen rack 110 that has passed through the processing unit 40 and for which making of a smear preparation has been completed. The collection unit 60 includes a rack transport path and is controlled by the transport controller 70.

The transport controller 70 is, for example, a personal computer. The transport controller 70 includes the control part 71. A hardware configuration of the control part 71 is the same as that of the control part 31 of each of the control units 30. The control part 71 communicates with the supply unit 80, the first transport mechanisms 20a, the transport unit 50, and the collection unit 60 via the line concentrator 130 and controls transport of specimen racks 110 and QC specimen racks 160. The control part 71 is communicably connected to the control unit 30. The control part 71 has ascertained the position of each of the specimen racks 110 and the position of each of the QC specimen racks 160 on the transport paths on the basis of signals detected by sensors of the respective units.

The control part 82a of the supply unit 80 mainly controls operation of each constituent of the preservation adjustment unit 82. In the present embodiment, automatic wake-up and automatic shutdown of each unit of the specimen analysis system 1 are further executed through functions of the control part 82a. A hardware configuration of the control part 82a is the same as those of the control parts 31 and 71.

Figure 4:
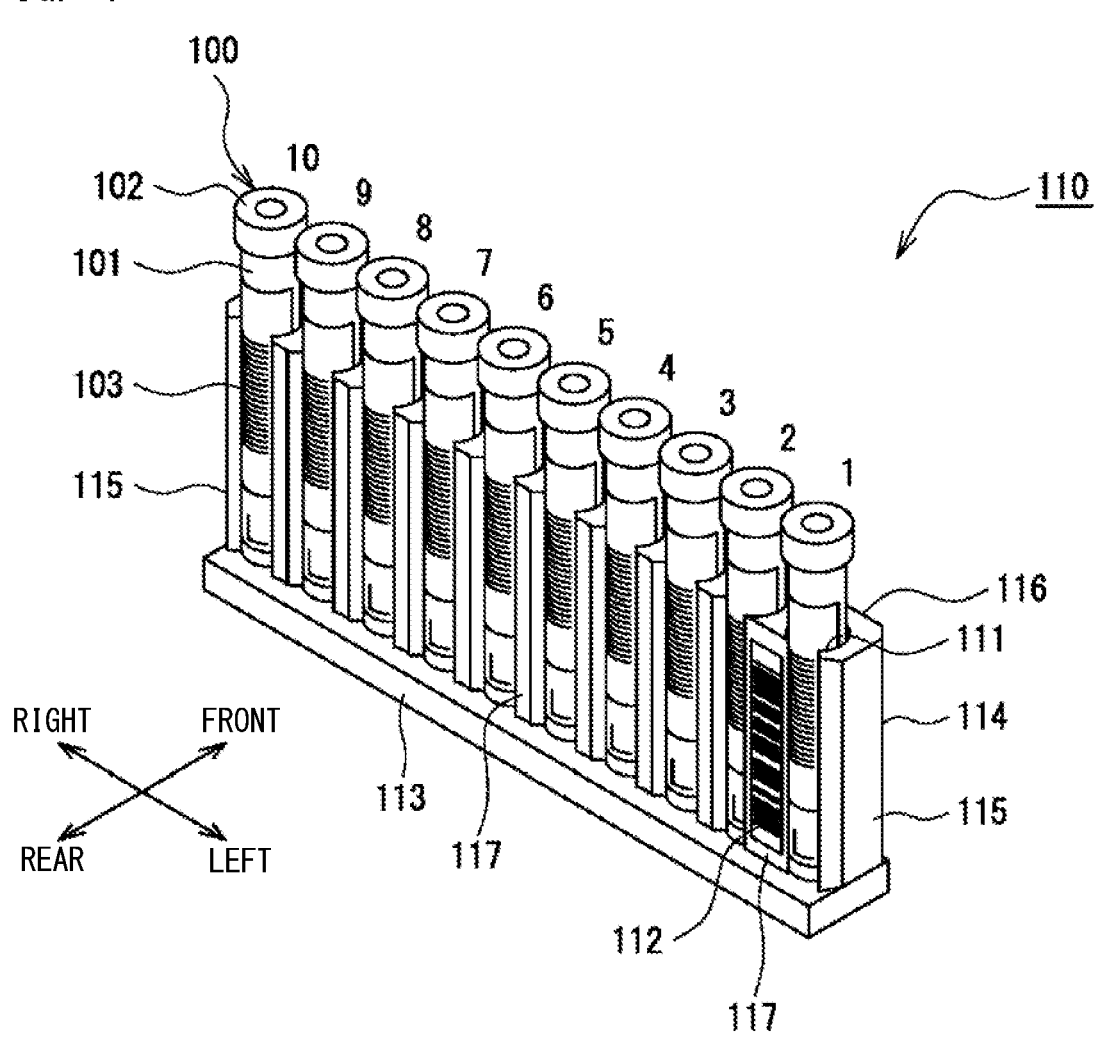
FIG. 4 is a perspective view showing specimen containers and a specimen rack storing thereon the specimen containers.

FIG. 4 is a perspective view showing a specimen rack 110 storing thereon a plurality of specimen containers 100. In the present specification, in a state where the specimen rack 110 is set in the specimen analysis system 1, a side of the specimen rack 110 that is oriented frontward of the system is defined as the front side of the specimen rack 110 and a side of the specimen rack 110 that is oriented rearward of the system is defined as the rear side of the specimen rack 110 for convenience of description.

As shown in FIG. 4, each of the specimen containers 100 includes: a tube 101 having a bottom and accommodating a blood specimen collected from a subject; and a cap 102 closing an opening of the tube 101. The tube 101 is, for example, a cylindrical container that has a bottom and that is made of light-transmissive glass or resin. The opening of the tube 101 is closed by the cap 102 made of rubber so that the internal space of the tube 101 storing therein the specimen is sealed. In addition, the specimen container 100 is provided with a machine-readable label 103. The machine-readable label 103 is, for example, a barcode label on which a barcode indicating a specimen ID has been printed. The machine-readable label 103 is pasted on the side surface of the tube 101. The specimen ID is identification information with which the specimen can be individually identified.

The specimen rack 110 (empty rack 170) is a case that is for storing the specimen containers 100 and that is used for transporting the specimen containers 100. The specimen rack 110 includes a plurality of storing portions 111 in which the plurality of specimen containers 100 can be held in an upright state. The number of the storing portions 111 is not particularly limited, and, in the present embodiment, ten (first to tenth) storing portions 111 are formed side by side in a row in the left-right direction. In addition, the specimen rack 110 is provided with a machine-readable label 112. The machine-readable label 112 is, for example, a barcode label on which a barcode indicating a rack ID has been printed. The rack ID is identification information with which the specimen rack 110 can be individually identified.

The specimen rack 110 includes: a bottom plate portion 113 having a rectangular shape in a bottom view; and a wall portion 114 provided to extend in the height direction of the specimen containers 100 and supporting the specimen containers 100. On the specimen rack 110, the specimen containers 100 are upright so as to be substantially perpendicular to the bottom plate portion 113. The wall portion 114 is formed so as to have a lower height than the upright specimen containers 100. The wall portion 114 includes: a pair of side walls 115 formed at both left and right end portions of the bottom plate portion 113; a front wall 116 formed along a front end portion of the bottom plate portion 113 and connecting the two side walls 115 to each other; and a plurality of partition walls 117 extending from the front wall 116 to the rear end side of the bottom plate portion 113. The plurality of partition walls 117 partition a storing space for the specimen containers 100 so as to form the plurality of (in FIG. 4, ten) storing portions 111.

In the rack presented as an example in FIG. 4, nine partition walls 117 are formed, and the machine-readable label 112 as a barcode label is pasted on the rear surface of a partition wall 117 that separates first and second ones of the storing portions 111 from each other. Each of the storing portions 111 has a large opening formed upward and rearward. Therefore, the machine-readable labels 103 can be read even in a state where the specimen containers 100 are stored in the storing portions 111. The machine-readable labels 103 and 112 are not limited to one-dimensional barcode labels such as those shown in FIG. 4 and may be two-dimensional codes. The machine-readable labels 103 and 112 may be IC tags that can be read by an RFID reader.

Figure 5:
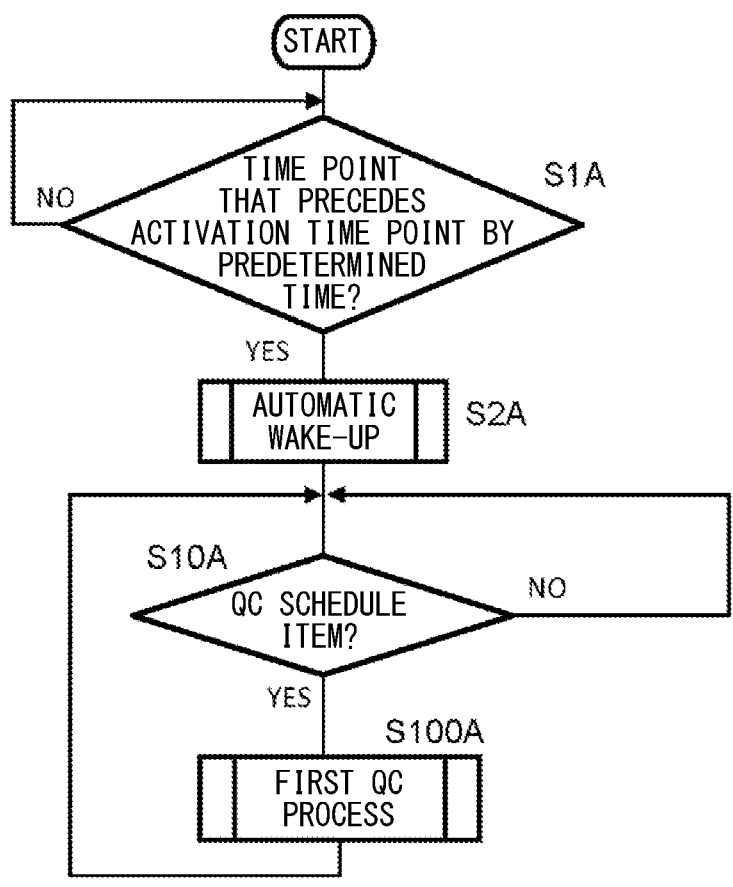
FIG. 5 is a flowchart showing a series of processes to be performed in the specimen analysis system.

FIG. 5 is a flowchart showing an example of a process to be performed in the specimen analysis system 1. The process in FIG. 5 is executed by the control part 82a of the supply unit 80. If a schedule item for automatic wake-up has been registered, the control part 82a determines whether or not the present time point has become a time point specified in the schedule item (step S1A). For example, if the present time point has become a time point that precedes the specified time point by a predetermined time, the control part 82a executes automatic wake-up (step S2A). The process in S2A will be described later with reference to FIG. 6.

When each of the units composing the system is powered on through the automatic wake-up, the control part 82*a* determines whether or not a time point of scheduled automatic QC has arrived (step S10A). This determination is performed on the basis of registered information about an automatic QC schedule item saved in the control part 82*a*. If the control part 82*a* determines that the time point of automatic QC has arrived, the control part 82*a* starts a quality control (QC) process using QC specimen containers 150 (step S100A). The process in S100A will be described later with reference to FIG. 7.

Figure 6:
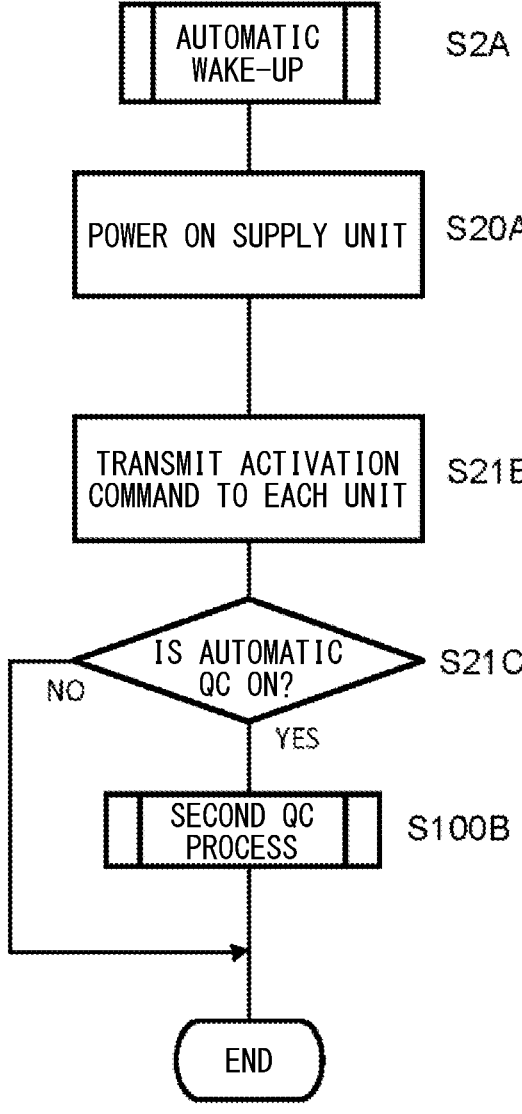
FIG. 6 is a flowchart showing the procedure of an automatic wake-up process.

FIG. 6 is a flowchart showing an example of the automatic wake-up process. In step S20A, the control part 82*a* powers on the supply unit 80. Consequently, power starts to be supplied to a heater of a heating part 86 described later, and the temperature inside the heating part 86 is increased to a setting temperature (for example, 23° C.). In step S21B, the control part 82*a* transmits activation commands to units of the specimen analysis system 1 when the present time point has become the time point that precedes the specified time point by the predetermined time. Consequently, for example, a unit that is subjected to automatic wake-up among the units composing the specimen analysis system 1 is powered on. All the units composing the specimen analysis system 1 may be powered on through transmission of an activation command.

As the above predetermined time, for example, a time longer than a time (hereinafter, heating time) required for the heating part 86 to heat QC specimen containers 150 preserved in the cooling-and-preserving part 84 to a temperature that allows measurement, is set. For example, if the heating time is 10 minutes, the predetermined time is set to be longer than 10 minutes. For example, the predetermined time includes, in addition to the heating time, a time required to obtain a measurement result by measuring a heated QC specimen by any of the measurement units. An example of the predetermined time is 30 minutes. If the time point of wake-up is set to 8:30 A.M., the control part 82*a* transmits an activation command at 8:00 A.M. Through such setting, a state where a process from heating of the QC specimens to measurement thereof has been completed can be attained by a time point specified as the time point of wake-up by a user. Therefore, the user can immediately start a test by using the measurement unit at the specified time point. The predetermined time may be fixed or may be varied according to whether or not automatic QC has been set; or a QC condition.

In step S21C, the control part 82*a* determines whether or not automatic QC has been set to be ON. If automatic QC has been set to be ON, the control part 82*a* executes automatic QC in step S100B subsequently to the automatic wake-up. Specifically, if an automatic wake-up schedule item in which automatic QC is set to be ON has been registered, each unit of the specimen analysis system 1 is automatically powered on at a specified time point on a specified day of the week, and quality control measurement using a QC specimen container 150 is automatically started. If automatic QC is set to be OFF, only automatic wake-up is executed, and quality control measurement is not performed.

Figure 7:
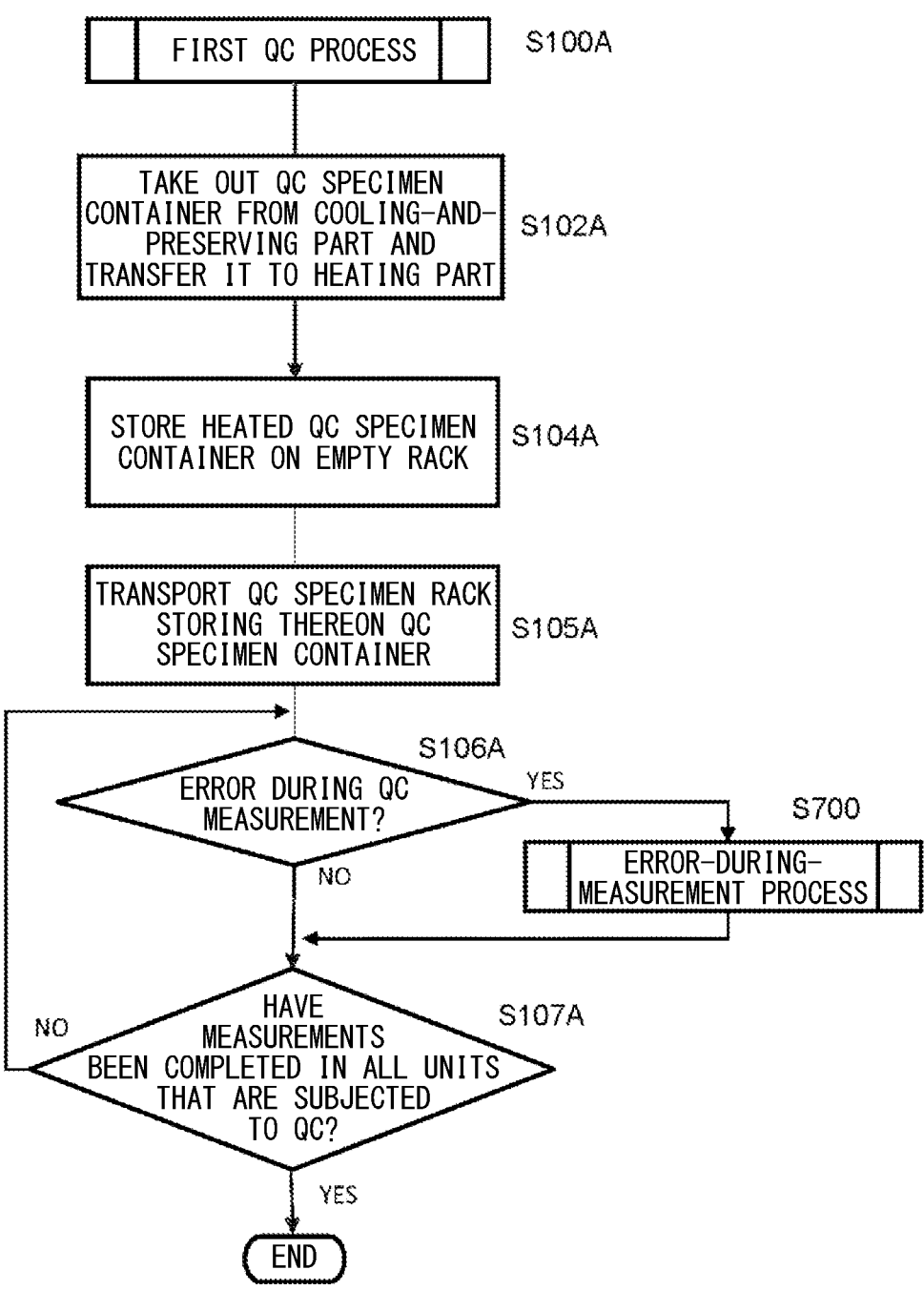
FIG. 7 is a flowchart showing the procedure of an automatic QC process.

FIG. 7 is a flowchart showing an example of a first QC process in step S100A. The first QC process is automatic QC to be executed at a timing other than the timing of automatic wake-up.

In step S102A, the control part 82*a* executes control such that any of the QC specimen containers 150 is taken out from the cooling-and-preserving part 84 and transferred to the heating part 86. The control part 82*a* starts clocking when the QC specimen container 150 is set in the heating part 86.

In step S104A, when a predetermined time elapses from the setting of the QC specimen container 150 in the heating part 86, the control part 82*a* causes the QC specimen container 150, which has been heated to the measurement temperature, to be transferred from the heating part 86 to an empty rack 170 described later.

In step S105A, the control part 82*a* executes control such that the rack storing thereon the QC specimen container 150 is transported from the supply unit 80. The control part 82*a* notifies the transport controller 70 of any of the measurement units as a transport destination for the rack. The transport controller 70 controls the corresponding transport unit 20 such that the rack is transported to the measurement unit regarding which the notification has been received.

In step S106A, the transport controller 70 performs monitoring as to whether or not an error during measurement has occurred in the measurement unit executing QC measurement. For example, the transport controller 70 receives, from the control unit 30 controlling the measurement unit 10A/10B, a notification indicating that an error during measurement has occurred, thereby ascertaining that the error during measurement has occurred. The error during measurement is, for example: an error in reading of a barcode provided on the QC specimen container 150; an error in which a reagent in the measurement unit for executing QC measurement has run out; an abnormality in a measurement value; or insufficiency of the amount of the QC specimen. If the transport controller 70 has detected an error during measurement, the transport controller 70 executes an error-during-measurement process S700 exemplified in S700. The error-during-measurement process in S700 will be described later.

In S107A, the transport controller 70 executes monitoring for an error during QC measurement (S106A) and the error-during-measurement process in a case of occurrence of an error during measurement (S700) until QC measurement is completed in all the measurement units that are subjected to QC measurement.

Figure 9:
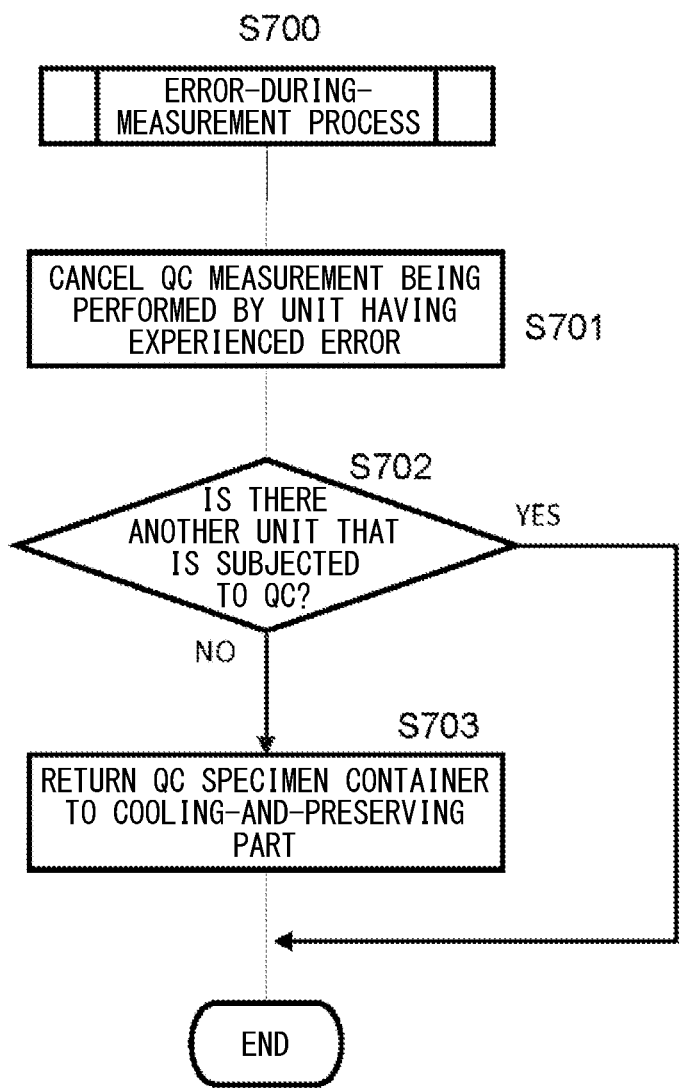
FIG. 9 is a flowchart showing the procedure of a process in response to an error during measurement in automatic QC.

FIG. 9 is a flowchart showing an example of the error-during-measurement process in S700. In the error-during-measurement process in S700, for example, the control unit 30 stops measurement of the QC specimen and ejects the rack storing thereon the QC specimen container 150 to the second storing part 25 described later in response to occurrence of the error during measurement. The control unit 30 notifies the transport controller 70 that the rack has been ejected to the second storing part 25, for example. The transport controller 70 having received the notification controls the transport unit in order to return, to the cooling-and-preserving part 84, the rack carried out to the second storing part 25. That is, the control unit 30 and the transport controller 70 execute control to inhibit stoppage of transport of the QC specimen (lengthening of the time during which the QC specimen is left in the room temperature environment) due to the error during measurement. Such control enables reduction of the risk that the QC specimen degrades.

In S701, the control unit 30 executes control to cancel the QC measurement being performed by the measurement unit having experienced the error during measurement. Alternatively, for example, the transport controller 70 may execute the control to cancel the QC measurement. In this case, the transport controller 70 instructs the control unit 30 to stop the QC measurement and eject the QC specimen from the measurement unit.

In step S702, the control unit 30 checks presence or absence of another measurement unit that is subjected to QC measurement. For example, the control unit 30 obtains schedule information about QC measurement from the transport controller 70 or the supply unit 80 and identifies, from the schedule information, any of the measurement units that is subjected to QC measurement. The checking of presence or absence of another measurement unit that is subjected to QC measurement may be executed by the transport controller 70. For example, the transport controller 70 obtains a schedule item for QC measurement from the supply unit 80 and identifies any of the measurement units that is subjected to QC measurement.

In step S703, if there is no other measurement unit that is subjected to QC measurement, the control unit 30 and the transport controller 70 execute control to return the QC specimen container 150 to the cooling-and-preserving part 84. For example, the control unit 30 notifies the transport controller 70 that the rack has been ejected to the second storing part 25. For example, the transport controller 70 controls the transport unit 20 to return the QC specimen container 150 to the cooling-and-preserving part 84 in response to the notification from the control unit 30.

Figure 8:
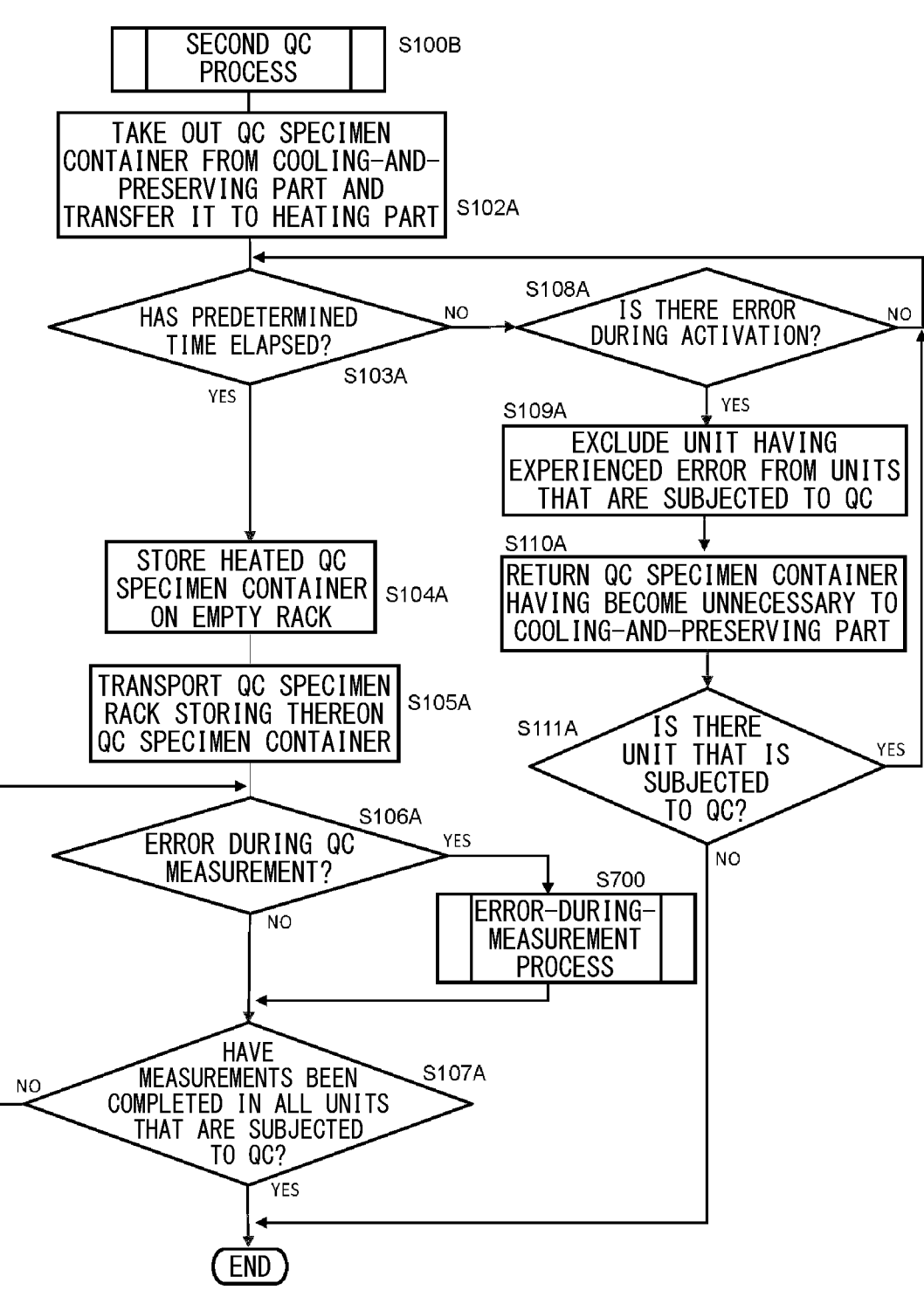
FIG. 8 is a flowchart showing the procedure of an automatic QC process.

FIG. 8 is a flowchart showing an example of a second QC process in step S100B. The second QC process is automatic QC to be executed subsequently to automatic wake-up.

In step S102A, the control part 82a executes control such that any of the QC specimen containers 150 is taken out from the cooling-and-preserving part 84 and transferred to the heating part 86. The control part 82a starts clocking when the QC specimen container 150 is set in the heating part 86. In step S103A, the control part 82a performs monitoring as to whether or not the predetermined time has elapsed from the setting of the QC specimen container 150 in the heating part 86. The predetermined time is, for example, a time required for heating the QC specimen container 150.

In step S108A, the control part 82a performs, during monitoring as to the heating time in step S103A, monitoring as to whether or not an error during activation has occurred in any of the units that is subjected to automatic wake-up. For example, the control part 82a performs monitoring as to error by receiving a notification regarding an error during activation from the control unit 30. The error during activation is, for example: an error in which a reagent in the measurement unit for executing QC measurement has run out; or an abnormality regarding the measurement unit (for example, an abnormality in the pressure of a pump for suctioning specimens/reagents, an abnormality in the temperature of a reaction chamber, or an abnormality in operation of a mechanism in the device). Monitoring as to error during activation in step S108A is executed until the predetermined time regarding heating of QC specimens elapses.

In step S109A, if an error during activation has occurred in the unit that is subjected to QC measurement ("YES" in S108A), the control part 82a excludes this unit from units that are subjected to QC.

In step S110A, upon exclusion of the measurement unit from the units that are subjected to QC, the control part 82a returns, to the cooling-and-preserving part 84, the QC specimen container 150 that no longer needs to be ejected from the supply unit 80.

The control part 82a may be configured not to perform the process in S110A. In this case, the QC specimen container 150 specified for use in QC measurement on the basis of schedule setting for automatic QC is temporarily carried out from the supply unit 80 without being returned from the heating part 86 to the cooling-and-preserving part 84. Although the QC specimen container 150 is carried out from the supply unit 80, since the measurement unit having experienced the error during activation is excluded in the above step S109A from the units that are subjected to QC, QC measurement in this measurement unit is not performed, and the QC specimen container 150 is transported to any of the measurement units that needs to be subjected to QC measurement. After the QC measurement, the QC specimen container 150 is returned to the supply unit 80 and preserved in the cooling-and-preserving part 84.

In step S111A, the control part 82a determines whether or not there is still any unit that is subjected to QC. If all the measurement units are excluded, owing to errors during activation, from the units that are subjected to QC measurement (in the case of "NO" in S111A), all the QC specimen containers 150 being heated are returned to the cooling-and-preserving part 84. In this case (in the case of "NO" in S111A), automatic QC at the time of automatic wake-up becomes unnecessary, and thus the control part 82a ends the process in S100B. If there is still any measurement unit that is subjected to QC (in the case of "YES" in S111A), the control part 82a performs monitoring as to elapse of the heating time again (S103A). Through the process from step S108A to step S111A, the control part 82a can perform control so as to prevent ejection of each QC specimen container 150 from the supply unit 80 according to the statuses of the measurement units during activation. For example, if the measurement units that are subjected to QC are excluded owing to errors during activation, QC specimen containers 150 are not carried out from the supply unit 80, whereby the time during which the QC specimen containers 150 are left in the room temperature environment can be shortened. In addition, for example, a case is also assumed in which the number of the measurement units that are subjected to QC is reduced owing to errors during activation, whereby the number of the QC specimen containers 150 that are necessary for automatic QC is also reduced. In this case, the QC specimen containers 150 that are no longer necessary for automatic QC are prevented from being ejected from the supply unit 80, whereby the number of the QC specimen containers 150 to be left in the room temperature environment is reduced.

QC measurement to be manually executed by a user is assumed to be executed in a situation in which the user is present in a laboratory. In this case, even if an error during measurement has occurred, the user in the laboratory can determine, for example, whether the QC specimen container 150 is to be temporarily returned to the cooling-and-preserving part 84 because it takes time to solve the error, or QC measurement is to be executed again through retry of QC measurement. Therefore, even if operation is stopped in a state of occurrence of an error during measurement without automatically returning the QC specimen container 150 to the cooling-and-preserving part 84 as in the error-during-measurement process in S700, the QC specimen container 150 can be inhibited, through determination by the user, from being left in the room temperature environment for such a long time that degradation occurs in the QC specimen container 150. Meanwhile, it is also assumed that, if automatic QC is executed on the basis of a set schedule item, automatic QC is executed in a situation in which no user capable of performing the above determination is present in the laboratory. For example, a procedure in which automatic QC is executed before a time of start of work in the laboratory (that is, in a time period in which there is a high probability that the user is absent in the laboratory) so that preparation is performed so as to enable a test procedure to be immediately started from the time of start of work, is conceivable as an example of the procedure of automatic QC. In such a procedure, if an error during measurement has occurred and operation is stopped in the state of occurrence of the error during measurement, the QC specimen container 150 might be left in the room temperature environment beyond an allowable time in the case of absence of the user in the laboratory. Therefore, if the specimen analysis system 1 can execute control for shortening the time during which the QC specimen container 150 is left in the indoor environment as in the example in the present embodiment, an excellent effect is exhibited for suppressing degradation of the QC specimen in the procedure of automatic QC.

Figure 10:
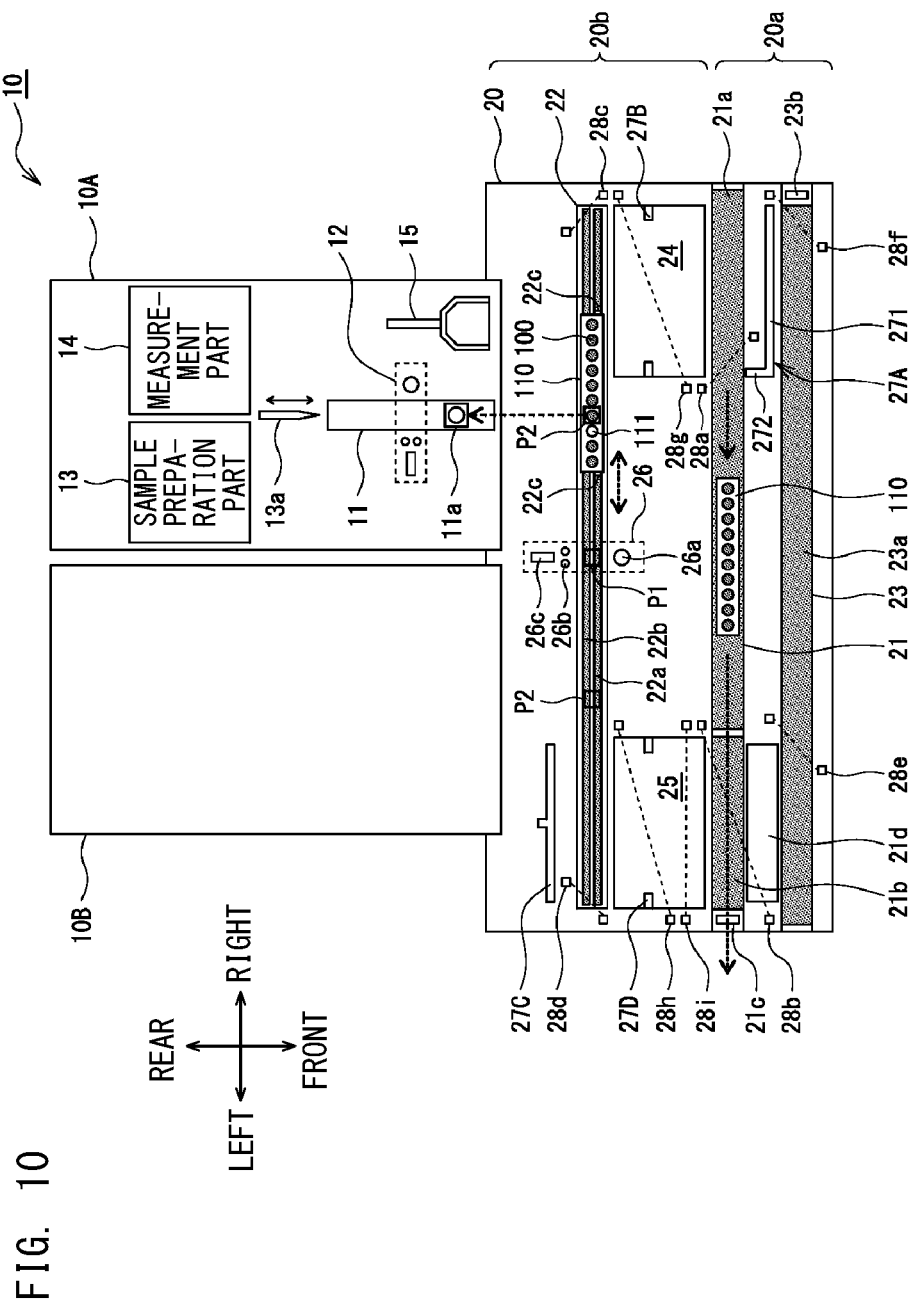
FIG. 10 schematically shows configurations of measurement units and a transport unit that compose the specimen analysis system.
Figure 11:
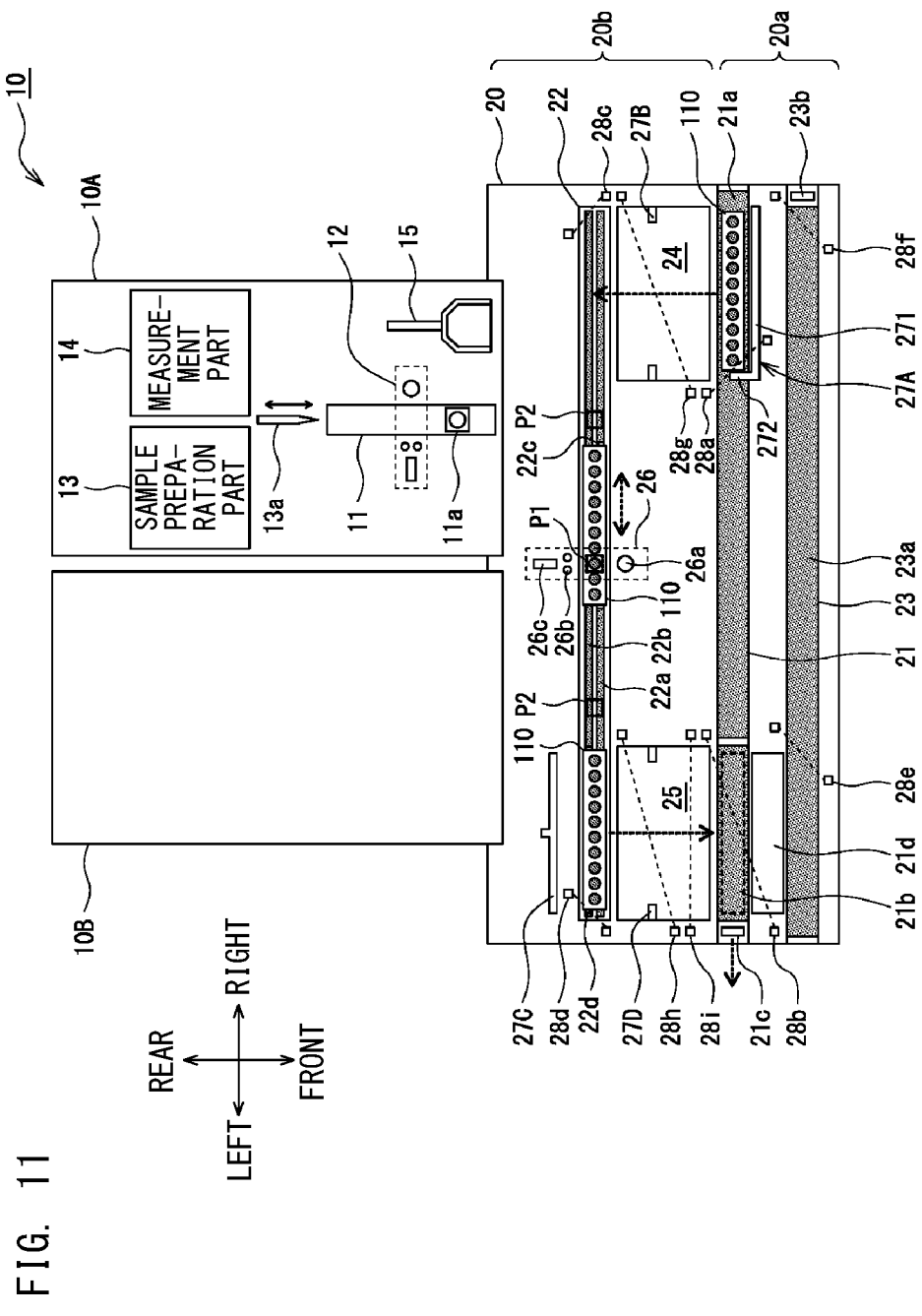
FIG. 11 schematically shows configurations of the measurement units and the transport unit.

Hereinafter, the configurations of the measurement block and the transport unit 20 will be described in detail with reference to FIG. 10 and FIG. 11. In FIG. 10, a plate 272 of a first sending part 27A is positioned so as to be retracted from a position on the first transport path 21. In FIG. 11, the plate 272 exists on the first transport path 21.

[Measurement Block (First Measurement Unit 10A, Second Measurement Unit 10B)]

As shown in FIG. 10 and FIG. 11, the first measurement unit 10A and the second measurement unit 10B are disposed rearward of the transport unit 20 so as to be adjacent to the transport unit 20 in the front-rear direction. Each of the first measurement unit 10A and the second measurement unit 10B takes out a specimen container 100 from a specimen rack 110 transported to the second transport path 22 of the transport unit 20 and measures a blood specimen accommodated in the specimen container 100. Although the configuration of the first measurement unit 10A is shown in FIG. 10 and FIG. 11, the second measurement unit 10B also has the same device structure as that of the first measurement unit 10A.

The first measurement unit 10A can measure, for example, CBC items and DIFF items. The CBC items include WBC (white blood cell count), RBC (red blood cell count), HGB (the amount of hemoglobin), HCT (hematocrit value), MCV (mean corpuscular volume), MCH (mean corpuscular hemoglobin), MCHC (mean corpuscular hemoglobin concentration), PLT (platelet count), and the like. The DIFF items include NEUT #(neutrophil count), LYMPH #(lymphocyte count), MONO #(monocyte count), EO #(eosinophil count), BASO #(basophil count), and the like. The second measurement unit 10B can measure, for example, RET items, PLT-F items, and WPC items in addition to the CBC items and the DIFF items. The RET items include RET #(reticulocyte count) and the like. The PLT-'F items include, for example, PLT #(platelet count). For the WPC items, for example, blast or lymphocyte-based abnormal white blood cells are detected, and flagging is performed.

In one embodiment, the first measurement unit 10A measures the CBC items and the DIFF items in a first test. In addition, the second measurement unit 10B measures the CBC items and the DIFF items in a first test and, as necessary, measures the RET items, the PLT-'F items, or the WPC items in a retest. That is, the first measurement unit 10A is a measurement unit dedicated to first tests, and the second measurement unit 10B is a measurement unit capable of performing retests in addition to first tests.

The first measurement unit 10A includes a container transfer part 11, an information reading part 12, a sample preparation part 13, and a measurement part 14. The first measurement unit 10A includes a robot hand 15. The robot hand 15 takes out a specimen container 100 at a predetermined take-out position P2 on the second transport path 22 from a corresponding storing portion 111 of the specimen rack 110, agitates the taken-out specimen container 100 in an inverting manner by shaking the specimen container 100 a predetermined number of times, and places the agitated specimen container 100 on the container transfer part 11. The container transfer part 11 has a holder 11a capable of holding the specimen container 100 which is in an upright state. The container transfer part 11 is configured to move the holder 11a in the front-rear direction together with the container transfer part 11. On a path through which the specimen container 100 is transferred by the container transfer part 11, the information reading part 12 is disposed at a position between a placement position at which the specimen container 100 is placed by the robot hand 15 and a position at which suction is performed through a suction tube 13a described later. The information reading part 12 reads a specimen ID from the machine-readable label 103 on the specimen container 100 set in the holder 11a.

The sample preparation part 13 includes the suction tube 13a. The sample preparation part 13 penetrates, by means of the suction tube 13a, the cap 102 of the specimen container 100 set in the holder 11a and suctions a specimen through the suction tube 13a. The sample preparation part 13 includes, for example, a reaction chamber and mixes the suctioned specimen and a reagent with each other in the reaction chamber, to prepare a measurement sample. The reagent is, for example, a diluent, a hemolytic agent, or a staining liquid. The measurement part 14 includes, for example, an optical detector, an electric-resistance-type detector, and a hemoglobin measurement part and measures the measurement sample. When suction of the specimen is ended, the specimen container 100 is transported frontward by the container transfer part 11 and returned to the original storing portion 111 of the specimen rack 110 by the robot hand 15.

The first measurement unit 10A, the second measurement unit 10B, and the second transport mechanism 20b (see FIG. 3) as a portion of the transport unit are controlled by the control unit 30. In the case of performing a first test, the control unit 30 inquires of the host computer 120 about a measurement order for a first test on the basis of the read specimen ID and obtains a measurement order of the specimen from the host computer 120. The control unit 30 stores therein a retest rule for determining, on the basis of a measurement result of the first test, whether or not to perform a retest. If the control unit 30 determines to perform a retest according to the rule, the control unit 30 generates a measurement order for a retest.

At the time of the first test, a plurality of the specimen containers 100 stored on the specimen rack 110 are, from one in the storing portion 111 at the left end to one in the storing portion 111 at the right end, sequentially taken into the first measurement unit 10A or the second measurement unit 10B, and the respective specimens are measured. At this time, a measurement unit into which a specimen container 100 is to be taken is determined so as to disperse load on each of the measurement units. For example, specimen containers 100 corresponding to odd numbers among storing position numbers shown in FIG. 4 are taken into the second measurement unit 10B, and specimen containers 100 corresponding to even numbers among the storing position numbers are taken into the first measurement unit 10A.

[Transport Unit 20]

As described above, the transport unit 20 includes the first transport path 21, the second transport path 22, and the third transport path 23. The three transport paths extend in the left-right direction and are disposed to be parallel to one another. Through the first transport path 21, a specimen rack 110 is transported from the upstream side to the downstream side (from the right to the left) of the specimen analysis system 1. Through the second transport path 22, the specimen rack 110 can be transported to both the left and the right, i.e., from the right to the left and from the left to the right.

Through the third transport path 23, a QC specimen rack 160 is transported from the downstream side to the upstream side (from the left to the right) of the specimen analysis system 1. Each QC specimen container 150 contains a quality control substance to be used for a plurality of times of measurement. The quality control substance needs to be cooled and preserved by the supply unit 80, and thus the QC specimen container 150 is returned to the supply unit 80 after measurement in any of the measurement units is ended. In the present embodiment, a specimen rack 110 having been used is transported to the collection unit 60, and thus the specimen rack 110 is not transported through the third transport path 23.

In the transport unit 20, movable stoppers 21c and 23b are respectively provided at a downstream end portion of the first transport path 21 and a downstream end portion of the third transport path 23. In addition, a movable stopper 21d is provided between the first transport path 21 and the third transport path 23 so as to be positioned side by side with the second storing part 25 (described later) in the front-rear direction. Hereinafter, regarding features that are common to transport of a specimen rack 110 and transport of a QC specimen rack 160, the configuration of the transport unit 20 will be described by taking a specimen rack 110 as an example.

The first transport path 21, the second transport path 22, and the third transport path 23 are disposed to be apart from each other in the front-rear direction. The first storing part 24 and the second storing part 25 which are spaces capable of storing therein specimen racks 110 are provided between the first transport path 21 and the second transport path 22. A right end portion of the second transport path 22 is connected to an upstream end portion of the first transport path 21 with the first storing part 24 therebetween, and a left end portion of the second transport path 22 is connected to the downstream end portion of the first transport path 21 with the second storing part 25 therebetween.

The transport unit 20 further includes: a plurality of rack sending parts each of which relays a specimen rack 110 between transport paths and between a transport path and either of the storing parts; and a plurality of sensors each of which detects the position of a specimen rack 110 on any of the transport paths and the storing parts. The transport unit 20 includes an information reading part 26 which reads a specimen ID and a rack ID from the machine-readable label 103 on each specimen container 100 and the machine-readable label 112 on the specimen rack 110, respectively. The information reading part 26 is disposed at a center portion in the length direction of the second transport path 22 and is disposed between the take-out position P2 on the right side corresponding to the first measurement unit 10A and the take-out position P2 on the left side corresponding to the second measurement unit 10B so as to be able to read the above machine-readable labels 103 and 112.

The transport unit 20 includes, as the rack sending parts, the first sending part 27A, a second sending part 27B, a third sending part 27C, and a fourth sending part 27D. The four rack sending parts are each a rack transport device configured to be movable in the front-rear direction. The first sending part 27A is configured to push out the specimen rack

110 from an upstream position on the first transport path 21 to the first storing part 24. The second sending part 27B transports the specimen rack 110 from the first storing part 24 to the position of the right end of the second transport path 22, and the third sending part 27C transports the specimen rack 110 from the position of the left end of the second transport path 22 to the second storing part 25. In addition, the fourth sending part 27D transports the specimen rack 110 from the second storing part 25 to a downstream position on the first transport path 21.

The transport unit 20 includes four sensors 28a, 28b, 28c, and 28d as sensors for detecting specimen racks 110 on the first transport path 21 and the second transport path 22. The transport unit 20 further includes sensors 28e and 28f as sensors for detecting a specimen rack 110 on the third transport path 23. The transport unit 20 further includes sensors 28g, 28h, and 28i as sensors for detecting specimen racks 110 on the first storing part 24 and the second storing part 25.

Hereinafter, the constituents of the transport unit 20 will be described in the order of arrangement thereof along the transport paths for specimen racks 110. Description will be given with reference to FIG. 10 and FIG. 11 in which the analyzer AN1 disposed on the upstream side of the specimen analysis system 1 out of the two analyzers is presented as an example.

The first transport path 21 includes transport belts 21a and 21b for transporting, to the analyzer on the downstream side, a specimen rack 110 carried in from the supply unit 80. The transport belts 21a and 21b are driven independently of each other by respective stepping motors. That is, the first transport path 21 includes two conveyor belts. The transport belt 21b is provided to extend from a position in front of the second storing part 25 to the downstream end portion of the first transport path 21. The transport belt 21a is provided to extend from the upstream end portion of the first transport path 21 to the vicinity of the transport belt 21b.

Transport of the specimen rack 110 through the first transport path 21 is performed under the control of the transport controller 70. Specifically, the transport controller 70 transmits control signals to the stepping motors connected to the transport belts 21a and 21b, and the motors are driven on the basis of the control signals. In the case of transport of the specimen rack 110 through the other transport paths and at the rack sending parts as well, the transport is performed under the control of the transport controller 70 or the control unit 30 in the same manner.

The specimen rack 110 carried from the supply unit 80 to the upstream position on the first transport path 21 is transported toward the downstream side by the transport belt 21a. The specimen rack 110 is detected by the sensor 28a and sent to the first storing part 24 by the first sending part 27A. The sensor 28a is, for example, an optical sensor having a light emitter and a light receiver, and the light emitter and the light receiver are disposed such that the first transport path 21 is interposed therebetween from the front and rear sides. When light emitted from the light emitter is blocked by a specimen rack 110, the level of light received by the light receiver decreases. Through this decrease, the sensor 28a detects the specimen rack 110. Optical sensors similar to the sensor 28a can be used as the other sensors disposed in the transport unit 20.

The first sending part 27A provided at the upstream position on the first transport path 21 has, as an engagement portion to be engaged with a specimen rack 110, a plate 271 extending along the length direction of the first transport path 21 and the plate 272 extending along the width direction of the first transport path 21. The plates 271 and 272 are, for example, connected to each other and disposed substantially in an L shape in a plan view. The first sending part 27A is configured to be movable in the front-rear direction between a retraction position (see FIG. 10) at which the plates 271 and 272 do not hinder transport of any specimen rack 110 performed through the first transport path 21; a stoppage position (see FIG. 11) at which a specimen rack 110 transported through the first transport path 21 is stopped; and a position at which the specimen rack 110 is pushed out to the first storing part 24.

In a state where the first sending part 27A is located at the stoppage position, only the plate 272 is disposed on the first transport path 21 as shown in FIG. 11. The specimen rack 110 transported by the transport belt 21a is caught and stopped by the plate 272. From this state, the first sending part 27A (plate 271) is moved rearward, whereby the specimen rack 110 is pushed out to the first storing part 24. The specimen rack 110 transported to the first storing part 24 is detected by the sensor 28g disposed such that the first storing part 24 is interposed from the left and right sides.

The first storing part 24 is a space for storing therein the specimen rack 110 received from the first transport path 21 and is formed by disposing, between the first transport path 21 and the second transport path 22, a plate-shaped member having an upper surface parallel to a horizontal plane, for example. The specimen rack 110 sent to the first storing part 24 is detected by the sensor 28g and sent to the second transport path 22 at an appropriate timing by the second sending part 27B. The second sending part 27B has, for example, engagement portions to be brought into contact with the front surface of the specimen rack 110 and pushes both left and right end portions of the front surface of the specimen rack 110 rearward so as to push out the specimen rack 110 to the position of the right end of the second transport path 22. The sensor 28c is disposed near the position of the right end of the second transport path 22, and the specimen rack 110 transported to the position of the right end is detected by the sensor 28c.

The second transport path 22 includes two transport belts 22a and 22b which independently transport a specimen rack 110 in the left-right direction. The transport belts 22a and 22b are driven independently of each other by stepping motors provided to the respective transport belts. The transport belts 22a and 22b are disposed side by side in the front-rear direction and extend in the left-right direction from the position of the right end to the position of the left end of the second transport path 22. The transport belt 22a is provided with two protrusions 22c between which a specimen rack 110 is to be fitted. Likewise, the transport belt 22b is also provided with two protrusions 22d between which a specimen rack 110 is to be fitted. The specimen rack 110 is sent out by the second sending part 27B so as to be fitted between these protrusions 22c. The specimen rack 110 is transported to the left and the right through drive of the transport belts 22a and 22b in a state where the specimen rack 110 is fitted between the protrusions 22c.

Through the second transport path 22, two specimen racks 110 can be separately transported in the left-right direction. As shown in FIG. 11, two specimen racks 110 can be simultaneously carried onto the second transport path 22. Hereinafter, a specimen rack 110 sent to the second transport path 22 first is referred to as a "preceding rack", and a specimen rack 110 sent to the second transport path 22 subsequently to the preceding rack is referred to as a "subsequent rack". In this case, while measurement of a specimen is being performed with respect to the preceding rack, measurement can be simultaneously performed also with respect to the subsequent rack.

The information reading part 26 includes: rollers 26a and 26b disposed such that the second transport path 22 is interposed therebetween; and a reader 26c. The rollers 26a and 26b are movable in a direction in which the rollers 26a and 26b approach each other. The roller 26a is rotated in a state where any of specimen containers 100 is interposed between the rollers 26a and 26b in the front-rear direction. Consequently, the specimen container 100 is rotated. The reader 26c reads the machine-readable label 103 on the rotated specimen container 100 through a gap between the rollers 26b. The reader 26c can also read a rack ID of the specimen rack 110. The reader 26c is, for example, a barcode reader. Reading of a specimen ID and a rack ID by the information reading part 26, and measurement of a specimen by the measurement unit, are performed under the control of the control unit 30.

Each of the specimen containers 100 from which specimen IDs have been read is transported to one of the take-out positions P2 corresponding to the first measurement unit 10A and the second measurement unit 10B, is taken out from the specimen rack 110 by the robot hand 15, and is taken into the measurement unit. At this time, a measurement unit into which the specimen container 100 is to be taken is determined so as to disperse load on each of the measurement units. The measurement unit performs a first test, and, when the first test is ended, the specimen container 100 is returned to the original storing portion 111 at the take-out position P2. If first tests and necessary retests are completely ended for all the specimen containers 100 stored on the specimen rack 110, this specimen rack 110 is transported to a downstream end portion of the second transport path, i.e., a position behind the second storing part 25, and is transported to the second storing part 25 by the third sending part 27C.

Even if first tests are ended for all specimen containers 100 on a preceding rack, the preceding rack needs to stay on the second transport path 22 until determination is performed for each of the specimen containers 100 as to necessity of a retest of the specimen container 100. At this time, a predetermined time is taken until determination is performed as to necessity of a retest of the last specimen container 100 on which a first test has been performed. Thus, in order to increase the efficiency of measurement, a subsequent rack is sent to the second transport path 22, and first tests are started for the subsequent rack. The preceding rack which is standing by is retracted to the position of the left end of the second transport path 22 so as not to interfere with transport of the subsequent rack.

The sensor 28d is disposed near the position of the left end of the second transport path 22. A specimen rack 110 for which all the first tests and necessary retests are ended is pushed out by the third sending part 27C from the position of the left end to the second storing part 25 provided frontward of the position of the left end. The second storing part 25 is a space for storing therein the specimen rack 110 received from the second transport path 22 and, similar to the first storing part 24, is formed by disposing a plate-shaped member having an upper surface parallel to the horizontal plane. The specimen rack 110 in the second storing part 25 is detected by the sensors 28h and 28i and pushed out to the first transport path 21 at an appropriate timing by the fourth sending part 27D.

The rack existing in the second storing part is transported to the first transport path 21 or the third transport path 23 according to the next transport destination determined by the transport controller 70.

On one hand, for example, if the rack existing in the second storing part is a specimen rack 110 storing thereon specimen containers 100 and the next transport destination is the processing unit 40 or the collection unit 60, the specimen rack 110 needs to be transported in the leftward direction and thus is sent to the first transport path 21. On the other hand, for example, if the rack existing in the second storing part is a QC specimen rack 160 storing thereon QC specimen containers 150 and the next transport destination is the adjacent measurement block, the QC specimen rack 160 needs to be transported in the leftward direction and thus is sent to the first transport path 21, and meanwhile, if the next transport destination is the supply unit 80, the QC specimen rack needs to be transported in the rightward direction and thus is sent to the third transport path.

If the rack existing in the second storing part 25 is transported to the first transport path 21, the fourth sending part 27D pushes the rack frontward in a state where the stopper 21d is lifted to a position higher than the position of a relevant one of the belts of the first transport path 21. The rack pushed in the frontward direction is brought into contact with the stopper 21d so as to be stopped at the downstream position on the first transport path 21. When the transport belt 21b is driven in a state where the stopper 21c is lowered, the rack is transported in the leftward direction.

If the rack existing in the second storing part 25 is transported to the third transport path 23, the fourth sending part 27D pushes the rack frontward in a state where the stopper 21d is lowered to a position at a height equal to or lower than the height of the belt of the first transport path 21. The rack pushed in the frontward direction passes over the stopper 21d and is sent to an upstream position on the third transport path 23.

The third transport path 23 includes a transport belt 23a. Similar to the above transport belts 21a and 21b, the transport belt 23a is driven by a stepping motor. The rack transported to the third transport path 23 is transported in the rightward direction by the transport belt 23a.

[Supply Unit 80]

Hereinafter, the configuration of the supply unit 80 will be described in detail with reference to FIG. 12 to FIG. 34.

As described above, the supply unit 80 is a device for supplying specimen racks 110 storing thereon specimen containers 100 to the measurement units. Further, the supply unit 80 cools and preserves QC specimen containers 150 accommodating quality control substances and adjusts the temperature of each of the quality control substances to the measurement temperature according to a schedule item registered in advance by a user. Thereafter, the QC specimen containers 150 accommodating the quality control substances with the temperatures thereof adjusted are set on a rack, and the rack is transported toward a target measurement unit. Each of the QC specimen containers 150 is stored on an empty rack 170, and, similar to a specimen rack 110, the rack is transported to the second transport path 22 of the transport unit 20 as a QC specimen rack 160 storing thereon the QC specimen container 150.

The QC specimen container 150 differs from each specimen container 100 in that the QC specimen container 150 accommodates a quality control substance containing cells having a known concentration. Similar to the specimen container 100, the QC specimen container 150 includes a tube 101 and a cap 102. In addition, a machine-readable label 103 is pasted on the side surface of the tube 101. The machine-readable label 103 indicates a specimen ID including the lot number, the concentration level, and the expiration date of the QC specimen. The machine-readable label

103 is a barcode label. A container having a shape different from that of the specimen container 100 may be used as the QC specimen container 150, and two or more types of containers may be used as each of the specimen container 100 and the QC specimen container 150.

In general, the quality control substance is also called a control sample or a QC specimen. In the specimen analysis system 1, it is necessary to periodically perform measurement quality control through confirmation that there is no abnormality in a measurement result from either of the analyzers, by using the quality control substance. In the specimen analysis system 1, for example, measurement of the quality control substance is performed one time per day through transport of the QC specimen container 150 to the first measurement unit 10A and the second measurement unit 10B (analyzers) before measurement of a specimen is started. Each of measurement values of the quality control substance, e.g., values such as a red blood cell count, a white blood cell count, a platelet count, and a hemoglobin concentration, is compared with, for example, an upper limit value and a lower limit value of the measurement value that are prestored in the control part 31 of the control unit 30. If the measurement value of the quality control substance is within the range from the upper limit to the lower limit, the quality control result is determined to be normal. Meanwhile, if the measurement value is outside the range, the quality control result is determined to be abnormal.

The quality control substance is control blood suitably used for quality control of an automatic blood cell counter and contains a whole blood component adjusted to have a known concentration. The whole blood component refers to, for example, blood cells, and examples thereof include red blood cells, white blood cells, and platelets. As such a quality control substance, there is XN-'CHECK (manufactured by Sysmex Corporation). The quality control substances may include three types of quality control substances adjusted to have three respective concentration levels, i.e., a low concentration level, a standard concentration level, and a high concentration level. Hereinafter, a quality control substance having a low concentration level is referred to as a quality control substance of level 1, a quality control substance having a standard concentration level is referred to as a quality control substance of level 2, and a quality control substance having a high concentration level is referred to as a quality control substance of level 3 so as to be distinguished from one another.

In the supply unit 80, for example, a plurality of the QC specimen containers 150 are cooled and preserved. In the supply unit 80, two or more types of containers accommodating a plurality of respective types of quality control substances having different concentration levels are preferably cooled and preserved.

Figure 12:
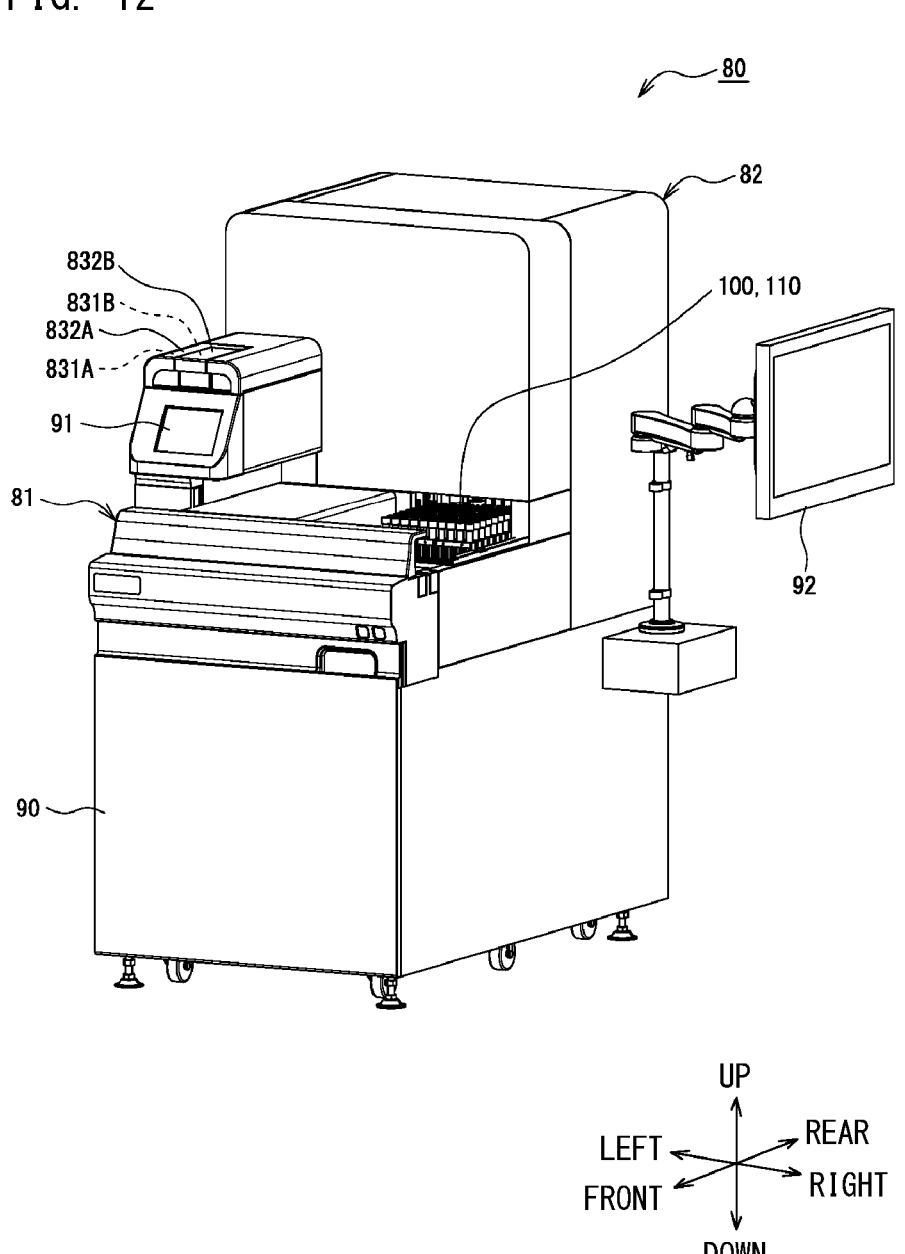
FIG. 12 is a perspective view of a supply unit that composes the specimen analysis system.

FIG. 12 is a perspective view showing the appearance of the supply unit 80. The supply unit 80 includes a first transport path 811 (see FIG. 13 described later) of the conveyor part 81 accessible from outside in order to set a rack thereon by a user. The front surface of the supply unit 80 is provided with a first loading port 831A through which QC specimen containers 150 are set; and a first cover 832A covering the first loading port 831A.

The first cover 832A covers the entirety of the first loading port 831A and is operated to be opened or closed by a user. The first cover 832A has, for example, a left end portion pivotally supported so as to be rotatable with respect to a housing, and is configured to be opened by being rotated leftward. When the first cover 832A is opened, a transfer holder 834 (see FIG. 13 or the like) for holding QC specimen containers 150 and transferring the QC specimen containers 150 into the supply unit 80 is exposed. The QC specimen containers 150 are set in the transfer holder 834 as described in detail later.

The supply unit 80 further includes: a second loading port 831B in which cleaning agent containers 180 (see FIG. 13 or the like) are set; and a second cover 832B covering the second loading port 831B. The second loading port 831B is located to be adjacent to the first loading port 831A rightward. The second cover 832B has, for example, a rear end portion pivotally supported so as to be rotatable with respect to the housing, and is configured to be opened by being rotated upward.

The front surface of the supply unit 80 is provided with the monitor 91. The monitor 91 is, for example, a display device for displaying information, about the state of the supply unit 80, including information about the QC specimen containers 150 having been loaded; information necessary for operation of the supply unit 80; and the like. The monitor 91 is implemented by a touch panel that can be used also as an operation part. The monitor 91 is controlled, in terms of display, by the control part 82a of the supply unit 80, and operation performed through the monitor 91 is inputted to the control part 82a.

Figure 13:
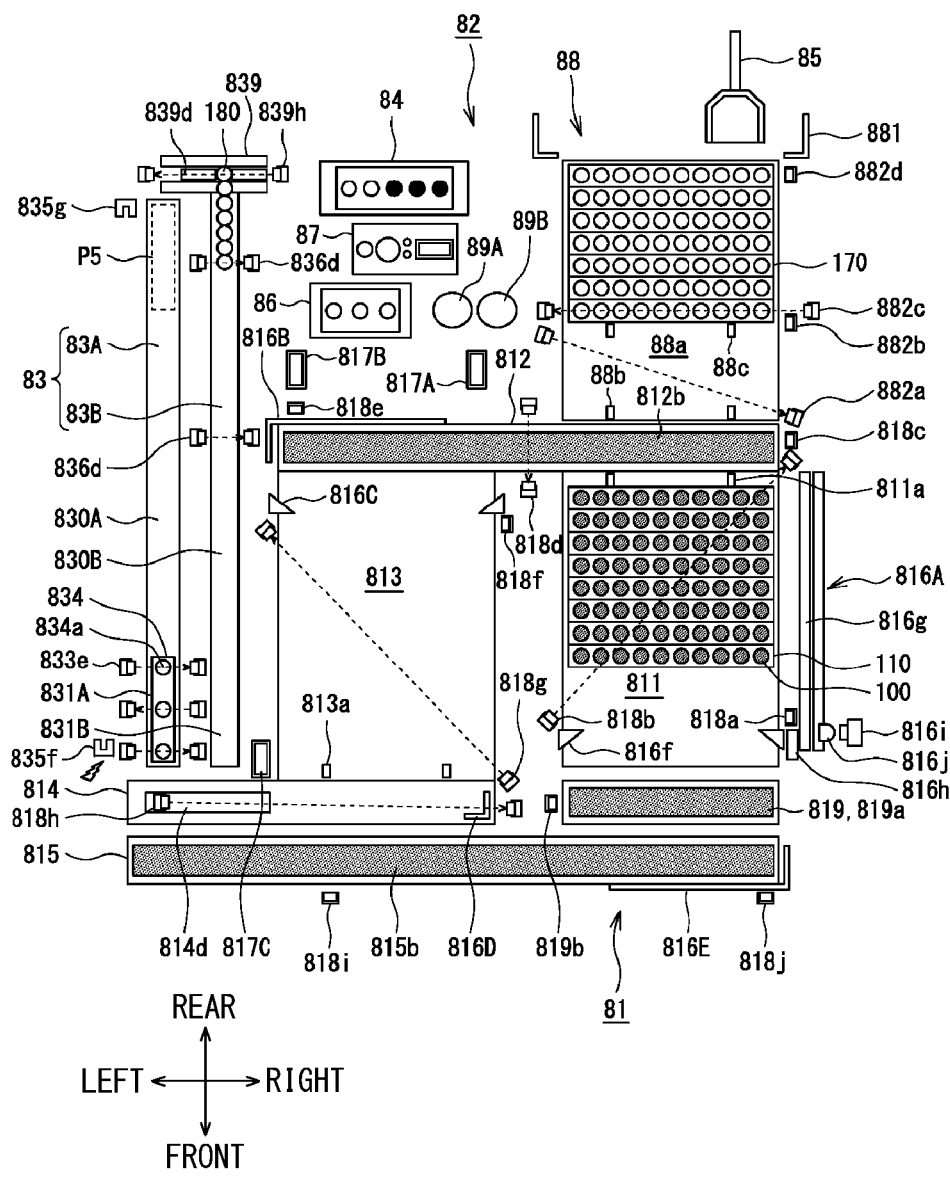
FIG. 13 schematically shows a configuration (internal layout) of the supply unit and shows a state where specimen racks are set in a conveyor part.

FIG. 13 schematically shows an internal layout of the supply unit 80. The supply unit 80 includes the conveyor part 81 and the preservation adjustment unit 82 as main constituents. The preservation adjustment unit 82 includes a loading part 83, the cooling-and-preserving part 84, a transfer part 85, the heating part 86, an information reading part 87, and a rack storing part 88. In the following description, features that are common to transport of a specimen rack 110 and transport of a QC specimen rack 160 will be described by taking transport of a specimen rack 110 as an example. [Conveyor Part 81]

The conveyor part 81 includes a plurality of rack transport paths through which specimen racks 110 are transported inside the supply unit 80. The conveyor part 81 includes the first transport path 811, a second transport path 812, a third transport path 813, and a fourth transport path 814 in order from the upstream side. The four transport paths are connected to each other, and each of specimen racks 110 set on the first transport path 811 is sent to the fourth transport path 814 through the second transport path 812 and the third transport path 813. The fourth transport path 814 is connected to the transport unit 20 of the analyzer AN1, and the specimen rack 110 is transported from the fourth transport path 814 to the first transport path 21 of the transport unit 20.

The conveyor part 81 further includes a fifth transport path 815 which is connected to the third transport path 23 of the transport unit 20 and which receives a QC specimen rack 160 returned through the third transport path 23 of the adjacent transport unit 20. The fifth transport path 815 is disposed on the front side of the conveyor part 81 relative to the fourth transport path 814. The fifth transport path 815 is a rack transport path for returning the QC specimen rack 160 to the preservation adjustment unit 82 and is connected to the first transport path 811.

Figure 59:
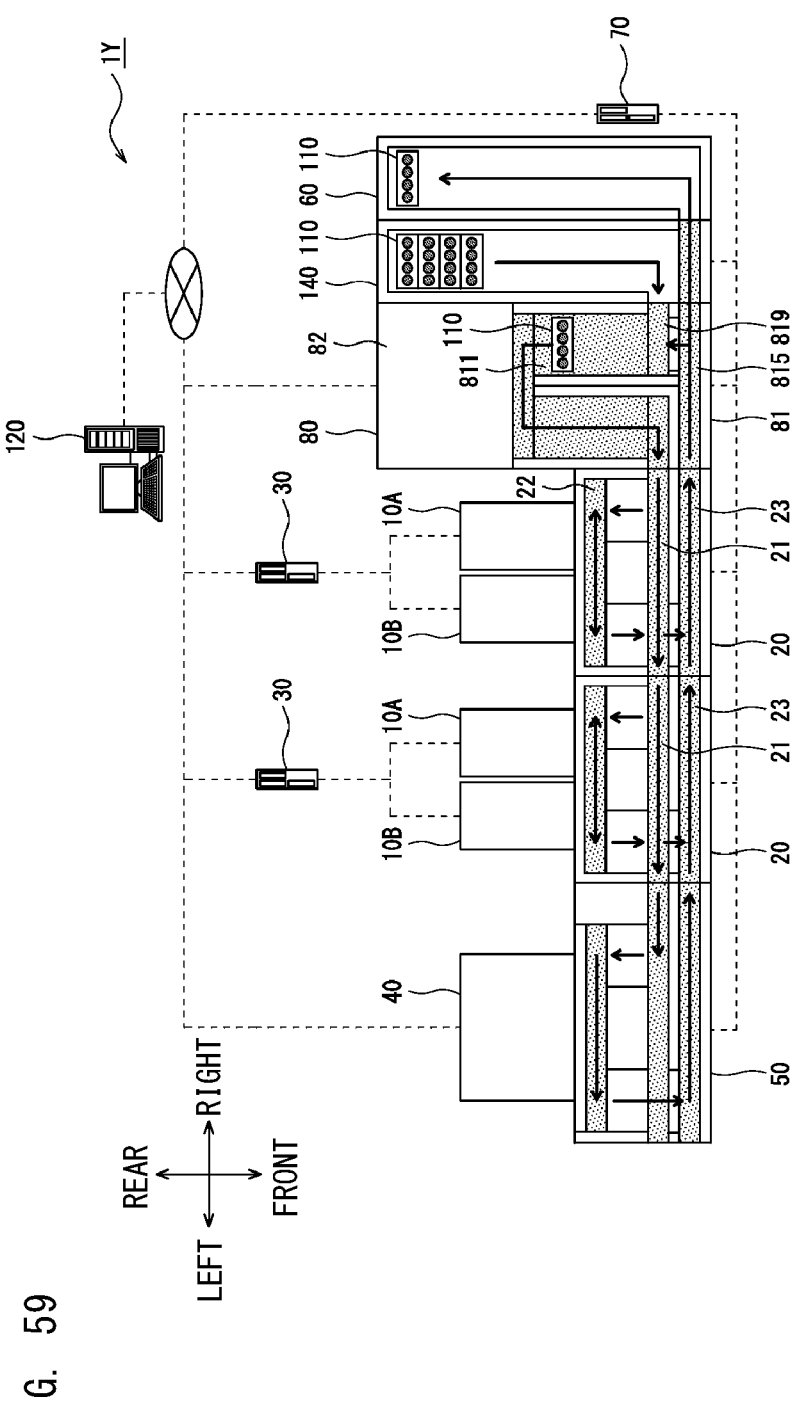
FIG. 59 schematically shows a configuration of a second modification of the specimen analysis system.

In the conveyor part 81, a sixth transport path 819 is provided between the first transport path 811 and the fifth transport path 815. If an additional supply unit is provided as shown in FIG. 59 described later, the sixth transport path 819 is used for carrying a specimen rack 110 in from the additional supply unit. The sixth transport path 819 includes a transport belt 819a for transporting the specimen rack 110 from the right to the left. A sensor 819b for detecting a specimen rack 110 is disposed near the position of the left end of the sixth transport path 819.

The first transport path 811 and the third transport path 813 are disposed to be parallel to each other. The first transport path 811 is a transport path for transporting a specimen rack 110 from the front side to the rear side, and the third transport path 813 is a transport path for transporting the specimen rack 110 from the rear side to the front side. The second transport path 812 is provided to extend in the left-right direction, the right end of the second transport path 812 is located side by side with the rear end of the first transport path 811, and the left end of the second transport path 812 is located side by side with the rear end of the third transport path 813. Such a configuration enables the second transport path 812 to receive a rack sent out from the first transport path 811 and transport the rack in the left-right direction. The third transport path 813 can receive the rack transported through the second transport path 812 to the left end of the second transport path 812.

The first transport path 811 and the third transport path 813 are formed to be long in the front-rear direction and can simultaneously store thereon a plurality of specimen racks 110. The first transport path 811 is provided with a stopper 811a for supplying the specimen racks 110 one by one to the second transport path 812. The stopper 811a is a movable stopper to be moved in the up-'down direction and is disposed on a boundary portion between the first transport path 811 and the second transport path 812.

The stopper 811a is provided to be rotatable in the front-rear direction. If the stopper 811a is rotated from the rear side to the front side, the stopper 811a enters a state of protruding upward. Meanwhile, if the stopper 811a is rotated in the opposite direction, the stopper 811a is stored on the lower side. If a specimen rack 110 existing on the first transport path 811 is transported to the second transport path 812, the stopper 811a enters a state of not protruding from an upper surface. When transport of the rack to the second transport path 812 is completed, the stopper 811a is rotated in the frontward direction so as to be interposed between the specimen rack 110 existing on the second transport path 812 and a specimen rack 110 existing on the first transport path 811. Since the stopper 811a is interposed between the specimen racks 110, the two racks are separated from each other. The third transport path 813 is also provided with a movable stopper 813a which is similar to the stopper 811a and which is disposed on a boundary portion between the third transport path 813 and the fourth transport path 814.

The second transport path 812, the fourth transport path 814, and the fifth transport path 815 extend in the left-right direction and are disposed to be parallel to one another. The second transport path 812 includes a transport belt 812b which can transport a specimen rack 110 to both the left and the right, i.e., from the right to the left and from the left to the right. The fourth transport path 814 is a transport path for transporting a specimen rack 110 to the first transport path 21 of the transport unit 20, and the third transport path 813 is connected to the right end side of the fourth transport path 814. The fifth transport path 815 includes a transport belt 815b which can transport, in the rightward direction, a QC specimen rack 160 carried in from the third transport path 23 of the transport unit 20.

The conveyor part 81 includes: a plurality of rack sending parts each of which relays a specimen rack 110 between the transport paths; and a plurality of sensors each of which detects the position of a specimen rack 110 on any of the transport paths. In addition, the conveyor part 81 includes a first information reading part 817A, a second information reading part 817B, and a third information reading part 817C.

The conveyor part 81 includes a first sending part 816A, a second sending part 816B, a third sending part 816C, a fourth sending part 816D, and a fifth sending part 816E as the rack sending parts. The first sending part 816A includes: an engagement portion 816f to be brought into contact with the front surface of a specimen rack 110 so as to push the specimen rack 110 rearward; and a drive mechanism for moving the engagement portion 816f in the front-rear direction along the first transport path 811. The first sending part 816A is configured to push out the specimen rack 110 from the first transport path 811 to the second transport path 812.

The first sending part 816A includes, as the above drive mechanism, a belt 816g disposed along the first transport path 811, a coupling member 816h coupling together the engagement portion 816f and the belt 816g, and a motor 816i for driving the belt 816g. As the motor 816i, for example, a stepping motor is used. On the first transport path 811, a specimen rack 110 pushed by the engagement portion 816f is stopped by coming into contact with a preceding specimen rack 110 on the rear side. In view of this, the first sending part 816A is provided with a torque sensor 816j which can detect this state.

The first sending part 816A is configured to, when the torque sensor 816j is activated, return the engagement portion 816f to an origin position shown in FIG. 13. The engagement portion 816f is, for example, pivotally supported so as to be rotatable rearward relative to the coupling member 816h so as not to push a subsequent specimen rack 110 frontward even if the engagement portion 816f comes into contact with the specimen rack 110 while the engagement portion 816f is being returned to the origin position. The third sending part 816C has a structure similar to that of the first sending part 816A and is configured to push out a specimen rack 110 from the third transport path 813 to the fourth transport path 814.

The second sending part 816B transports a specimen rack 110 from the second transport path 812 to the third transport path 813, and the fourth sending part 816D transports a specimen rack 110 from the fourth transport path 814 to the first transport path 21 of the transport unit 20. In addition, the fifth sending part 816E transports a QC specimen rack 160 from the fifth transport path 815 to the first transport path 811.

The conveyor part 81 includes sensors 818a and 818b as sensors for detecting a specimen rack 110 on the first transport path 811. In addition, the conveyor part 81 includes: sensors 818c and 818e as sensors for detecting a specimen rack 110 on the second transport path 812; and sensors 818f and 818g as sensors for detecting a specimen rack 110 on the third transport path 813. In addition, the conveyor part 81 includes: a sensor 818h as a sensor for detecting a specimen rack 110 on the fourth transport path 814; and sensors 818i and 818j as sensors for detecting a specimen rack 110 on the fifth transport path 815.

The conveyor part 81 further includes a sensor 818d for detecting a container stored on a rack being moved on the second transport path 812. The sensor 818d is provided to an intermediate portion of the second transport path 812. Presence or absence of any container on the rack being moved on the second transport path 812 is ascertained on the basis of detection information from the sensor 818d. Thus, if no container is detected by the sensor 818d, the rack on the second transport path 812 can be determined to be an empty rack 170. The detection information from the sensor 818d is used to determine a transport destination of the rack being moved on the second transport path 812.

As the sensors 818a, 818c, 818e, 818f, 818i, and 818j, for example, reflection-type optical sensors in each of which a light emitter and a light receiver have been integrated are used. As the sensors 818b, 818d, 818g, and 818h, photo-interrupter-type optical sensors in each of which a light emitter and a light receiver have been separated are used. An opening 814d having a size that does not allow the opening 814d to hinder transport of the specimen rack 110 is formed in the fourth transport path 814. The light emitter of the sensor 818h is disposed below the opening 814d. The light receiver of the sensor 818h is disposed near the position of the right end of the fourth transport path 814.

When a specimen rack 110 is set on the first transport path 811, the specimen rack 110 is detected by the sensor 818b and transported to the position of the right end of the second transport path 812 by the first sending part 816A. The specimen rack 110 carried to the position of the right end of the second transport path 812 is detected by the sensor 818c and transported to the position of the left end of the second transport path 812 by the transport belt 812b. Regarding the specimen rack 110 being moved from the right to the left on the second transport path 812, presence or absence of any container stored on the rack is detected by the sensor 818d provided to the intermediate portion of the second transport path 812.

At the position of the left end of the second transport path 812, the specimen rack 110 is detected by the sensor 818e. The first information reading part 817A and the second information reading part 817B are provided rearward of the second transport path 812. The first information reading part 817A and the second information reading part 817B are provided to be movable in a direction in which these information reading parts approach each other. These information reading parts sequentially read specimen IDs of specimen containers 100 stored on the specimen rack 110. The first information reading part 817A and the second information reading part 817B have, for example, structures similar to that of the information reading part 87 and each have two rollers disposed such that the second transport path 812 is interposed therebetween. FIG. 13 does not show the rollers in order to simplify the drawing.

The first information reading part 817A reads specimen IDs of respective specimen containers 100 corresponding to storing position numbers (shown in FIG. 4) of 6 to 10, and the second information reading part 817B reads specimen IDs of respective specimen containers 100 corresponding to storing position numbers (shown in FIG. 4) of 1 to 5. The first information reading part 817A further reads a rack ID from the machine-readable label 112 on the specimen rack 110.

The third information reading part 817C has, for example, a reader that is a barcode reader, and reads a rack ID. The third information reading part 817C is disposed rearward of the fourth transport path 814.

The specimen rack 110 transported from the second transport path 812 to the third transport path 813 by the second sending part 816B is detected by the sensors 818f and 818g and transported to the fourth transport path 814 by the third sending part 816C. In addition, the specimen rack 110 carried onto the fourth transport path 814 is detected by the sensor 818h and transported to the first transport path 21 of the transport unit 20 by the fourth sending part 816D. As described above, the specimen rack 110 transported to the transport unit 20 is collected in the collection unit 60 disposed on the downstream side of the specimen analysis system 1, and thus, is not returned to the supply unit 80.

A QC specimen rack 160 storing thereon QC specimen containers 150 is supplied from the rack storing part 88 to the position of the right end of the second transport path 812. Then, similar to the specimen rack 110, the QC specimen rack 160 is transported through the second transport path 812, the third transport path 813, and the fourth transport path 814 to the first transport path 21 of the transport unit 20. The QC specimen rack 160 is collected from the third transport path 23 of the transport unit 20 onto the fifth transport path 815. The QC specimen rack 160 carried onto the fifth transport path 815 is detected by the sensor 818*i* and transported to the position of the right end of the fifth transport path 815 by the transport belt 815*b*. The QC specimen rack 160 is detected by the sensor 818*j* at the position of the right end of the fifth transport path 815 and transported to the first transport path 811 by the fifth sending part 816E.

[Loading Part 83]

As shown in FIG. 13, the loading part 83 includes: a first loading part 83A for transferring QC specimen containers 150 from the first loading port 831A to a take-out position P5; and a second loading part 83B for transferring cleaning agent containers 180 from the second loading port 831B to a take-out portion 839. The take-out position P5 is a position at which access by the transfer part 85 is possible and at which the QC specimen containers 150 are taken out. A rear end portion of the first loading part 83A is the take-out position P5. The take-out portion 839 includes a transfer plate 839*d*, a sensor 839*h*, and the like, and is provided at a rear end portion of the second loading part 83B.

The first loading part 83A includes a transfer path 830A, for QC specimen containers 150, which extends along the front-rear direction. Likewise, the second loading part 83B includes a transfer path 830B, for cleaning agent containers 180, which extends along the front-rear direction. In the present embodiment, the transfer paths 830A and 830B are formed to be parallel to each other. Sensors 835*f* and 835*g* for detecting the transfer holder 834 are provided near the first loading port 831A and near the take-out position P5, respectively. As each of the sensors 835*f* and 835*g*, for example, a proximity sensor such as a magnetic sensor or an eddy current sensor is used.

A plurality of sensors 833*e* are disposed in the first loading port 831A of the first loading part 83A. A plurality of sensors 836*d* are disposed along the transfer path 830B of the second loading part 83B. The transfer path 830B of the second loading part 83B is a passage for transferring a cleaning agent container 180 and functions also as a storing part for storing therein a plurality of the cleaning agent containers 180. Therefore, the plurality of sensors 836*d* for detecting cleaning agent containers 180 existing on the transfer path 830B are disposed along the transfer path 830B. The number of the cleaning agent containers 180 stored on the transfer path 830B can be ascertained on the basis of detection information from the plurality of sensors 836*d*.

Figure 14:
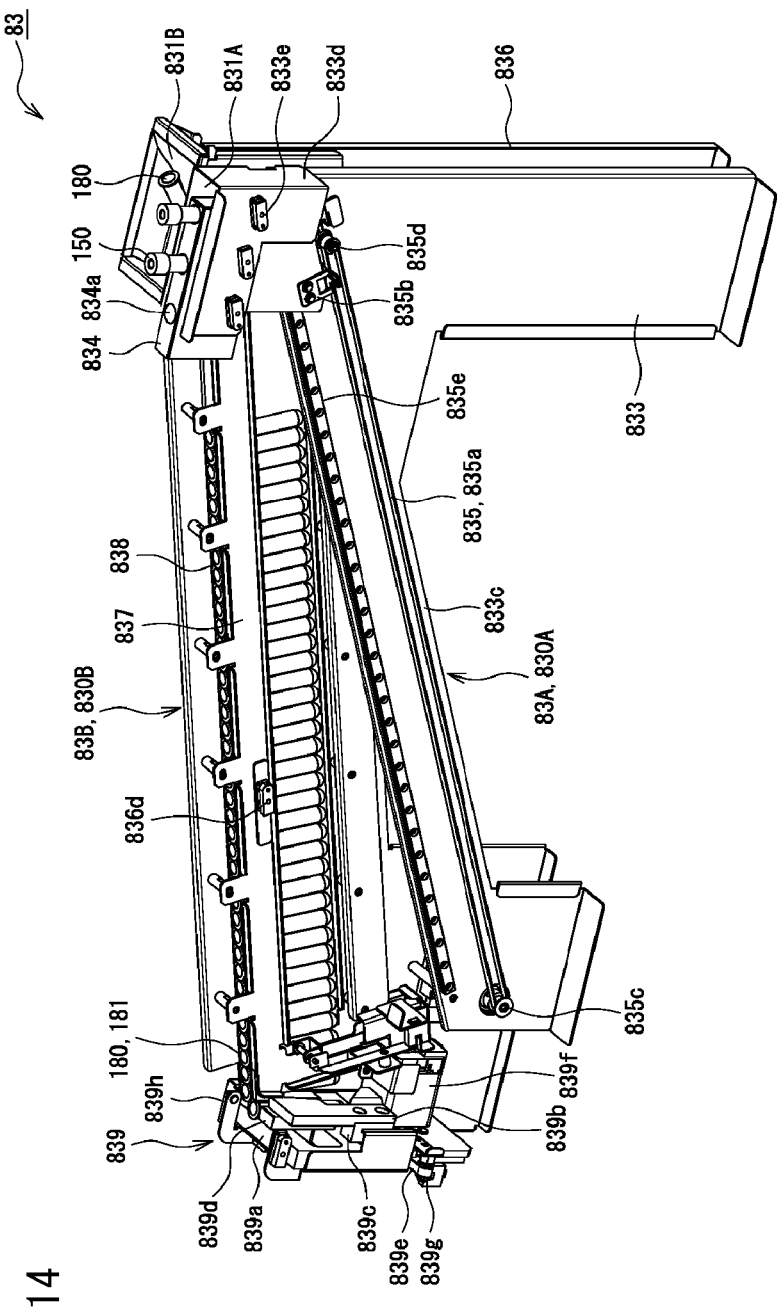
FIG. 14 is a perspective view of a loading part that composes the supply unit, and shows a state where QC specimen containers are set in a loading port.
Figure 15:
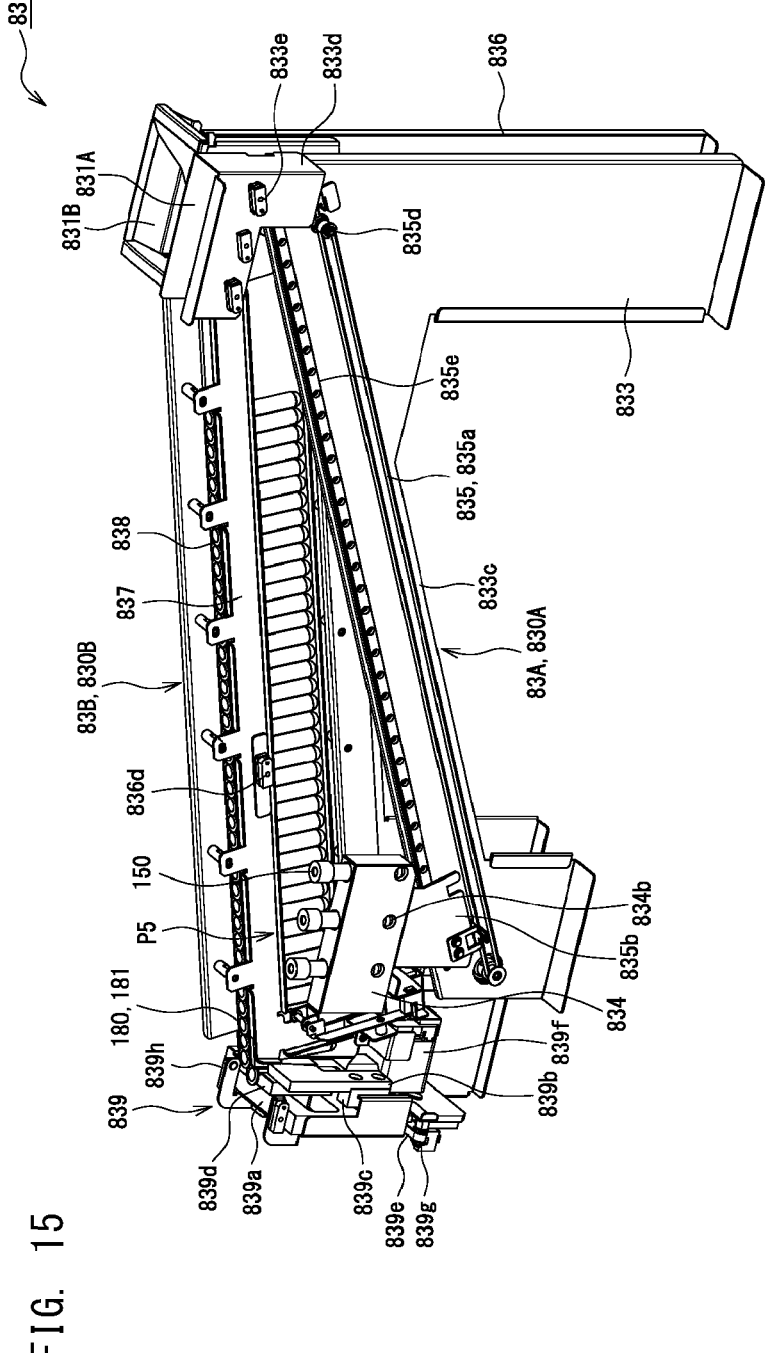
FIG. 15 is a perspective view of the loading part and shows a state where the QC specimen containers are transported into a preservation adjustment unit.

FIG. 14 and FIG. 15 are perspective views of the loading part 83.

FIG. 14 shows a state where the transfer holder 834 is positioned at the first loading part 83A, and FIG. 15 shows a state where the transfer holder 834 is positioned at the take-out position P5. As shown in FIG. 14 and FIG. 15, the loading part 83 is a device in which the first loading part 83A and the second loading part 83B have been integrated, and includes frames 833 and 836 for forming the transfer paths

830A and 830B tilted such that the degree of the tilt increases from the front side toward the rear side.

The first loading part 83A includes the transfer holder 834 and a drive mechanism 835 for moving the transfer holder 834 in the front-rear direction. The transfer holder 834 is provided with a plurality of storing portions 834*a* each of which can store therein one QC specimen container 150. The transfer holder 834 is formed in the shape of a block as the entirety thereof and has an upper surface in which the plurality of storing portions 834*a* are formed as holes into which QC specimen containers 150 can be inserted. Each of the storing portions 834*a* is preferably formed to have such a depth that, in a state where a QC specimen container 150 is inserted thereinto, an upper portion of the tube 101 thereof to be gripped by each of arms 85*b* of the transfer part 85 protrudes from the upper surface of the transfer holder 834.

Through-holes 834*b* in communication with the storing portions 834*a* are formed in side surfaces of the transfer holder 834. The through-holes 834*b* are formed in both side surfaces of the transfer holder 834 side by side with each other in the left-right direction. In the present embodiment, three storing portions 834*a* exist side by side in a row in the front-rear direction, and, for each of the storing portions 834*a*, one through-hole 834*b* is formed on the left side thereof and one through-hole 834*b* is formed on the right side thereof. That is, a total of six through-holes 834*b* are formed. A light emitter and a light receiver that compose each of the sensors 833*e* are disposed on both side surfaces of a frame body 833*d* such that light passes through the inside of the corresponding storing portion 834*a* via the corresponding through-holes 834*b*. Consequently, in the first loading port 831A, it is possible to detect presence or absence of a QC specimen container 150 in any of the storing portions 834*a*.

The drive mechanism 835 includes: an endless belt 835*a* extending along a tilted portion 833*c*; a coupling member 835*b* connecting together the transfer holder 834 and the belt 835*a*; a motor 835*c* including a rotation shaft from which the belt 835*a* is suspended; a pulley 835*d* from which the belt 835*a* is suspended; and a rail 835*e* which guides movement of the transfer holder 834. The transfer holder 834 is movably attached to the frame 833 via the drive mechanism 835.

The transfer holder 834 is configured to be automatically moved from the first loading port 831A to the take-out position P5 when a QC specimen container 150 is stored in at least one of the storing portions 834*a*; and the first cover 832A is closed. When the transfer holder 834 arrives at the take-out position P5, the QC specimen container 150 is taken out from the storing portion 834*a* and transferred to the information reading part 87 by the transfer part 85. When all QC specimen containers 150 are taken out from the transfer holder 834, the transfer holder 834 is automatically moved to the first loading port 831A, for example.

As described above, the first cover 832A covering the first loading port 831A is locked so as not to be opened when the transfer holder 834 does not exist at the position (also referred to as an origin position) shown in FIG. 14. When the transfer holder 834 arrives at the first loading port 831A and is detected by the sensor 835*f*, the first cover 832A is unlocked.

The second loading part 83B includes an opposed plate 837 attached with a gap between the opposed plate 837 and the frame 836 such that cleaning agent containers 180 can be sandwiched in the gap. A rail 838 which supports flanges 181 of the cleaning agent containers 180 in a state where the cleaning agent containers 180 are movable in a sliding manner, is provided between the frame 836 and the opposed plate 837. Each of the cleaning agent containers 180 is, in a state of being hung with the flange 181 thereof being supported by the rail 838, moved in a sliding manner on the transfer path 830B and stored on the transfer path 830B.

The take-out portion 839 includes the transfer plate 839d which is moved in the left-right direction in a state of holding a cleaning agent container 180. The take-out portion 839 is configured to cause the cleaning agent container 180 to protrude upward when the transfer plate 839d is moved to the left end side of the take-out portion 839. In addition, the take-out portion 839 includes: two support plates 839a and 839b between which the transfer plate 839d is movably sandwiched; a tilted block 839c fixed to lower portions of the support plates 839a and 839b; and a drive mechanism for the transfer plate 839d. The take-out portion 839 is provided with a belt 839e, a motor 839f, a pulley 839g, and the like as the drive mechanism.

The transfer plate 839d has a plate center portion at which a holder capable of storing therein a cleaning agent container 180 is formed. When the transfer plate 839d is moved in the leftward direction in a state of holding a cleaning agent container 180, a lower end portion of the cleaning agent container 180 comes into contact with the upper surface of the tilted block 839c. The upper surface of the tilted block 839c is tilted such that the height thereof increases leftward. Thus, the cleaning agent container 180 is pushed upward along the upper surface of the tilted block 839c so as to enter a state where the cleaning agent container 180 can be gripped by the transfer part 85.

The take-out portion 839 is provided with the sensor 839h for detecting upward protrusion of a cleaning agent container 180. A light emitter and a light receiver that compose the sensor 839h are attached to the support plate 839a and disposed such that an optical axis extending along the left-right direction is formed on the transfer plate 839d. If upward protrusion of a cleaning agent container 180 is detected by the sensor 839h, the cleaning agent container 180 is transferred from the take-out portion 839 to an empty rack 170 in the rack storing part 88 by the transfer part 85.

[Cooling-and-Preserving Part 84]

Figure 16:
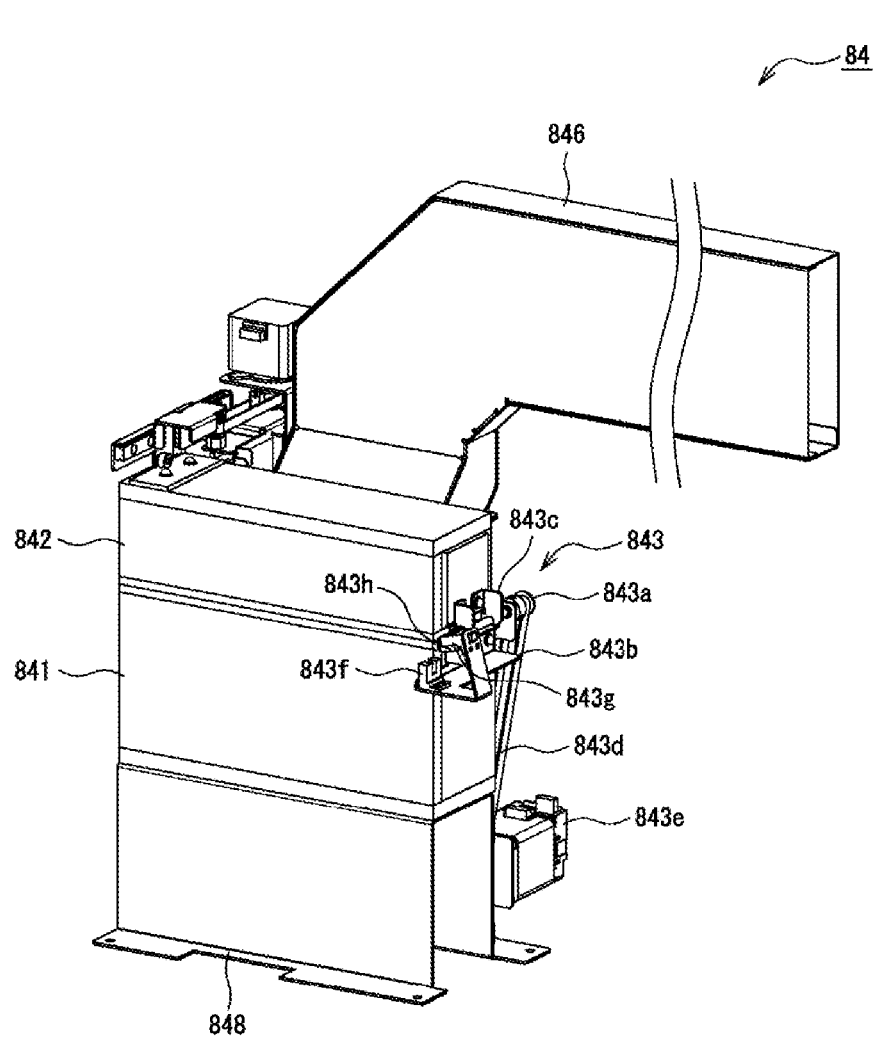
FIG. 16 is a perspective view of a cooling-and-preserving part that composes the supply unit, and shows a state where a cover is closed.
Figure 17:
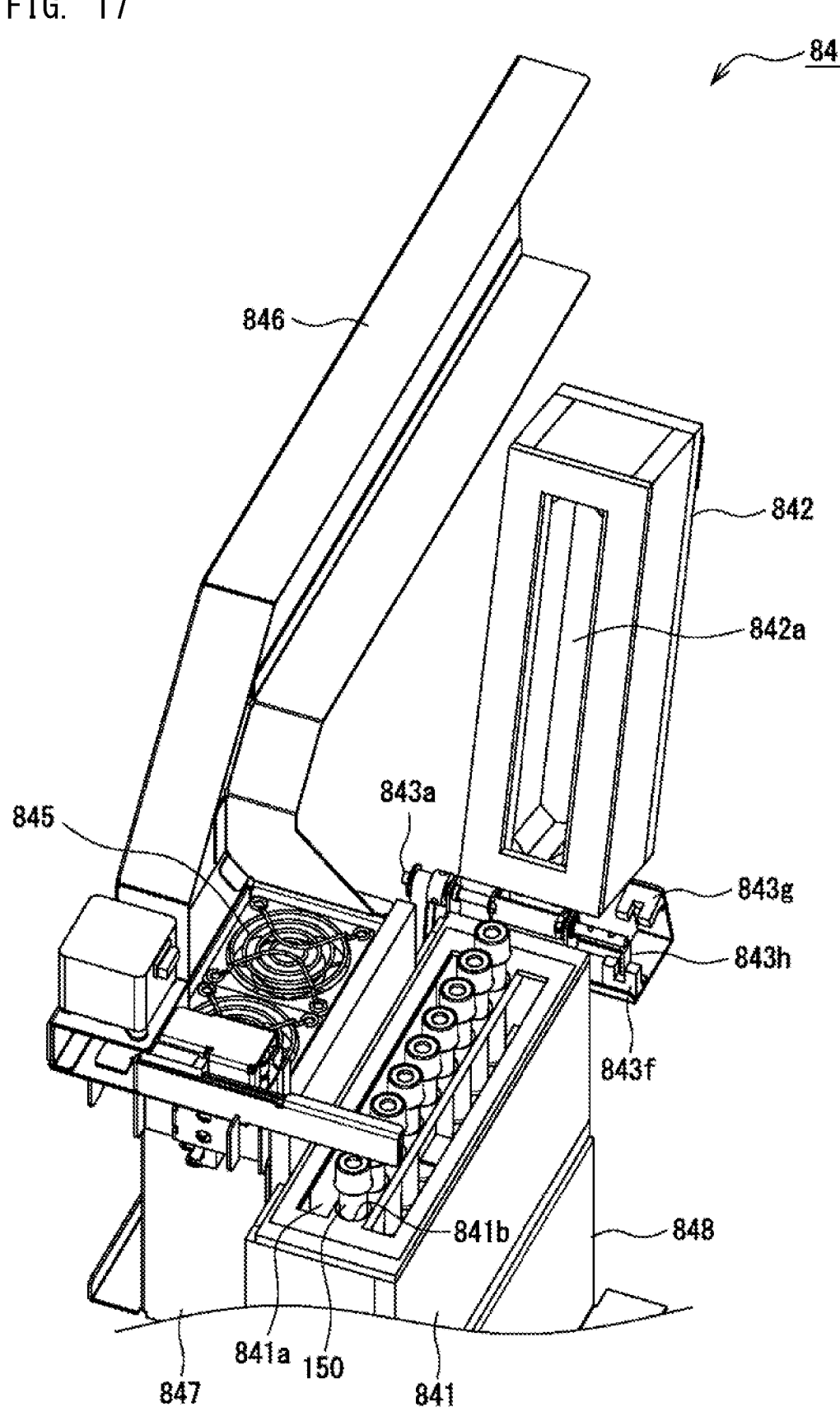
FIG. 17 is a perspective view of the cooling-and-preserving part and shows a state where the cover is opened.

FIG. 16 and FIG. 17 are perspective views of the cooling-and-preserving part 84. FIG. 16 shows a state where a cover 842 of the cooling-and-preserving part 84 is closed, and FIG. 17 shows a state where the cover 842 of the cooling-and-preserving part 84 is opened. In addition, FIG. 17 shows a state where a portion of an air intake duct 846 is detached. The cooling-and-preserving part 84 is a storing chamber for preserving QC specimen containers 150 and has a function of cooling the QC specimen containers 150. The cooling-and-preserving part 84 includes: a cooling-and-preserving part body 841 which has the shape of a block and in which a cooling-and-preserving chamber 841a for cooling and preserving QC specimen containers 150 is formed; the cover 842 which covers the cooling-and-preserving chamber 841a; and an opening/closing mechanism 843 for the cover 842. The cooling-and-preserving part body 841 and the cover 842 have, in a plan view, rectangular shapes that are long in the left-right direction. The cooling-and-preserving part 84 includes a pedestal 848 on which the cooling-and-preserving part body 841 is placed.

For the cooling-and-preserving part 84, the temperature of the cooling-and-preserving chamber 841a, opening/closing of the cover 842, and the like are controlled by the control part 82a. The temperature of the cooling-and-preserving chamber 841a is, for example, 2° C. to 8° C. and is constantly controlled to be a substantially fixed temperature.

Cooling in the cooling-and-preserving part 84 is continued even after the specimen analysis system 1 is shut down. The cover 842 is automatically opened or closed at a timing of taking in or out a QC specimen container 150.

The cooling-and-preserving part body 841 includes a plurality of storing portions 841b which are located inside the cooling-and-preserving chamber 841a covered with the cover 842 and each of which stores therein one QC specimen container 150 which is in an upright state. Each of the storing portions 841b is a hole that is opened upward and that allows a QC specimen container 150 to be inserted thereinto. In the example shown in FIG. 17, nine storing portions 841b are formed side by side in a row in the left-right direction. The storing portion 841b is formed to have such a depth that, in a state where a QC specimen container 150 is inserted thereinto, the upper portion of the tube 101 thereof to be gripped by the arm 85b of the transfer part 85 protrudes from the upper surface of the cooling-and-preserving part body 841.

For the cooling-and-preserving part body 841, as cooling means, a vapor-compression cooling device including a compressor, or the like may be used, but in the present embodiment, a Peltier element is embedded from the view-point of device downsizing and the like. The cooling-and-preserving part body 841 is provided with fans 845 as heat dissipation means for the Peltier element. In addition, the cooling-and-preserving part body 841 is provided with a to-be-cooled block that is made of a metal and that is cooled by the Peltier element; heat dissipation fins; a temperature sensor; and the like.

The cover 842 closes an opening of the cooling-and-preserving chamber 841a such that the inside of the cooling-and-preserving chamber 841a is kept airtight and kept at a low temperature. The cover 842 is formed in the shape of a block as is the cooling-and-preserving part body 841, and has a recess 842a formed in an inner surface, of the cover 842, that faces the cooling-and-preserving part body 841 side. The inner surface of the cover 842 has a peripheral edge portion that is brought into contact with the upper surface of the cooling-and-preserving part body 841 and that is flat; and a center portion in which the recess 842a is formed along the longitudinal direction of the cover 842. The peripheral edge portion of the inner surface of the cover 842 may be mounted with a packing made of rubber.

The cover 842 is configured to be opened by being rotated rightward by the opening/closing mechanism 843 provided at a right end portion of the cooling-and-preserving part body 841.

The opening/closing mechanism 843 includes: a rotation shaft 843a; a bearing member 843b fixed to the right end portion of the cooling-and-preserving part body 841 and rotatably supporting the rotation shaft 843a; a coupling member 843c connecting together the rotation shaft 843a and a right end portion of the cover 842; and a drive mechanism for rotating the rotation shaft 843a. The opening/closing mechanism 843 is provided with, as the drive mechanism for the rotation shaft 843a, an endless belt 843d suspended from the rear end of the rotation shaft 843a and a motor 843e which drives the belt 843d and which has a rotation shaft from which the belt 843d is suspended. The rotation shaft 843a extends in the front-rear direction. The motor 843e is fixed to the pedestal 848.

The opening/closing mechanism 843 includes: two sensors 843f and 843g attached to the bearing member 843b; and a metal sheet 843h fixed to the front end of the rotation shaft 843a. A suitable example of each of the sensors 843f and 843g is a proximity sensor such as a magnetic sensor or an eddy current sensor. The sensors 843*f* and 843*g* are configured to, for example, be able to detect opening/closing of the cover 842 by detecting approach of the metal sheet 843*h* moved according to rotation of the rotation shaft 843*a*. In the present embodiment, the sensor 843*f* detects an opened state of the cover 842, and the sensor 843*g* detects a closed state of the cover 842.

Each of the fans 845 is heat dissipation means for dissipating heat from the Peltier element and is disposed rearward of the cooling-and-preserving part body 841. The air intake duct 846 and an exhaust duct 847 are connected to the fan 845, the air intake duct 846 extending in the rightward direction is provided above the fan 845, and the exhaust duct 847 extending in the downward direction is provided below the fan 845. When the fan 845 is activated, air is suctioned from a suction port of the air intake duct 846 and is discharged from an exhaust port of the exhaust duct 847 through a heat generating part.

[Transfer Part 85]

Figure 18:
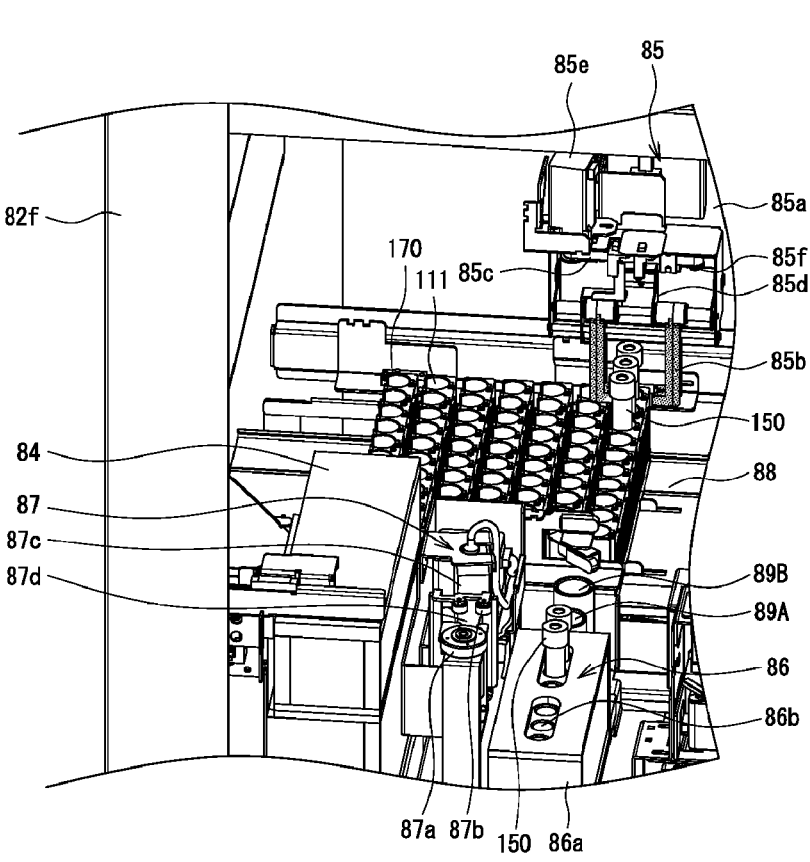
FIG. 18 is a perspective view showing an internal structure of the supply unit.

As shown in FIG. 18, the transfer part 85 includes: a base portion 85*a* having the shape of a sheet that is long in the up-down direction; and a pair of arms 85*b* which grip a QC specimen container 150. The base portion 85*a* is provided such that a sheet surface thereof extends along the up-down direction and the front-rear direction. The pair of arms 85*b* are disposed at an interval in the front-rear direction and are movable in a direction in which the arms 85*b* approach each other and in a direction in which the arms 85*b* become apart from each other. When the pair of arms 85*b* approach each other, a QC specimen container 150 is gripped. Meanwhile, when the pair of arms 85*b* become apart from each other, the QC specimen container 150 is released.

The transfer part 85 is configured to take out each of QC specimen containers 150 from the transfer holder 834 in the first loading part 83A and transfer the QC specimen container 150 to the cooling-and-preserving part 84 via the information reading part 87. In addition, the transfer part 85 takes out any of the QC specimen containers 150 from the cooling-and-preserving part 84 and transfers the QC specimen container 150 to the rack storing part 88 via the heating part 86. The transfer part 85 returns, to the cooling-and-preserving part 84, a QC specimen container 150 that has been collected in the rack storing part 88 after measurement for the QC specimen container 150 in any of the measurement units has been ended. Alternatively, the transfer part 85 puts the QC specimen container 150 having been used into a first collection part 89A and disposes of the QC specimen container 150.

In addition, the transfer part 85 is configured to take out each of cleaning agent containers 180 from the second loading part 83B and transfer the cleaning agent container 180 to the rack storing part 88. The cleaning agent container 180 is taken out from the take-out portion 839 (see FIG. 13 or the like) of the second loading part 83B and directly transferred to a rack at the front end of the rack storing part 88. Regarding a cleaning agent container 180 having been used and collected in the rack storing part 88 after cleaning in any of the measurement units with the cleaning agent container 180 has been ended, the transfer part 85 puts the cleaning agent container 180 into a second collection part 89B and disposes of the cleaning agent container 180.

The base portion 85*a* is provided with, as a drive mechanism for the arms 85*b*, an endless belt 85*c* extending in the front-rear direction, a pair of coupling members 85*d* coupling together the pair of arms 85*b* and the belt 85*c*, a motor 85*e* including a rotation shaft from which the belt 85*c* is suspended, and a pulley 85*f* from which the belt 85*c* is suspended. The pair of arms 85*b* are movably attached to the base portion 85*a* via the drive mechanism. As the motor for example, a stepping motor is used.

The pair of arms 85*b* are movable also in three directions which are the front-rear direction, the left-right direction, and the up-down direction. The transfer part 85 includes: a first drive mechanism for moving, in the front-rear direction, the base portion 85*a* to which the arms 85*b* are attached; and a second drive mechanism for moving the base portion 85*a* in the left-right direction. The base portion 85*a* is supported in a state where an upper end portion thereof is engaged with the first drive mechanism and the second drive mechanism such that the base portion 85*a* is hung; and the base portion 85*a* is movable to the front or the rear and to the left or the right with respect to a frame 82*f*. In addition, the base portion 85*a* is provided with a third drive mechanism 853 (see FIG. 19 described later) for moving, in the up-down direction, the pair of arms 85*b* and the drive mechanism for the arms 85*b* including the belt 85*c* and the like.

The pair of arms 85*b* grip, for example, the upper portion of the tube 101 of a QC specimen container 150. The QC specimen container 150 includes the cap 102 having a larger outer diameter than the tube 101, and thus, by gripping the upper portion of the tube 101 by the arms 85*b*, the arms 85*b* are caught by the cap 102 so that the QC specimen container 150 can be more assuredly prevented from falling off. Meanwhile, each of cleaning agent containers 180 has the flange 181 which protrudes radially outward and which is formed at an upper end portion of the container, and thus the pair of arms 85*b* grip a portion, of the cleaning agent container 180, that is located slightly below the flange 181.

[Heating Part 86]

As shown in FIG. 18, the heating part 86 includes: a heating part body 86*a* having the shape of a block; and a storing portion 86*b* for storing therein a QC specimen container 150. The storing portion 86*b* is a hole that is opened upward and that allows the QC specimen container 150 to be inserted thereinto. A plurality of the storing portions 86*b* are formed in the heating part body 86*a*. Each of the storing portions 86*b* stores therein one QC specimen container 150 which is in an upright state. In the example shown in FIG. 18, six storing portions 86*b* are formed side by side in a row in the left-right direction.

The storing portion 86*b* is preferably formed to have such a depth that, when a QC specimen container 150 is inserted thereinto, the upper portion of the tube 101 thereof to be gripped by the arms 85*b* of the transfer part 85 protrudes from the upper surface of the heating part body 86*a*. The heating part 86 has no cover, and no large projection exists on the upper surface of the heating part body 86*a*. The number, the arrangement, and the like of the storing portions 86*b* are not particularly limited, and, for example, the storing portions 86*b* may be disposed in a staggered manner.

As described above, the heating part 86 has a function of heating QC specimen containers 150 cooled and preserved in the cooling-and-preserving part 84; and adjusting the temperature of the quality control substance accommodated in each of the QC specimen containers 150 to the measurement temperature for the measurement units. The measurement temperature is 23° C.±3° C. A suitable temperature for cooling and preserving is 2° C. to 8° C., and thus the heating part 86 needs to increase the temperature of the quality control substance by about, for example, 12° C. to 24° C. The heating part 86 heats each of the QC specimen containers 150 inserted into the storing portions 86*b* such that the temperature of the quality control substance in the QC specimen container 150 becomes the measurement temperature.

The heating part 86 includes a heater that generates heat by power. The heater is preferably an aluminum block heater. In the aluminum block heater, an aluminum block is used as a heating medium. Thus, as compared to a case where a liquid medium is used, the aluminum block heater does not allow any container to be stained, and thus is suitable. In addition, the aluminum block has high heat transfer properties, and thus the time required for temperature increase can also be shortened. Since the heater is provided, the temperature can be swiftly adjusted even in an environment in which the room temperature is low.

The setting temperature of the heater is set to a temperature that is higher than the measurement temperature within such a range that no quality control substance degrades. In a preferable example, the setting temperature is set to 23° C.±3° C. The heating part 86 may include air blowing means such as a fan for blowing air to each of the storing portions 86*b*, and heating of a quality control substance may be performed by blowing air to the QC specimen container 150 by the air blowing means. The heating part 86 may include the heater and the fan.

[Information Reading Part 87]

As shown in FIG. 18, the information reading part 87 includes: rollers 87*a* and 87*b* disposed such that a storing portion 87*d* for a QC specimen container 150 is interposed therebetween; and a reader 87*c* which reads a QC specimen ID from the machine-readable label 103 of the QC specimen container 150. At least one of the rollers 87*a* and 87*b* is configured to be movable in a direction of mutual approach and to be rotated. In the information reading part 87, at least one of the rollers 87*a* and 87*b* is driven so as to rotate a QC specimen container 150 disposed in the storing portion 87*d*, and a QC specimen ID thereof is read by the reader 87*c*. The reader 87*c* is, for example, a barcode reader.

Each of QC specimen containers 150 is transferred from the first loading part 83A to the information reading part 87, and the QC specimen container 150 having a QC specimen ID read by the information reading part 87 is transferred to and cooled and preserved in the cooling-and-preserving part 84. The information reading part 87 transmits information about the read QC specimen ID to the control part 82*a*, and the control part 82*a* executes a process regarding quality control by using the information. As described in detail later, the control part 82*a* uses the QC specimen IDs to manage the storing positions for the QC specimen containers 150 in the cooling-and-preserving part 84 and enable selection of a QC specimen container 150 thereamong for use in quality control measurement.

[Rack Storing Part 88]

Figure 19:
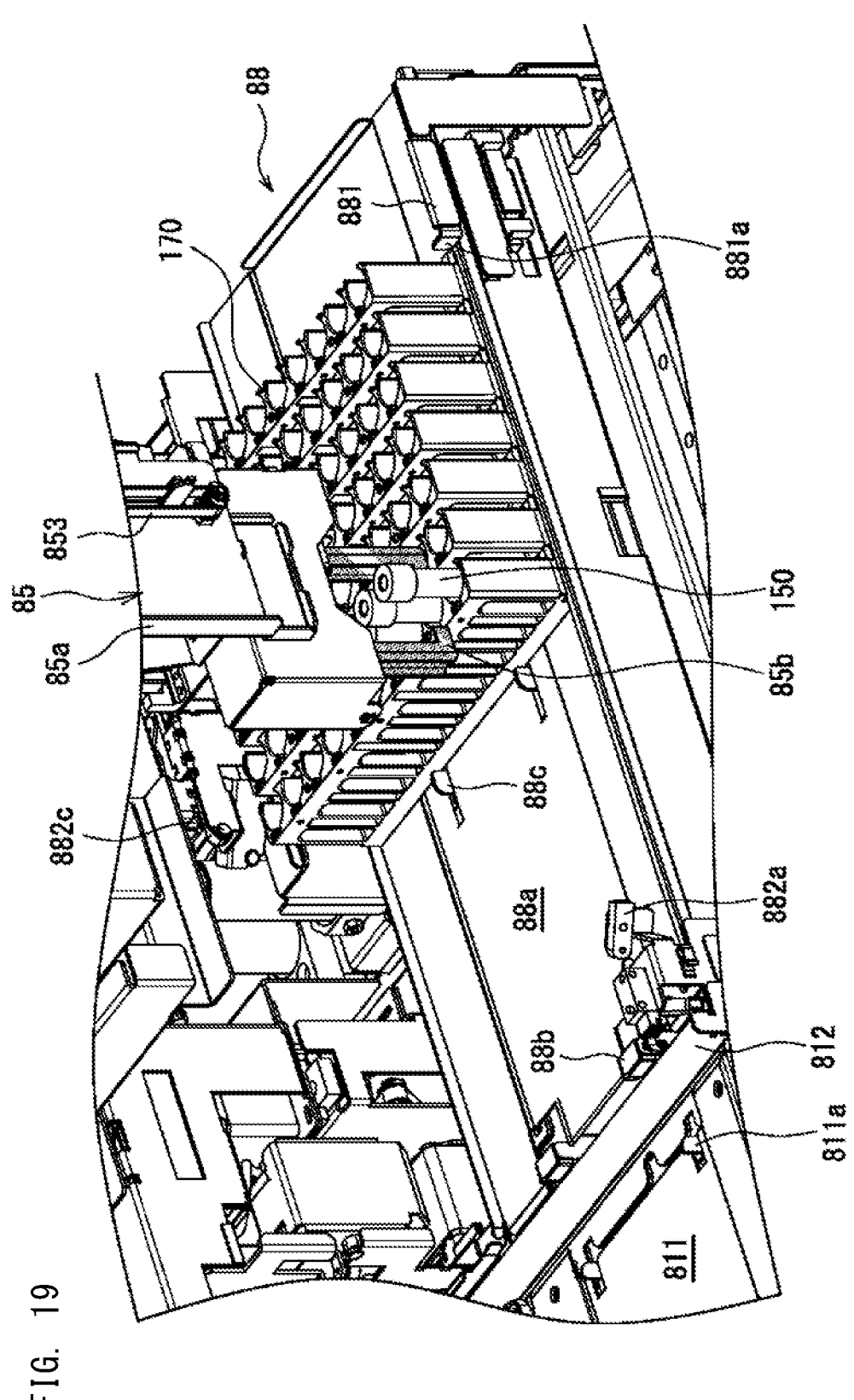
FIG. 19 is a perspective view showing the internal structure of the supply unit and shows a rack storing part as seen from a front side.
Figure 20:
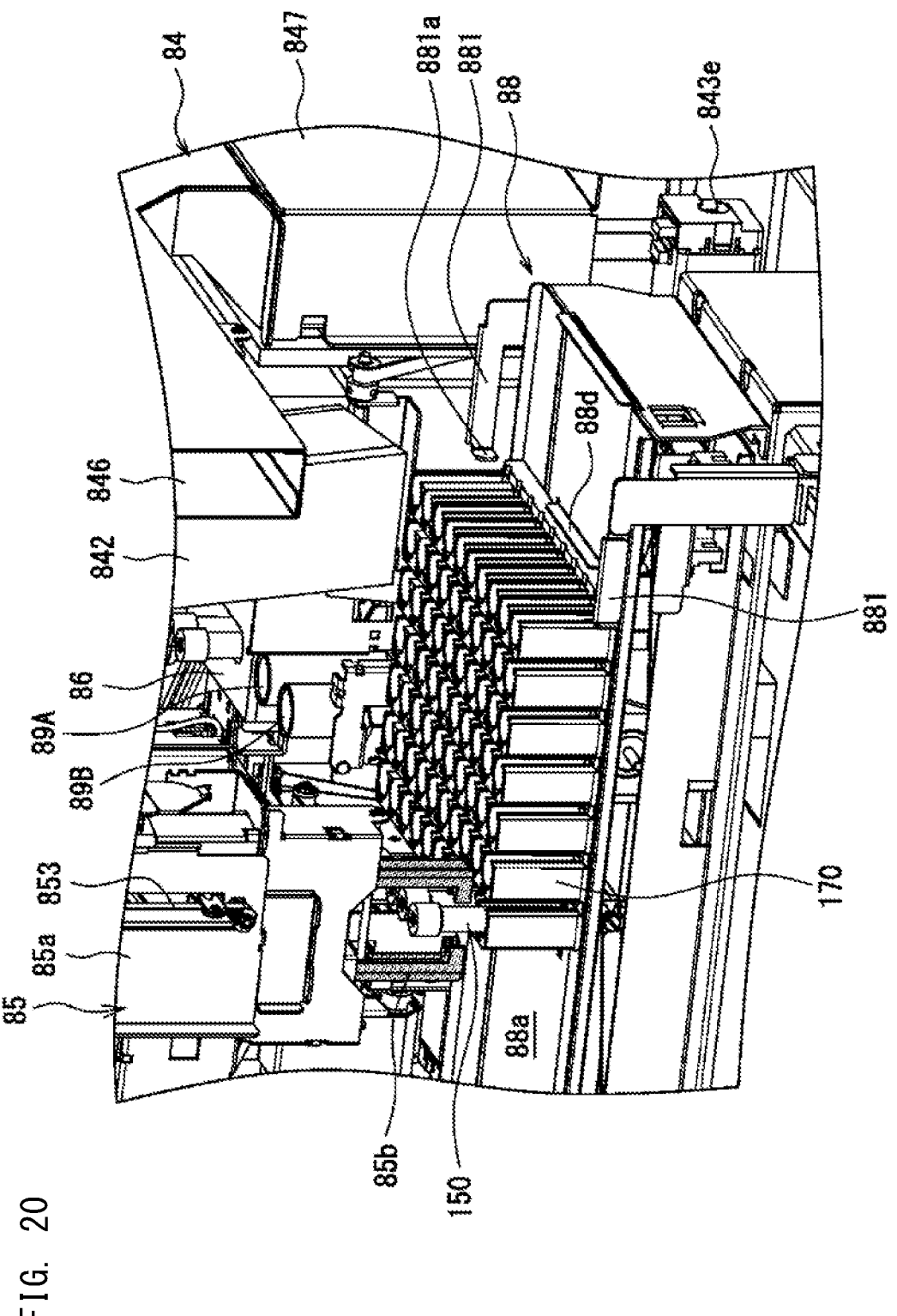
FIG. 20 is a perspective view showing the internal structure of the supply unit and shows the rack storing part as seen from a rear side.

FIG. 19 and FIG. 20 are each a perspective view showing the internal structure of the preservation adjustment unit 82 and each show the rack storing part 88 in an enlarged manner. The rack storing part 88 includes a transport path 88*a* through which an empty rack 170 can be transported in the front-rear direction and on which a plurality of the empty racks 170 can be stored. The transport path 88*a* extends to be long in the front-rear direction at a right end portion of the preservation adjustment unit 82. In the present embodiment, up to seven empty racks 170 can be stored on the transport path 88*a*.

The transport path 88*a* is provided with three stoppers 88*b*, 88*c*, and 88*d* in order from the front side. The stopper 88*c* is disposed at a center portion in the front-rear direction of the transport path 88*a* and restricts frontward movement of the empty racks 170 stored on the transport path 88*a*. The stopper 88*d* is disposed on the rear end side of the transport path 88*a* relative to the stopper 88*c* and restricts rearward movement of the empty racks 170. The region interposed between the stoppers 88*c* and 88*d* is a region in which the empty racks 170 can be stored. In the present embodiment, the interval in the front-rear direction between the stoppers 88*c* and 88*d* corresponds to the total length in the front-rear direction of the seven empty racks 170.

As described above, the rack storing part 88 is also a place in which QC specimen containers 150 and cleaning agent containers 180 are stored on empty racks 170. Each of the QC specimen containers 150 and the cleaning agent containers 180 is stored on a front-end rack that is positioned on the frontmost side among the plurality of empty racks 170. Thus, a space serving as a passage for the transfer part 85 is ensured above the front-end rack on the transport path 88*a* and the vicinity of the front-end rack. The position of the front-end rack is determined by the stopper 88*c* for stopping frontward movement of the empty racks 170. In the present embodiment, the front-end rack is located side by side with the first collection part 89A, the second collection part 89B, and the heating part 86 in the left-right direction.

The rack storing part 88 includes a transport arm 881 for transporting empty racks 170, QC specimen racks 160 storing thereon QC specimen containers 150, and racks storing thereon cleaning agent containers 180 (hereinafter, referred to as "cleaning agent racks") in the front-rear direction. The transport arm 881 can push the empty racks 170 and the like frontward and draw the empty racks 170 and the like rearward. The rack storing part 88 is provided with a pair of the transport arms 881 such that the transport path 88*a* is interposed therebetween from both left and right sides. In addition, claws 881*a* protruding to the inner side of the transport path 88*a* are formed at the distal ends of the pair of transport arms 881.

Figure 21:
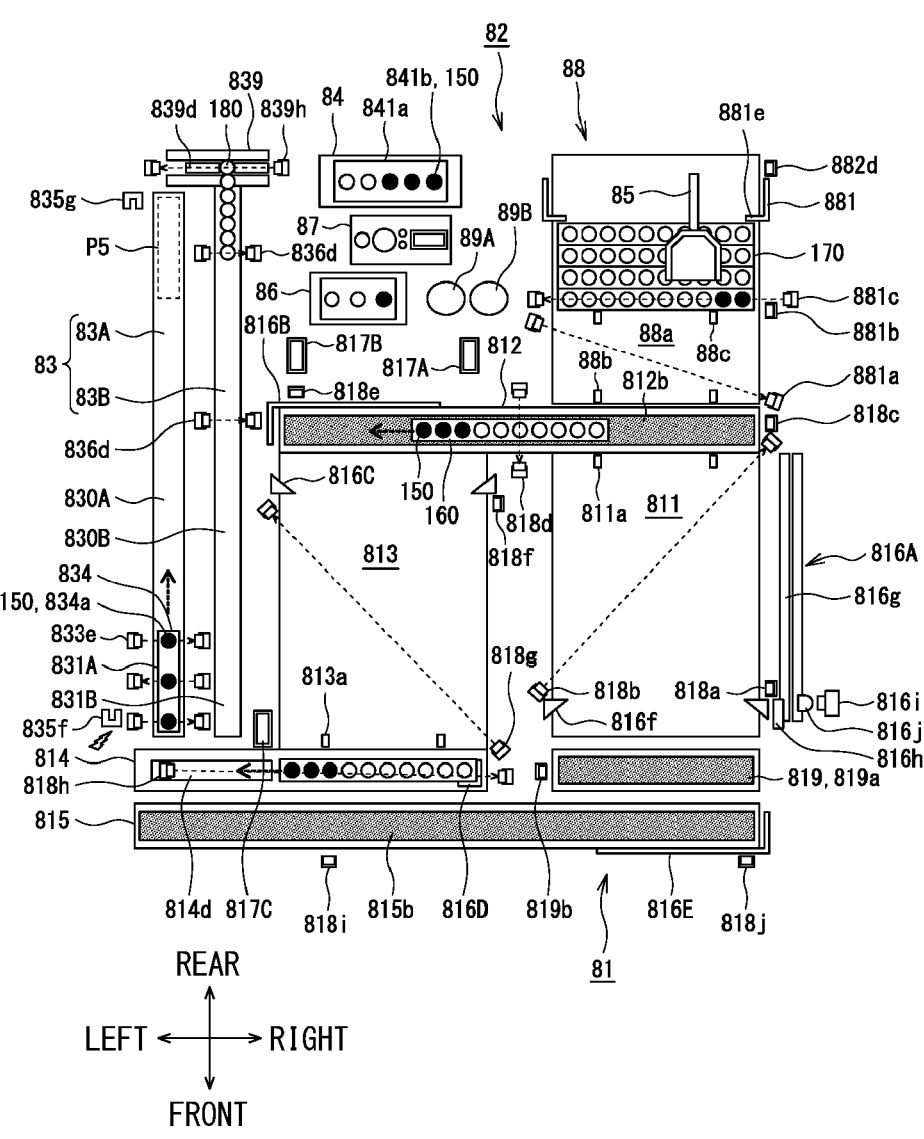
FIG. 21 schematically shows the configuration (internal layout) of the supply unit according to an exemplary embodiment and shows a situation in which a QC specimen rack is supplied.
Figure 22:
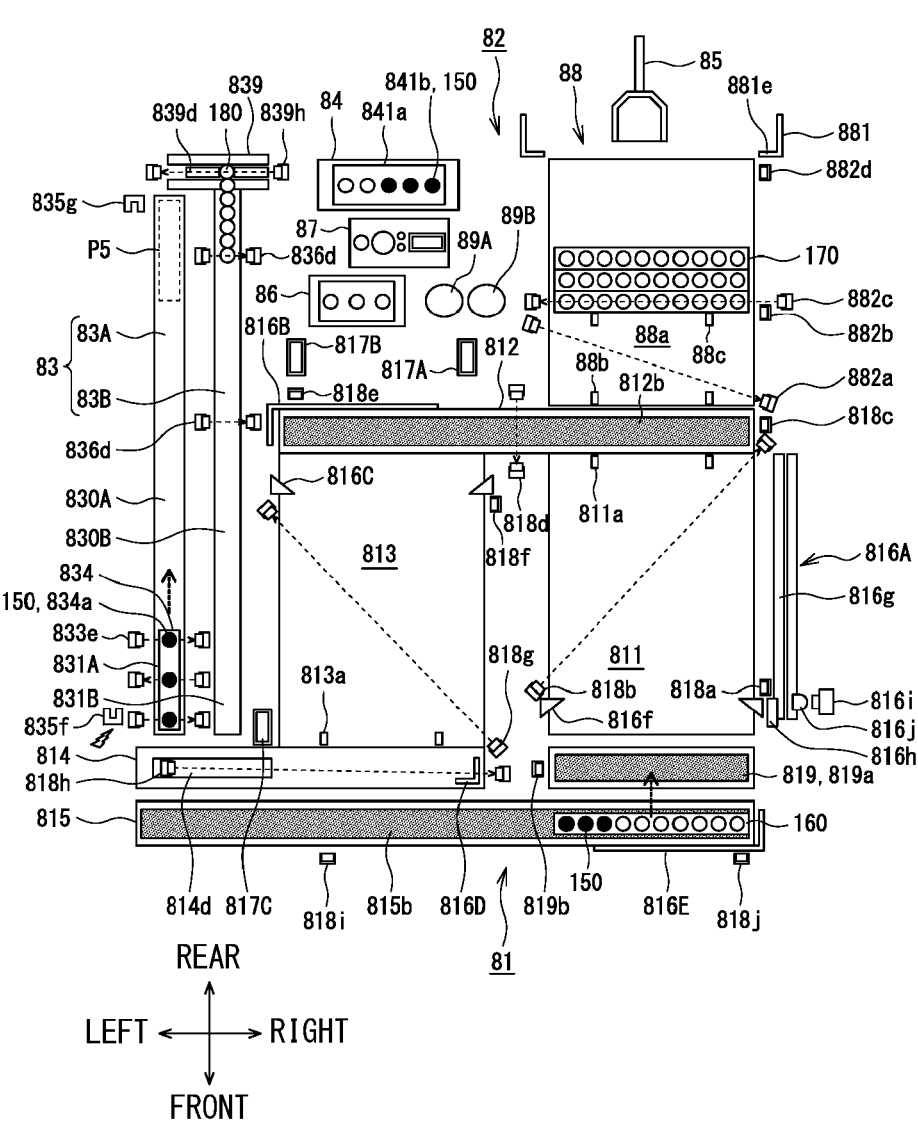
FIG. 22 schematically shows the configuration (internal layout) of the supply unit according to the exemplary embodiment and shows a situation in which a QC specimen rack is collected.

Hereinafter, the configuration of the rack storing part 88 will be described in more detail with reference to FIG. 21 and FIG. 22. The transport path 88*a* of the rack storing part 88 is connected to the second transport path 812 of the conveyor part 81 and is disposed to be opposed to the first transport path 811 with the second transport path 812 interposed therebetween. That is, the first transport path 811 and the transport path 88*a* are disposed side by side in the front-rear direction. The transport path 88*a* is connected to the right end side of the second transport path 812 and is connected to the first transport path 811 and the third transport path 813 via the second transport path 812.

The stopper 88*b* on the transport path 88*a* is a movable stopper disposed at a front end portion of the transport path 88*a* and prevents a specimen rack 110 or the like, which has been pushed out from the first transport path 811 to the second transport path 812, from reaching the transport path 88*a*. The stopper 88*b* is lowered so as not to protrude from the upper surface of the transport path 88*a* when an empty rack 170 or the like is carried onto the transport path 88*a*. Since the empty rack 170 or the like is transported rearward of the stopper 88*c*, the stopper 88*c* is lowered in conjunction with the stopper 88*b*. The stoppers 88*b* and 88*c* may be, for example, mechanically coupled together by a link mechanism or the like.

Each of the transport arms 881 is movable along the front-rear direction to the front side of the second transport path 812, and can push out a QC specimen rack 160 or the like to the second transport path 812 and draw a QC specimen rack 160 or the like from the second transport path 812 to the transport path 88*a*. A QC specimen rack 160 is transported from the rack storing part 88 through the second transport path 812 to the third transport path 813 and the fourth transport path 814. In addition, a QC specimen rack 160 returned to the supply unit 80 through the fifth transport path 815 is collected in the rack storing part 88 through the first transport path 811 and the second transport path 812.

The transport arm 881 is moved in the front-rear direction by a drive mechanism similar to that of the first sending part 816A. In addition, the two transport arms 881 are configured to be movable in a direction in which the transport arms 881 approach each other and in a direction in which the transport arms 881 become apart from each other. The transport arms 881 can send QC specimen racks 160 or the like one by one to the second transport path 812. Specifically, the transport arms 881 are movable in the left-right direction between an engagement position at which the claws 881a of the transport arms 881 are positioned above the transport path 88a so as to be engaged with a rack on the transport path 88a and a retraction position at which the claws 881a are retracted from the positions above the transport path 88a.

For example, if the transport arms 881 are moved frontward from the rear side of the transport path 88a beyond an empty rack 170 and push out a QC specimen rack 160 (front-end rack) to the second transport path 812, the transport arms 881 existing at the retraction position are moved to the position of the QC specimen rack 160. Then, the transport arms 881 are moved to the engagement position such that the claws 881a are inserted between the QC specimen rack 160 and an empty rack 170 that is immediately behind the QC specimen rack 160. By moving the transport arms 881 frontward in this state, the rear surface of the front-end rack is pushed by the claws 881a of the transport arms 881 so that the QC specimen rack 160 is pushed out to the second transport path 812.

The rack storing part 88 is provided with four sensors 882a, 882b, 882c, and 882d in order from the front side along the transport path 88a. The sensor 882a detects a rack between the stoppers 88b and 88c on the front end side of the transport path 88a, and the sensor 882b detects the front-end rack. If an empty rack 170 is stored in the rack storing part 88, the transport arms 881 transfer the empty rack 170 frontward such that there is always a front-end rack capable of storing thereon QC specimen containers 150 and cleaning agent containers 180.

The sensor 882c detects the QC specimen containers 150 and the cleaning agent containers 180 stored on the front-end rack. The sensor 882d detects presence or absence of any rack on the rear end side of the transport path 88a, and specifically, any empty rack 170 immediately in front of the stopper 88d (see FIG. 20). If no empty rack 170 has been detected by the sensor 882d, this means that a rack has been transported to any of the measurement units while storing thereon QC specimen containers 150 or cleaning agent containers 180; or a vacancy in which an empty rack 170 can be stored is present in the rack storing part 88.

Similar to the sensors of the conveyor part 81, optical sensors can be used as the sensors 882a, 882b, 882c, and 882d. For example, optical sensors in each of which a light emitter and a light receiver have been separated are used as the sensors 882a and 882c, and reflection-type optical sensors in each of which a light emitter and a light receiver have been integrated are used as the sensors 882b and 882d. As described in detail later, the control part 82a causes rack transport to be executed in the rack storing part 88 by controlling the stoppers 88b and 88c and the transport arms 881 on the basis of, for example, detection information from each of the sensors.

[Operation Screen of Monitor 91]

Hereinafter, screens displayed on the monitor 91 of the supply unit 80 will be described in detail with reference to FIG. 23 to FIG. 32. The screens described below are displayed through control of the monitor 91 by the control part 82a.

Figures 23, 24:
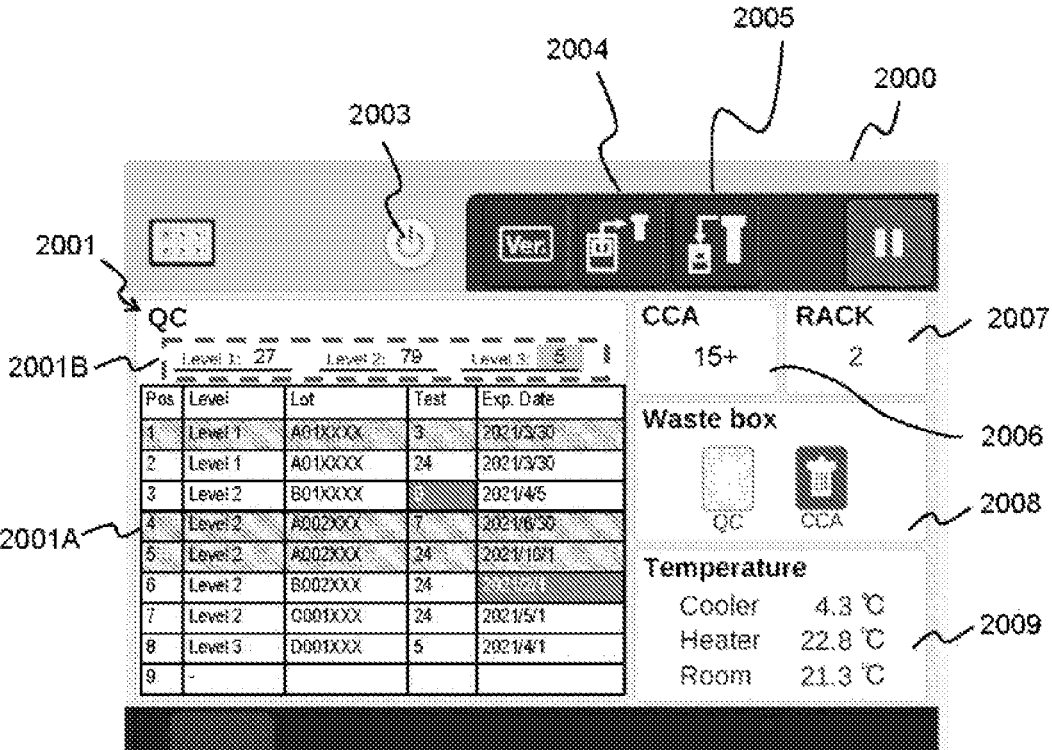
FIG. 23 shows an example of a home screen displayed on a monitor of the supply unit.
FIG. 24 shows an example of a device state screen displayed when a device state icon in the home screen is pressed.

FIG. 23 shows an example of a home screen 1000 displayed on the monitor 91 of the supply unit 80. The home screen 1000 includes: a tool bar 1000A; a main region 1000B in which an operation menu is displayed; and a status display region 1000C in which a status is displayed. As described above, the monitor 91 is implemented by a touch panel, and each of icons of the screen 1000 is displayed so as to be selectable by a user. In the tool bar 1000A, a portal screen display icon 1005 for displaying a portal screen 2600 shown in FIG. 32 described later is located.

In the main region 1000B, a device state icon 1001 for checking the state of the supply unit 80 or replenishing the supply unit 80 with consumable articles, and a schedule icon 1002 for registering and editing schedule items, are displayed. The main region 1000B may further include other icons as shown in FIG. 23.

FIG. 24 shows an example of a device state screen 2000 displayed in response to selection of the device state icon 1001. The device state screen 2000 includes, as content that is displayed in the main region, a QC status window 2001, a cleaning agent container stock window 2006, an empty rack stock window 2007, a disposal box window 2008, and a temperature display window 2009.

The QC status window 2001 includes: a QC specimen list 2001A in which pieces of information about QC specimens under the control of the supply unit 80 are listed; and a remaining amount display portion 2001B in which the remaining amount of QC specimens under the control is displayed for each of the concentration levels.

In the QC specimen list 2001A, pieces of information about QC specimen containers 150 under the control of the supply unit 80 are listed. As shown in FIG. 24, the QC specimen list 2001A includes, for example, nine rows correspondingly to the nine storing portions 841b provided in the cooling-and-preserving part 84. The QC specimen list 2001A includes, in order from the leftmost column, a first column indicating the position numbers of the storing portions 841b, a second column indicating the concentration levels of the QC specimens, a third column indicating the lot numbers of the QC specimens, a fourth column indicating the remaining test numbers of the QC specimens, and a fifth column indicating the expiration dates of the QC specimens.

In the example in FIG. 24, for example, information about a QC specimen container 150 stored in the storing portion 841b having the position number 1 is displayed in the row corresponding to the position number "1". In the example in FIG. 24, information about the QC specimen container 150 stored correspondingly to the position number "1" is registered with the concentration level being "Level 1", the lot number being "A01XXXX", the remaining amount being 3 tests, and the expiration date being "Mar. 30, 2021".

Each piece of information in the QC specimen list 2001A is registered through reading, by the information reading part 87, of information about the corresponding QC specimen container 150 having been set via the above loading part 83. In the machine-readable label 103 of the QC specimen container 150, attribute information including the concentration level, the lot number, the remaining test number, and the expiration date of the QC specimen therein is stored. The information reading part 87 obtains the above information on the basis of the information read from the machine-readable label 103 and transmits the obtained information to the control part 82a. The QC specimen container 150, information about which has been read, is stored in a vacant one of the storing portions 841b of the cooling-and-preserving part 84 by the transfer part 85. The control part 82a stores, in a database 820 (see FIG. 33 described later), the above information read by the information reading part 87 such that this information is associated with the position number of the storing portion 841b storing therein the QC specimen container 150.

As the pieces of information in the QC specimen list 2001A, pieces of information about the QC specimen containers 150 under the control of the supply unit 80 are listed. Even in a state where any of the QC specimen containers 150 is taken out from the cooling-and-preserving part 84 (for example, a state where the QC specimen container 150 is being transported for quality control measurement), information about this QC specimen container 150 is displayed in the row of the position number corresponding to the QC specimen container 150. Pieces of information about QC specimen containers 150 taken out from the cooling-and-preserving part 84 are, as indicated by hatches in FIG. 24, displayed in a different background color such that the QC specimen containers 150 can be distinguished from QC specimen containers 150 preserved in the cooling-and-preserving part 84.

As shown in FIG. 24, if any of the remaining test numbers becomes smaller than a predetermined value, the corresponding cell in the fourth column for displaying remaining amounts is displayed in an emphasized manner in the QC specimen list 2001A. For example, in the example in FIG. 24, the color of the cell corresponding to the QC specimen container 150, of the position number 3, in which the remaining test number is smaller than 1 is highlighted. A threshold value as a basis for the displaying in an emphasized manner can be set as appropriate, and, for example, the displaying in an emphasized manner may be performed if the remaining test number becomes smaller than 5. Consequently, a user can easily ascertain presence of a QC specimen container 150 in which the remaining amount has become small or zero.

As shown in FIG. 24, in the QC specimen list 2001A, if the expiration date regarding any of the QC specimen containers 150 stored in the cooling-and-preserving part 84 has passed, the corresponding cell in the fifth column for displaying expiration dates is displayed in an emphasized manner. For example, in the example in FIG. 24, the color of the cell corresponding to the QC specimen container 150, of the position number 6, regarding which the expiration date has passed is highlighted. A condition for the displaying in an emphasized manner can be set as appropriate, and, for example, the displaying in an emphasized manner may be performed if the number of days remaining until the expiration date arrives becomes smaller than a threshold value. For example, the displaying in an emphasized manner may be performed if the number of days remaining until the expiration date arrives becomes smaller than 10. Consequently, a user can easily ascertain presence of a QC specimen container 150 regarding which the expiration date is approaching or has passed.

Although only the cell in the fourth column or the fifth column is displayed in an emphasized manner in the example in FIG. 24, the entirety of the corresponding row may be displayed in an emphasized manner.

In an upper portion relative to the QC specimen list 2001A, the remaining amount display portion 2001B is provided. In the remaining amount display portion 2001B, the total number of remaining times of usage is displayed for each type of control blood, i.e., each of the concentration levels of the QC specimen containers 150. In the example in FIG. 24, the remaining test numbers of the QC specimens having the concentration levels 1, 2, and 3 are respectively displayed as 27 tests, 79 tests, and 5 tests. Each of the values in the remaining amount display portion 2001B is equal to a value obtained by summing, for the corresponding concentration level, the remaining test numbers of the QC specimens displayed in the QC specimen list 2001A. The remaining amount display portion 2001B makes it easy to perform management without the need for calculating the remaining test number for each concentration level by a user.

In the cleaning agent container stock window 2006, the number of remaining cleaning agent containers 180 stored in the supply unit 80 is displayed. As described above, in the second loading part 83B, the plurality of sensors 836d are disposed along the transfer path 830B. Among these sensors, a sensor 836d existing on the front side of the device (the lower side in the drawing sheet of FIG. 13) is disposed at a position that allows the sensor 836d to detect the fifteenth cleaning agent container from the leading one. The control part 82a causes the number of the remaining cleaning agent containers 180 to be displayed on the basis of an output from the sensor 836d existing on the front side. For example, when a cleaning agent container 180 is detected by the sensor 836d, "15+" indicating that the number of the remaining cleaning agent containers 180 is 15 or more is displayed as shown in FIG. 24. If, after the sensor 836d detects a cleaning agent container 180 once, the sensor 836d no longer detects any cleaning agent container 180 owing to consumption of cleaning agent containers 180, the control part 82a subtracts, from 15, the number of the cleaning agent containers 180 having been used and causes the number of the cleaning agent containers 180 in stock to be displayed.

Meanwhile, in a supply unit 80K in a modification described later, the number of all cleaning agent containers set in the unit is ascertained by the control part 82a, and thus the number of the cleaning agent containers in stock being displayed is changed according to the number of cleaning agent containers having been used by the supply unit 80.

In the empty rack stock window 2007, the number of empty racks 170 stored in the rack storing part 88 is displayed. The control part 82a ascertains the number of the empty racks 170 on the basis of outputs from the sensors 882c and 882d and causes the number to be displayed in the empty rack stock window 2007.

In the disposal box window 2008, the number of containers that can be disposed of in the first collection part 89A as a disposal box and the number of containers that can be disposed of in the second collection part 89B as a disposal box are displayed.

In the temperature display window 2009, the internal temperature of the cooling-and-preserving part 84, the temperature of the heating block of the heating part 86, and the temperature of outside air are displayed.

In a tool bar of the device state screen 2000, a shutdown icon 2003, a take-out icon 2004, and a loading icon 2005 are displayed. The shutdown icon 2003 is used for shutting down the entirety or a part of the specimen analysis system 1. The take-out icon 2004 is used for taking out any of the QC specimen containers 150 preserved in the cooling-and-preserving part 84. The take-out icon 2004 will be described with reference to FIG. 26 described later. The loading icon 2005 is used for setting a QC specimen container 150 into the first loading part 83A of the loading part 83.

Figure 25:
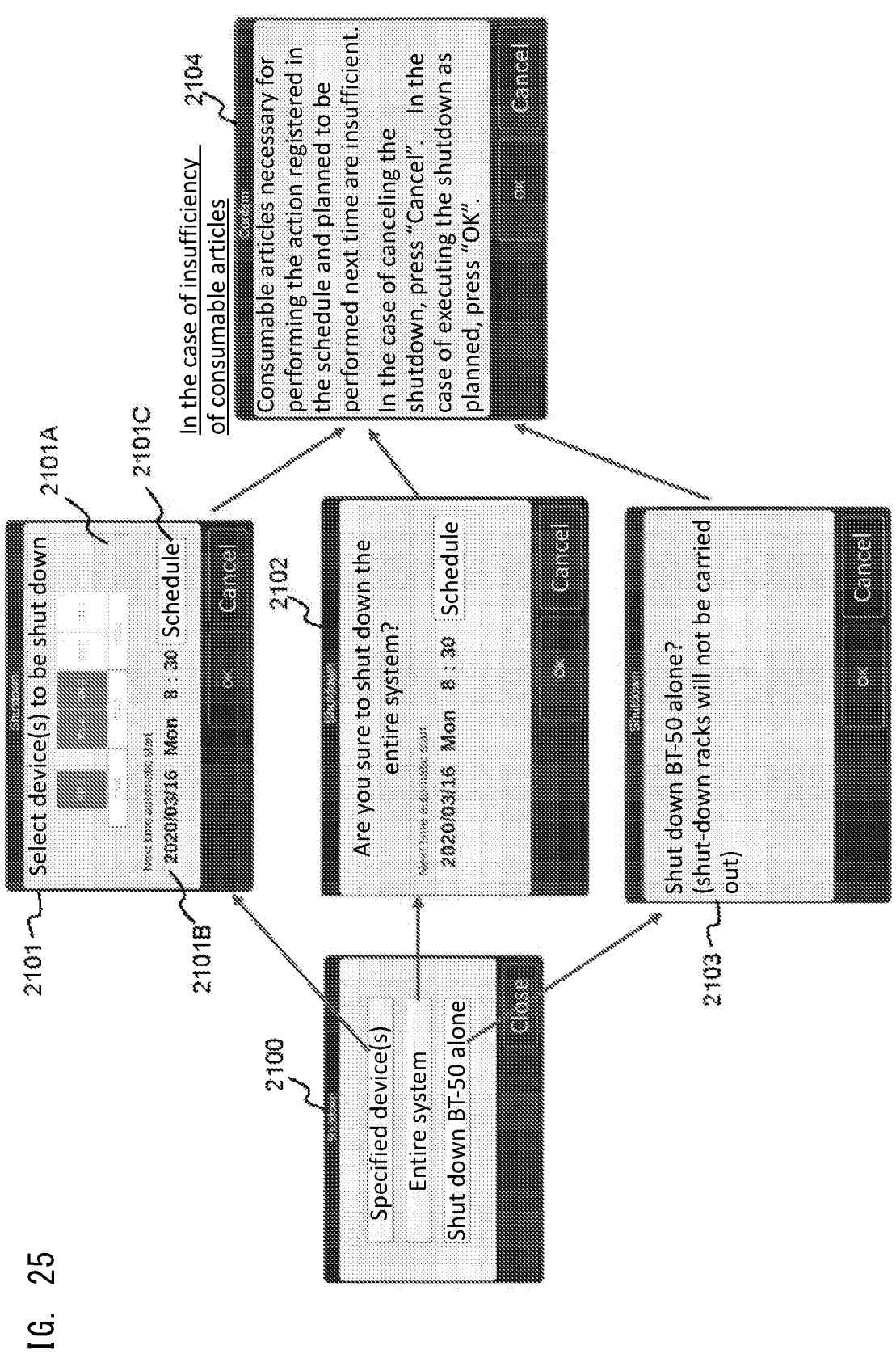
FIG. 25 shows an example of a shutdown screen displayed when a shutdown icon in the device state screen is pressed.

FIG. 25 shows an example of a shutdown screen 2100 displayed when the shutdown icon 2003 in the device state screen 2000 is pressed. In the shutdown screen 2100, a shutdown menu is displayed. The shutdown menu includes three choices which are "Specified device(s)", "Entire system", and "Shut down supply unit (BT-50) alone".

If "Specified device(s)" is selected in the shutdown screen 2100, a device selection screen 2101 is displayed. The device selection screen 2101 includes a device selection region 2101A in which the plurality of devices, i.e., the measurement units 10A and 10B and the processing unit 40, are displayed according to the layout of the specimen analysis system so as to be selectable. A user selects a device to be shut down, by following guidance given by the screen. In the screen 2101, a schedule item 2101B for automatic activation planned to be performed next time and a button 2101C for retrieving details of the schedule item for the next time of automatic activation, are displayed together. If a user presses an OK button at a lower portion of the screen after checking the schedule item for the next time of automatic activation displayed on the screen, the selected device is shut down. Shutdown of any of the measurement units and the processing unit means, for example, transporting a cleaning agent rack storing thereon a cleaning agent container to the device, executing cleaning in the device, and powering off the device after completion of the cleaning, as described later with reference to FIG. 54. Hereinafter, description will be given while the four measurement units composing the specimen analysis system 1 are referred to as "XN-1", "XN-2", "XN-3", and "XN-4", and the processing unit 40 is referred to as "SP-1".

If "Entire system" is selected in the shutdown screen 2100, a system shutdown confirmation screen 2102 is displayed. Similar to the screen 2101, the schedule item for automatic activation planned to be performed next time and the button for retrieving the details of the schedule item for the next time are displayed in the screen 2102. If an OK button at a lower portion of the screen is pressed, the entire system is shut down.

If "Shut down supply unit alone" is selected, a supply unit shutdown screen 2103 for asking a user again as to whether to shut down the supply unit 80 alone is displayed. If an OK button at a lower portion of the screen 2103 is pressed, the supply unit 80 is shut down alone. Shutdown of the supply unit 80 means powering off the supply unit 80 and does not involve transport of any cleaning agent rack.

If consumable articles to be used for automatic QC based on the schedule item for the next time of automatic activation are insufficient when the OK button is pressed in any of the screens 2101 to 2103, a screen 2104 is displayed. The screen 2104 includes the message "Consumable articles necessary for performing the action registered in the schedule and planned to be performed next time are insufficient." The screen 2104 is displayed if, when a shutdown instruction is received via any of the screens 2101 to 2103, the QC specimen containers 150 preserved in the cooling-and-preserving part 84 and the empty racks 170 stored in the rack storing part 88 are insufficient relative to amounts necessary for executing automatic QC based on the schedule item for the next time of automatic activation. The control part 82a of the supply unit 80 stores therein the remaining test number for each of the concentration levels of the QC specimen containers 150 preserved in the cooling-and-preserving part 84, as described with reference to FIG. 24. In addition, the control part 82a also stores therein the number of the empty racks 170 stored in the rack storing part 88. The control part 82a determines, on the basis of a QC condition of automatic QC to be executed at the next time of automatic activation, whether or not there is a sufficient stock of QC specimen containers 150 and whether or not there is a sufficient stock of empty racks 170. In the case of insufficiency, the control part 82a causes the monitor 91 to display the screen 2104. For canceling the shutdown and performing replenishment with consumable articles, a user presses a cancel button. For continuing the shutdown as planned, the user presses an OK button, whereby the shutdown is continued as instructed. Since the screen 2104 is displayed before shutdown, it is possible to, for example, prevent the supply unit 80 from being shut down without replenishment with consumable articles necessary for the next day's automatic QC.

Through the device selection screen 2101, desired devices can be shut down just by specifying the devices and pressing the OK button on the screen. Therefore, a user does not need to perform work of shutting down the devices one by one, whereby convenience is high. In addition, convenience is attained also in that it is unnecessary for a user to perform any manual operation such as usage of a cleaning agent rack provided with a rack barcode dedicated to a specific device in order to supply a cleaning agent container 180 to the specific device.

In addition, in the case of shutting down the entire system as well, a user only has to press the OK button in the screen 2102. Therefore, a user does not need to perform work of shutting down all the devices. In addition, even if the specimen analysis system 1 includes a large number of devices, it is unnecessary to manually prepare cleaning agent containers 180 necessary for cleaning all the devices, whereby convenience is attained.

Figure 26:
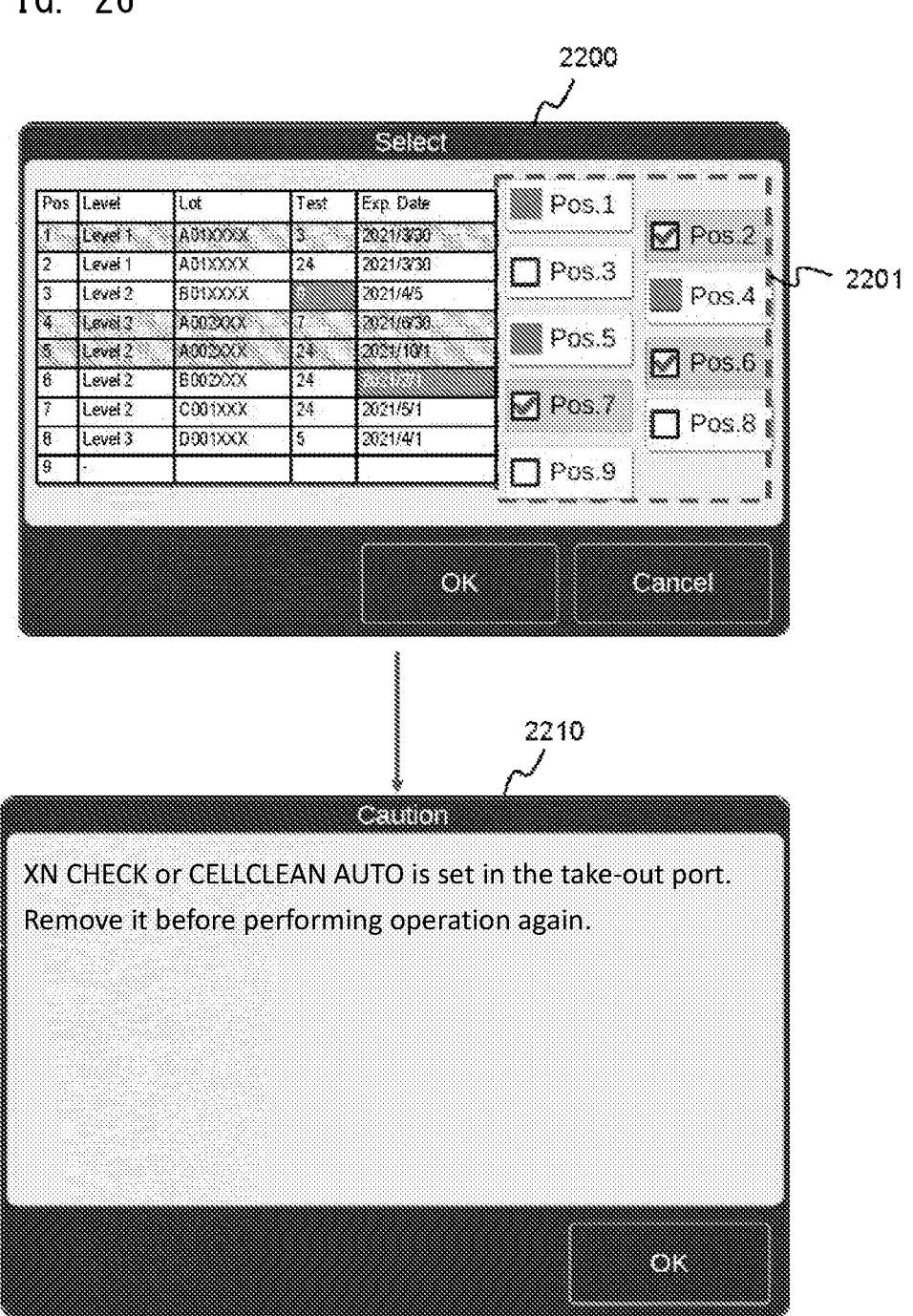
FIG. 26 shows an example of a QC specimen take-out screen displayed when a take-out icon in the device state screen is pressed.

FIG. 26 shows an example of a QC specimen take-out screen 2200 displayed in response to selection of the take-out icon 2004 in the device state screen 2000. The screen 2200 includes: the same QC specimen list as that included in the device state screen 2000; and position selection buttons 2201. A user can select, while checking the QC specimen list, any of the position selection buttons 2201 that corresponds to the position number of a QC specimen container 150 to be taken out, and can select an OK button at a lower portion of the screen. Up to three of the position selection buttons 2201 can be simultaneously selected correspondingly to the maximum number of containers capable of being placed in the transfer holder 834, which is also three. In the example in FIG. 26, the QC specimen containers 150 of the position numbers 2, 6, and 7 are selected. As described with reference to FIG. 24, the QC specimen containers 150 of the position numbers 1, 4, and 5 are in a state of having been taken out from the cooling-and-preserving part 84 and thus cannot be taken out. Therefore, the position selection buttons 2201 corresponding to these position numbers are set to not be selectable, and checkboxes thereof are displayed in gray.

When QC specimen containers 150 to be taken out are selected by using the corresponding position selection buttons 2201 and the OK button is pressed, the selected QC specimen containers 150 are taken out from the cooling-and-preserving part 84 and set in the transfer holder 834 at the take-out position P5 (the position shown in FIG. 15) on the loading part 83. Thereafter, the transfer holder 834 in which the QC specimen containers 150 have been set is moved to the first loading port 831A (the position shown in FIG. 14). When the transfer holder 834 is moved to the first loading port 831A, a notification screen 2210 which notifies a user that the QC specimen containers 150 (XN CHECK) have arrived at the first loading port 831A is displayed on the monitor 91. The user can open the first cover 832A and take out the QC specimen containers 150.

Figure 27:
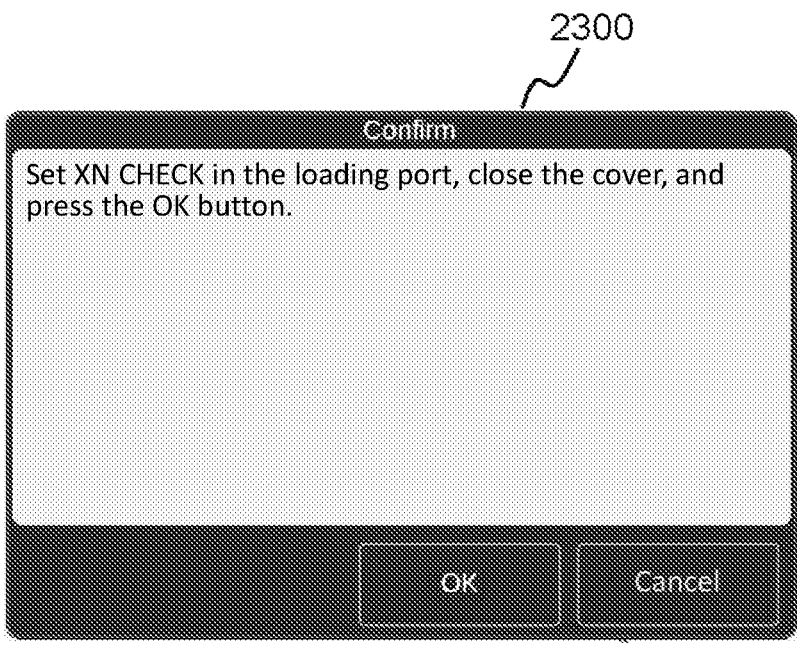
FIG. 27 shows an example of a loading screen displayed when a loading icon in the device state screen is pressed.

FIG. 27 shows an example of a loading screen 2300 displayed in response to selection of the loading icon 2005 in the device state screen 2000. When the loading icon 2005 is selected, the transfer holder 834 is positioned at the first loading port 831A, and the first cover 832A is unlocked. The screen 2300 is a screen for prompting a user to set a QC specimen container 150 and is displayed on the monitor 91 at, for example, a timing at which the first cover 832A has been unlocked. When the user sets a QC specimen container 150 in the transfer holder 834 and presses an OK button at a lower portion of the screen, the QC specimen container 150 is transferred into the supply unit 80 and preserved in the cooling-and-preserving part 84. This process will be described later.

Figure 28:
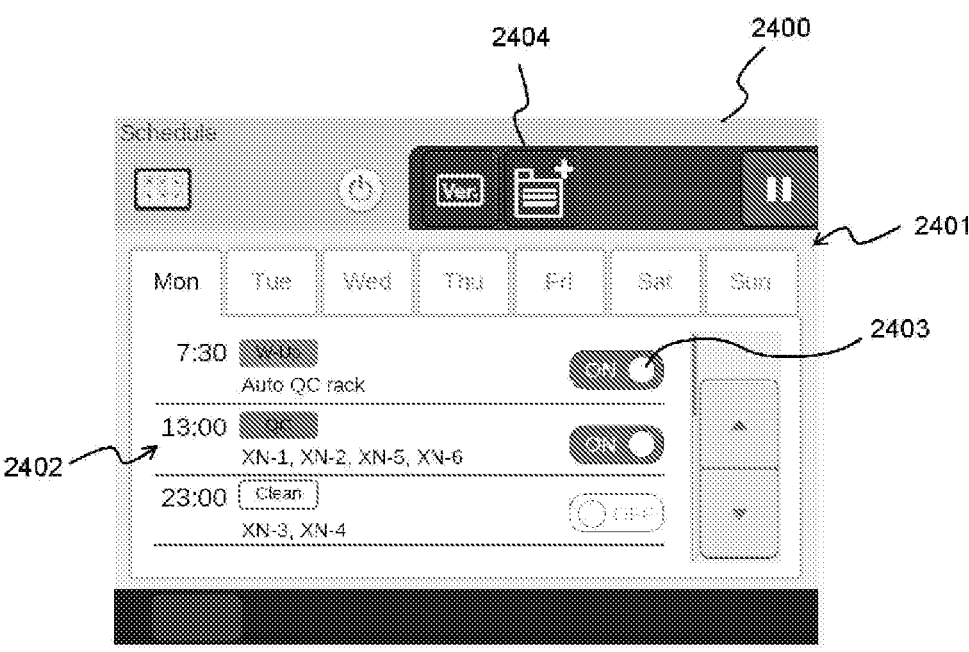
FIG. 28 shows an example of a schedule screen displayed when a schedule icon in the home screen is pressed.

FIG. 28 shows an example of a schedule screen 2400 displayed in response to selection of the schedule icon 1002 in the home screen 1000. The schedule screen 2400 includes: seven day-of-week tabs 2401 provided correspondingly to the respective days in one week; and a schedule list 2402 for displaying a list of schedule items. As the day-of-week tabs 2401, seven tabs indicating the names of the seven days of the week, i.e., Monday, Tuesday, Wednesday, Thursday, Friday, Saturday, and Sunday, are displayed so as to be selectable. A user can arbitrarily select any of the tabs to specify the corresponding day of week for which a schedule item is to be set. Although FIG. 28 shows an example in which a schedule item is registered for each day of week, setting may be performed such that a schedule item can be registered by, for example, specifying a date. For example, setting may be performed such that, with a weekly or monthly calendar being displayed, a specific date on the calendar can be specified to register a schedule item.

FIG. 28 shows a state where the tab for Monday is selected. In the schedule list 2402, schedule items planned to be executed on the specified day of week are displayed in time series. In the example in FIG. 28, on Monday, wake-up (automatic activation) is scheduled to be performed at 7:30 A.M., quality control measurement (automatic QC) is scheduled to be performed at 13:00, and automatic cleaning is scheduled to be performed at 23:00. Buttons 2403 for ON/OFF switching are provided correspondingly to the respective schedule items in the schedule list 2402. In the case of executing any of the registered schedule items, a user operates the corresponding button 2403 so as to set the schedule item to be "ON". Meanwhile, in the case of not executing the schedule item, the user sets the schedule item to be "OFF". The schedule item set to be ON is automatically executed at the same time point every week unless the schedule item is set to be OFF.

In a tool bar in the schedule screen 2400, a registration icon 2404 for registering a schedule item is displayed so as to be selectable. In the case of newly adding an automatic execution schedule item to the schedule list 2402, a user presses the registration icon 2404.

Figure 29:
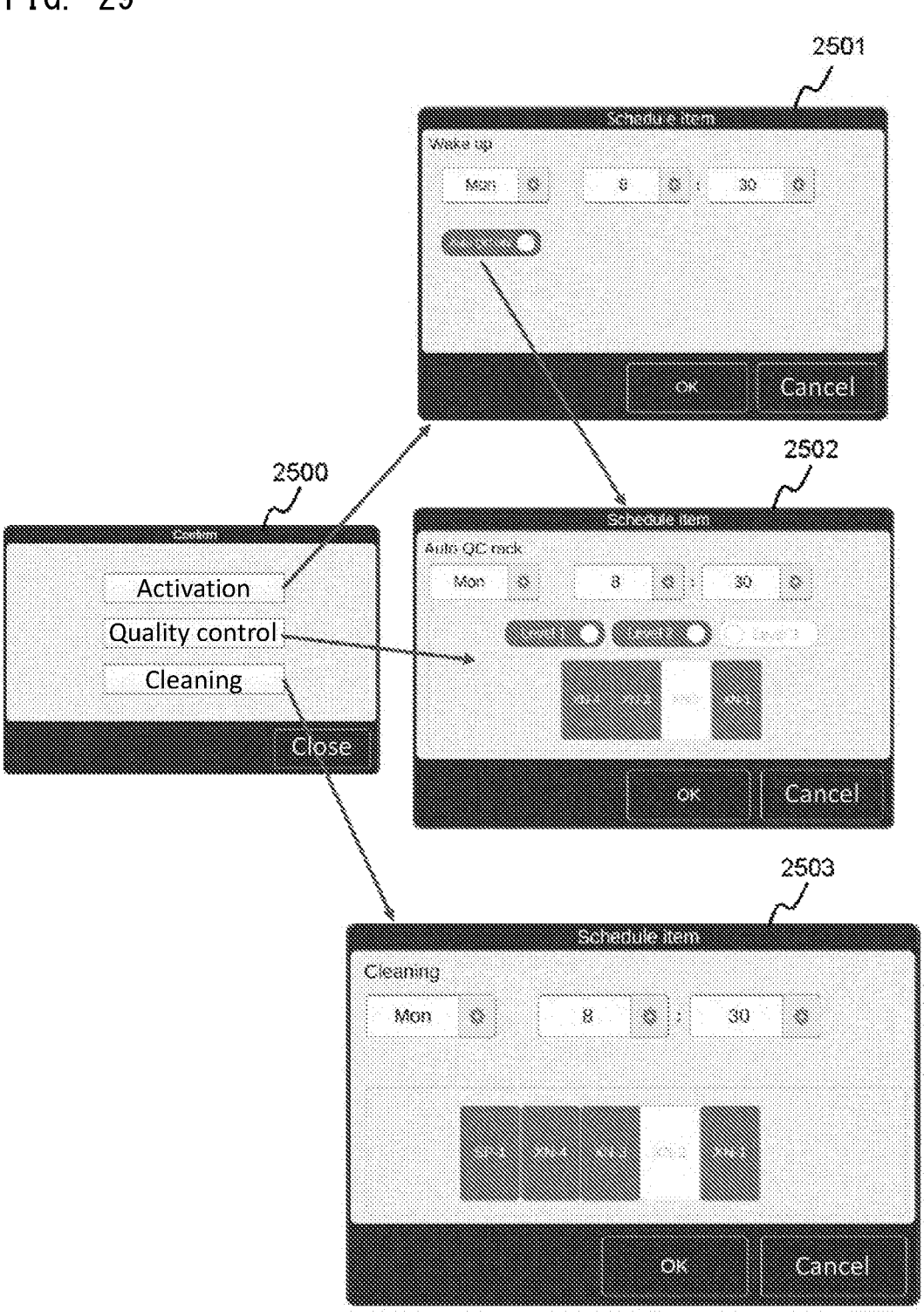
FIG. 29 shows an example of a schedule registration screen displayed when a registration icon in the schedule screen is pressed.

FIG. 29 shows an example of a schedule registration screen 2500 displayed in response to selection of the registration icon 2404 in the schedule screen 2400. In the screen 2500, a menu for selecting a process to be automatically executed is displayed. In the example in FIG. 29, three menu items which are "Activation", "Quality control", and "Cleaning" are displayed so as to be selectable. In the present embodiment, information about the registered schedule item is saved in a storage of the control part 82a.

If the menu item "Activation" is selected in the schedule registration screen 2500, a registration screen 2501 is displayed. The screen 2501 is a screen for registering a schedule item for automatic wake-up. The screen 2501 includes a plurality of pull-down buttons for inputting a day of week and a time point of performing automatic wake-up. If the pull-down button for day of week is selected, a pull-down menu including the seven days of the week, i.e., Monday, Tuesday, Wednesday, Thursday, Friday, Saturday, and Sunday, as choices is displayed. A user can select any of the days of the week. Pull-down buttons for time point include: a pull-down button for specifying a time point by hour; and a pull-down button for specifying a time point by minute. A user can specify a time point by operating pull-down menus. Although only the pull-down menus are presented in the example in FIG. 29, a configuration may be employed in which a software keyboard is displayed; and input of numerical values is received from a user. Through operation in the screen 2501, a user can specify a day of week and a time point of executing automatic wake-up.

The registration screen 2501 further includes a button for ON/OFF of execution of automatic QC. In the case of executing automatic QC through operation of the button, a user performs setting to "ON". Meanwhile, in the case of not executing automatic QC, the user performs setting to "OFF". The automatic QC refers to automatic quality control measurement in which any of the QC specimen containers 150 stored in the cooling-and-preserving part 84 is used.

If an automatic wake-up schedule item in which automatic QC is set to be ON is registered, one or more measurement units included in the specimen analysis system 1 are automatically activated according to this schedule item, and furthermore, the QC specimen container 150 is automatically supplied to the one or more measurement units having been activated, and quality control measurement is performed. If an automatic wake-up schedule item in which automatic QC is set to be OFF is registered, each unit of the specimen analysis system 1 is automatically powered on, but quality control measurement is not performed.

If, in the registration screen 2501, setting to "ON" is performed through the automatic QC button, and an "OK" button existing at a lower portion of the screen is pressed, transition to a registration screen 2502 occurs. The registration screen 2502 is displayed also if the menu item "Quality control" is selected in the schedule registration screen 2500. In the specimen analysis system 1, setting of a condition of quality control measurement (QC condition) is received from a user through the registration screen 2502. As described in detail later, the specimen analysis system 1 determines, according to the QC condition and information about the plurality of QC specimen containers 150 preserved in the cooling-and-preserving part 84, one or more QC specimen containers 150 for use in quality control measurement from among the QC specimen containers 150 and transports each of the determined QC specimen containers 150 to a relevant one of the measurement units to perform measurement on QC specimens.

The registration screen 2502 is a screen for creating a schedule item for automatic QC. Similar to the above screen 2501, the screen 2502 includes a plurality of pull-down buttons for specifying a day of week and a time point. Below the pull-down buttons, three concentration level buttons for "Level 1", "Level 2", and "Level 3" are provided as buttons each for selecting the corresponding type of QC specimen to be used for one time of automatic QC. Below the concentration level buttons, unit selection images for selecting measurement units that are subjected to quality control measurement in automatic QC are displayed. The unit selection images include images showing the plurality of units disposed according to the layout of the specimen analysis system 1.

A user sets a day of week and a time point of executing automatic QC in the registration screen 2502. Operation for setting a day of week and a time point is the same as that described above. The user operates any of the concentration level buttons to select the corresponding type of QC specimen for use in automatic QC. In the example in FIG. 29, level 1 and level 2 are specified as the concentration levels of the QC specimens. Level 3 is not specified and is in an OFF state. The user selects, from among the unit selection images, any of the measurement units that is subjected to quality control measurement in automatic QC.

In FIG. 29, the measurement unit XN-1 disposed on the rightmost side and the measurement units NX-3 and NX-4 which are respectively the third and fourth measurement units from the right, are selected. In the example of setting shown in FIG. 29, a condition of automatic QC is set such that quality control measurement in which two QC specimen containers 150 of level 1 and level 2 are used is performed on the three measurement units XN-1, XN-3, and XN-4 at 8:30 A.M. on Monday. If an "OK" button at a lower portion of the screen 2502 is selected, a confirmation screen 2510 described later is displayed, and, if operation for confirmation is performed, the inputted schedule item is registered in the list. In the present embodiment, the registered condition of automatic QC is saved in the storage of the control part 82a.

If the menu item "Cleaning" in the schedule registration screen 2500 is selected, a registration screen 2503 is displayed. The screen 2503 is a screen for registering a schedule item for automatic cleaning. The automatic cleaning refers to automatic cleaning, of any of the measurement units and the processing unit, in which a cleaning agent container 180 stored in the second loading part 83B is used. The registration screen 2503 differs from the registration screen 2502 in that the registration screen 2503 does not include any concentration level buttons each for selecting the corresponding type of QC specimen; and the processing unit 40 (SP-10) which is a smear preparation making device is displayed as a selectable unit. In terms of the other aspects, the registration screen 2503 has the same configuration as that of the screen 2502.

In the registration screen 2503, a user operates pull-down buttons at an upper portion of the screen to specify a day of week and a time point of executing automatic cleaning. The user selects any of the unit selection images to specify a unit that is subjected to automatic cleaning. If an "OK" button at a lower portion of the registration screen 2503 is selected, the inputted schedule item is registered in the schedule list through operation in a confirmation screen.

Figure 30:
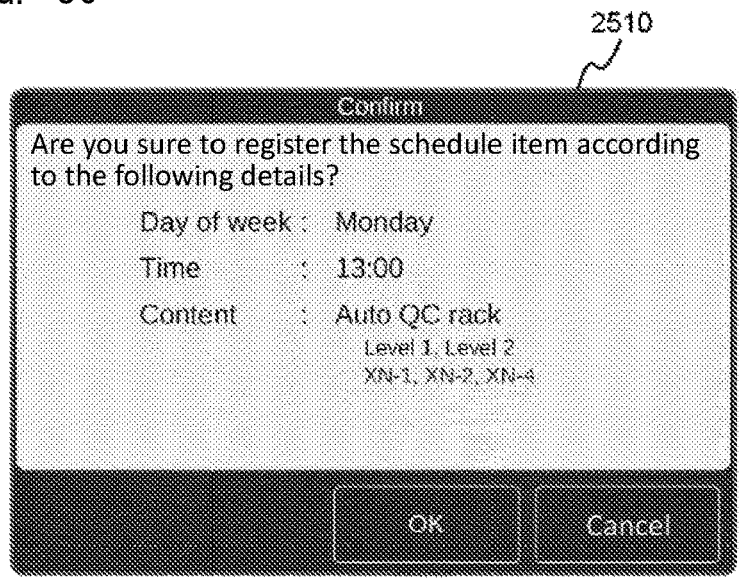
FIG. 30 shows an example of a confirmation screen displayed when a schedule item for automatic QC is inputted and an OK button is pressed in the schedule registration screen.

FIG. 30 shows an example of the confirmation screen 2510 displayed in response to pressing of the "OK" button after the schedule item for automatic QC is inputted in the registration screen 2502. As shown in FIG. 30, the specified day of week and time point and the action to be automatically executed are displayed in the confirmation screen 2510. If an automatic QC schedule item in which a plurality of concentration levels have been specified is created in the registration screen 2502, the combination of the plurality of concentration levels is displayed as content of the automatic execution schedule item as shown in FIG. 30.

Figure 31:
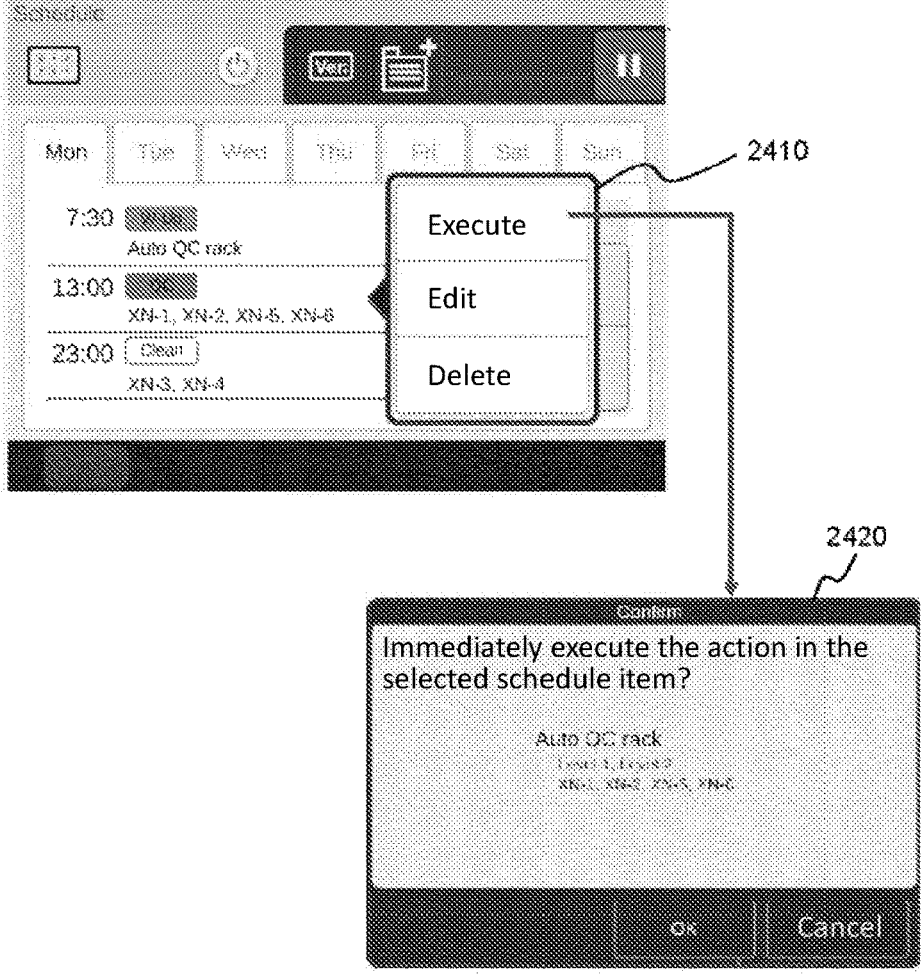
FIG. 31 shows an example of an operation menu displayed when a schedule list in the schedule screen is pressed.

FIG. 31 shows operation performed, from the schedule screen 2400 in FIG. 28, on any of the automatic execution schedule items displayed in the schedule list. If, in the screen 2400, a user selects an automatic execution schedule item to be operated, an operation menu 2410 is displayed. The operation menu 2410 includes three items which are "Execute", "Edit", and "Delete".

"Execute" is used in the case of executing the selected schedule item earlier than the time point at which the schedule item is planned to be executed. If "Execute" in the operation menu 2410 is pressed, a confirmation screen 2420 including the content regarding the scheduled automatic execution is displayed along with the confirmation message "Immediately execute the action in the selected schedule item?". If an "OK" button is pressed in the confirmation screen 2420, quality control measurement is started according to the condition of scheduled QC. If any of the schedule items is, by operating the menu item "Execute", executed earlier than the time point at which the schedule item is planned to be executed, this schedule item is not executed at the time point at which the schedule item is originally planned to be executed.

"Edit" is used in the case of changing the already registered content of the schedule item. For example, "Edit" is used in the case of changing the time point at which automatic QC is to be executed or in the case of changing the concentration levels to be used for automatic QC and the units to be subjected to quality control measurement. If "Edit" is pressed, the screen identical to any of the screens 2501, 2502, and 2503 shown in FIG. 29 is displayed according to the type of the schedule item to be edited, and it becomes possible to perform editing via the screen. If editing is performed, the content in the schedule list is updated on the basis of content resulting from the editing.

"Delete" is used in the case of deleting the already registered schedule item. If deleting is performed, said schedule item is deleted from the schedule list.

Figure 32:
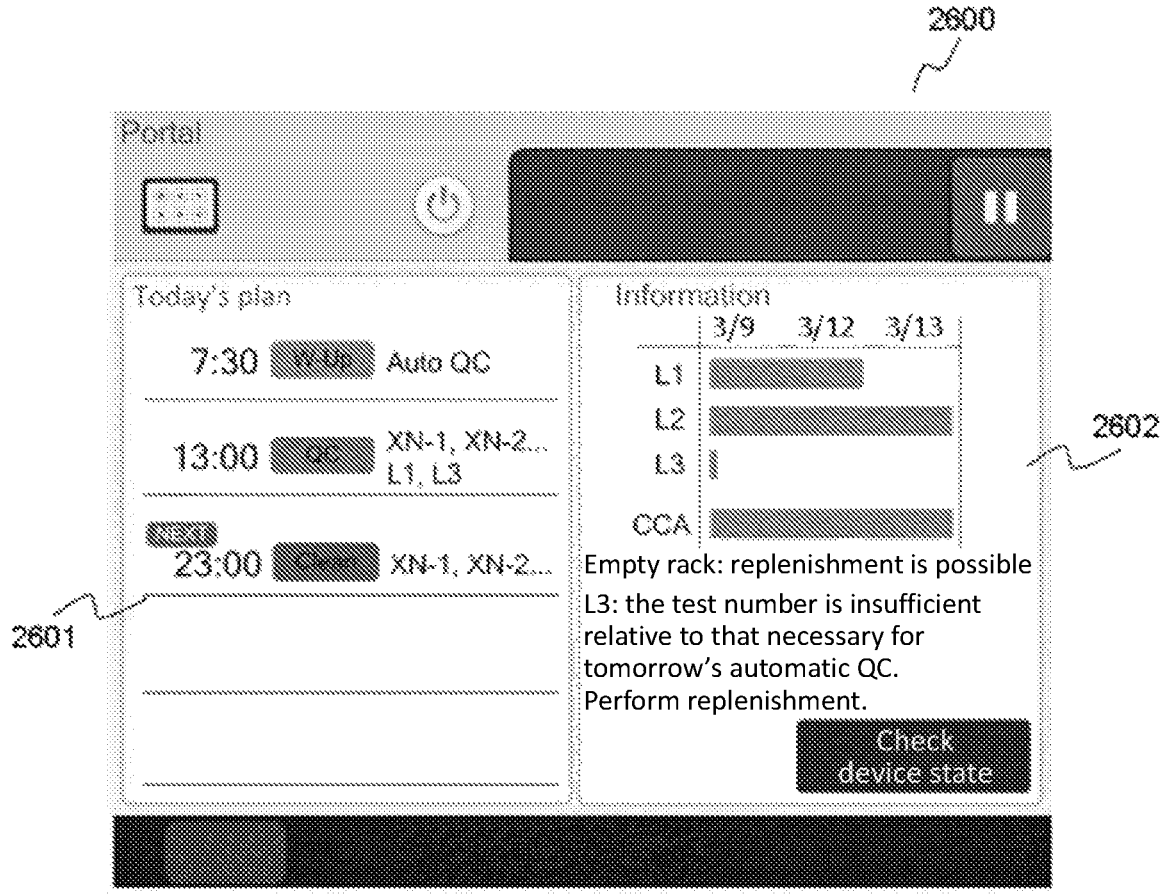
FIG. 32 shows an example of a portal screen including a schedule display region and a stock display region.

FIG. 32 shows an example of the portal screen 2600. The portal screen 2600 includes: a schedule display region 2601 in which schedule items planned to be executed on the present day are listed; and a stock display region 2602 in which the situation of stocks of consumable articles preserved in the supply unit 80 is displayed. As content displayed in the schedule display region 2601, the planned schedule items corresponding to the present day of week for operation among the automatic execution schedule items registered through the schedule registration screen 2500 are sequentially listed from the top in time series.

In the stock display region 2602, the situation of stocks of consumable articles preserved by the supply unit 80 is displayed in a graph. In the example in FIG. 32, the amounts of a plurality of types of consumable articles remaining are displayed in a bar graph along the horizontal axis in which future dates are disposed rightward from the present date as an origin. The bar graph indicates until when consumable articles preserved in the supply unit 80 remain sufficient in the case of executing the registered schedule items as planned by using stocks of the consumable articles. In the example in FIG. 32, a bar graph indicating the amounts of stocks of QC specimen containers 150 having the concentration levels 1, 2, and 3 and a stock of cleaning agent containers (CCA) 180 is displayed. A message regarding any of the stocks of the consumable articles is displayed below the graph. For example, if the number of the empty racks 170 preserved in the rack storing part 88 becomes smaller than a predetermined number, the message "Empty rack: replenishment is possible" is displayed as shown in FIG. 32, for example. In addition, if any type of consumable article necessary for executing a planned automatic execution schedule item is insufficient, the message includes an alert that prompts a user to perform replenishment with this type of consumable article. For example, FIG. 32 shows a case where the remaining test number of the QC specimen having the concentration level 3 is insufficient for an automatic QC schedule item planned to be executed on the next day, and in this case, the message "L3: the test number is insufficient relative to that necessary for tomorrow's automatic QC. Perform replenishment." is displayed. The automatic execution schedule item regarding which such an alert is displayed may be, for example: a schedule item planned to be performed on the present day, the next day, or the next operation day; or a schedule item for automatic activation planned to be performed next time. By checking the alert, the user can perform replenishment with the corresponding type of consumable article in advance. Although the dates on which the schedule items can be executed within the ranges of the stocks of consumable articles are displayed with the bar graph in FIG. 32, the means for the displaying does not need to be a graph, and the dates may be displayed alone. In addition, the items to be displayed are not limited to dates, and the number of remaining days within which each schedule item can be executed or the number of remaining times the schedule item can be executed may be displayed with numerical values or a graph on the basis of the stocks.

Figure 33:
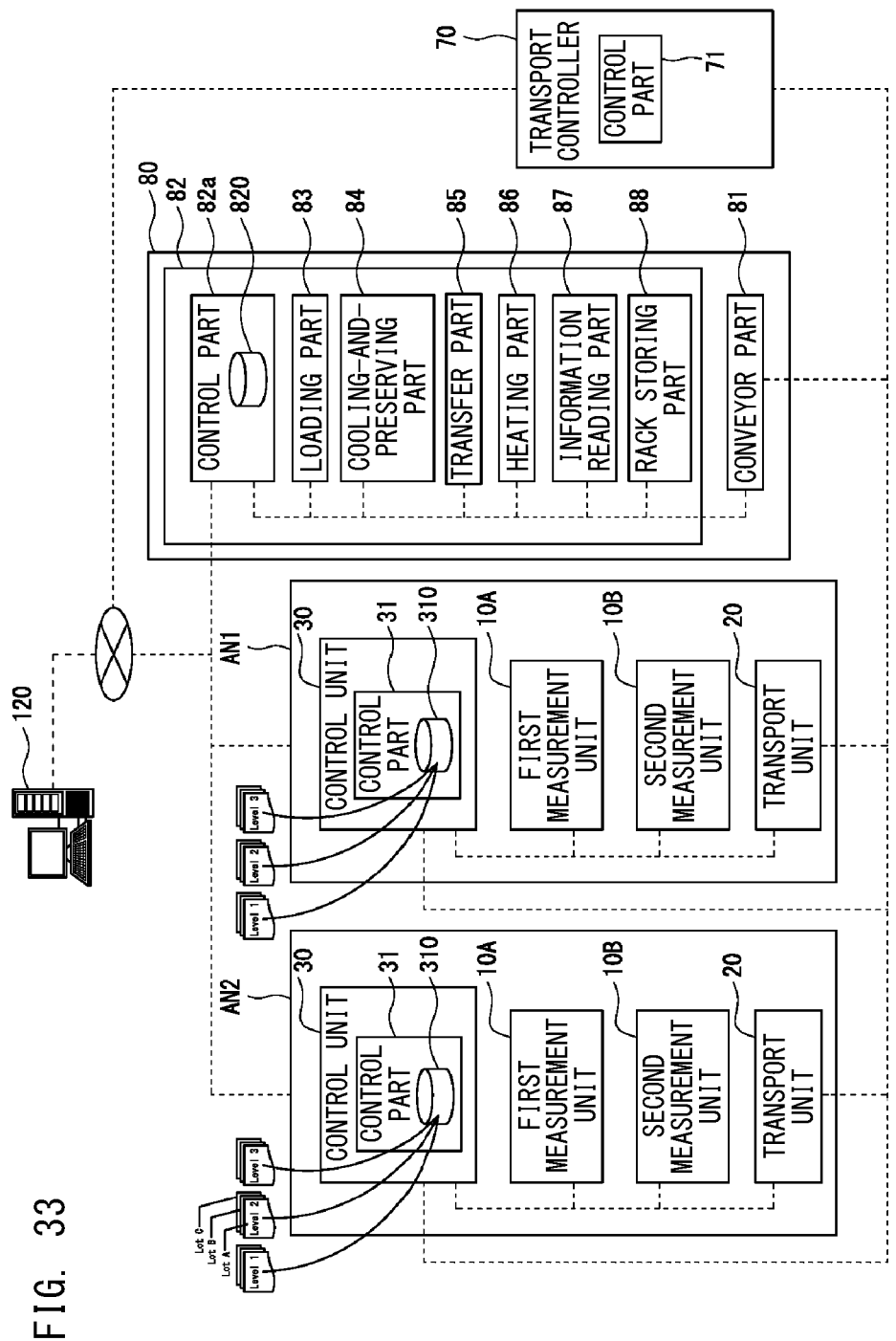
FIG. 33 is a block diagram showing a configuration of the supply unit and also shows the relationship in connection between the supply unit and each of the measurement units and a transport controller.

FIG. 33 is a block diagram showing a configuration of the supply unit and also shows the relationship in connection between the supply unit 80 and each of the analyzers AN1 and AN2 and the transport controller 70. The control part 82*a* is connected to each of devices which are the loading part 83, the cooling-and-preserving part 84, the transfer part 85, the heating part 86, the information reading part 87, and the rack storing part 88. The control part 82*a* controls operation of each of the devices by transmitting a control signal to the device. In the present embodiment, a process to be executed by the preservation adjustment unit 82 among processes regarding quality control measurement is executed under the control of the control part 82*a*. Transport of a QC specimen rack 160 by each of the conveyor part 81 and the transport units 20 of the analyzers AN1 and AN2 is mainly executed under the control of the transport controller 70, and measurement of a quality control substance by each of the measurement units is executed under the control of the corresponding control unit 30.

Similar to the control part 31 of the control unit 30 and the control part 71 of the transport controller 70, the control part 82*a* is implemented by a computer and includes a processor, a storage, an input/output port, and the like. In the control part 82*a*, for example, a control program for executing processes such as cooling and preserving, transference, and heating of a QC specimen container 150 is installed. The control part 82*a* further stores therein the database 820 in which information about a quality control specimen is stored. As described above, the database 820 stores therein information about each of the QC specimen containers 150 associated with the respective position numbers of the storing portions 841*b* of the cooling-and-preserving part 84.

Figure 53:
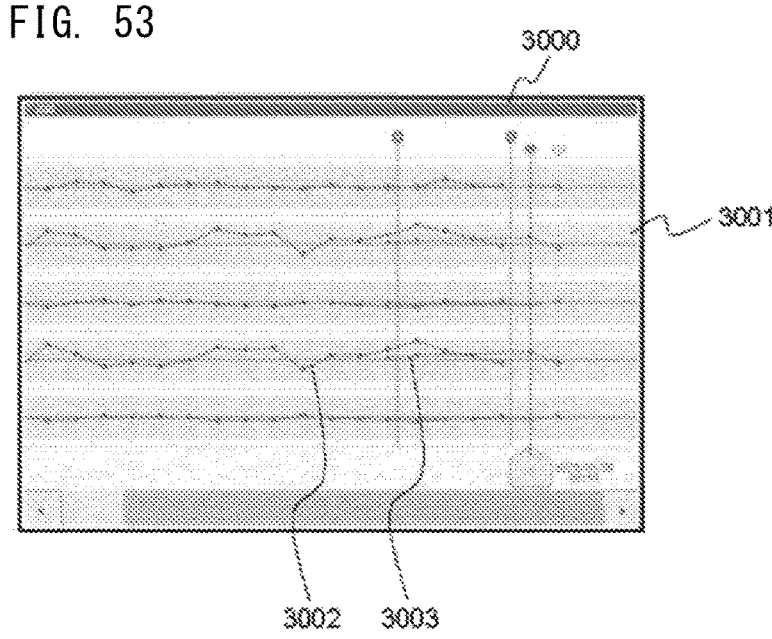
FIG. 53 shows an example of a screen, for comparing a quality control result regarding a previous lot and a quality control result regarding a new lot, displayed on the monitor in the specimen analysis system.

The control part 31 of the control unit 30 stores therein a database 310 regarding a result of quality control measurement. In the database 310, a QC file is saved. The QC file is a measurement result regarding a QC specimen and is a measurement result for each measurement date and time and for each concentration level and each lot of the QC specimen. FIG. 53 described later shows an example of the QC file saved in the database 310. By using the database 310, a user can ascertain, for example, the states of the corresponding measurement units, an inter-lot difference of QC specimens described later, and the like.

FIG. 34 shows an example of the database 820 stored in the control part 82*a*. The database 820 includes attribute information and remaining amount information about each of the individual QC specimen containers 150 stored in the cooling-and-preserving part 84. The attribute information preferably includes at least one of the concentration level of the QC specimen, lot information about the QC specimen, and the expiration date of the QC specimen. In the example in FIG. 34, the database 820 includes, in order from the leftmost column, a first column indicating the position numbers of the storing portions 841*b* of the cooling-and-preserving part 84, a second column indicating the concentration levels of the QC specimen containers 150, a third column indicating the lot numbers of the QC specimen containers 150, a fourth column indicating the remaining test numbers, of the QC specimen containers 150, which are remaining amount information, and a fifth column indicating the expiration dates regarding the QC specimen containers 150. On the basis of the database 820, the above QC specimen list 2001A is created, and one or more of the QC specimen containers 150 for use in quality control measurement are determined.

Hereinafter, an example of each of processes regarding automatic QC and automatic cleaning in the specimen analysis system 1 will be described in detail with reference to FIG. 35 to FIG. 45. The processes regarding automatic QC and automatic cleaning are mainly executed through functions of the control part 31 of the control unit 30 and the control part 82*a* of the supply unit 80. Hereinafter, FIGS. 46A, 46B, and 46C to FIGS. 49A, 49B, 49C, and 49D showing operations of the supply unit 80 will be referred to as appropriate.

Figure 35:
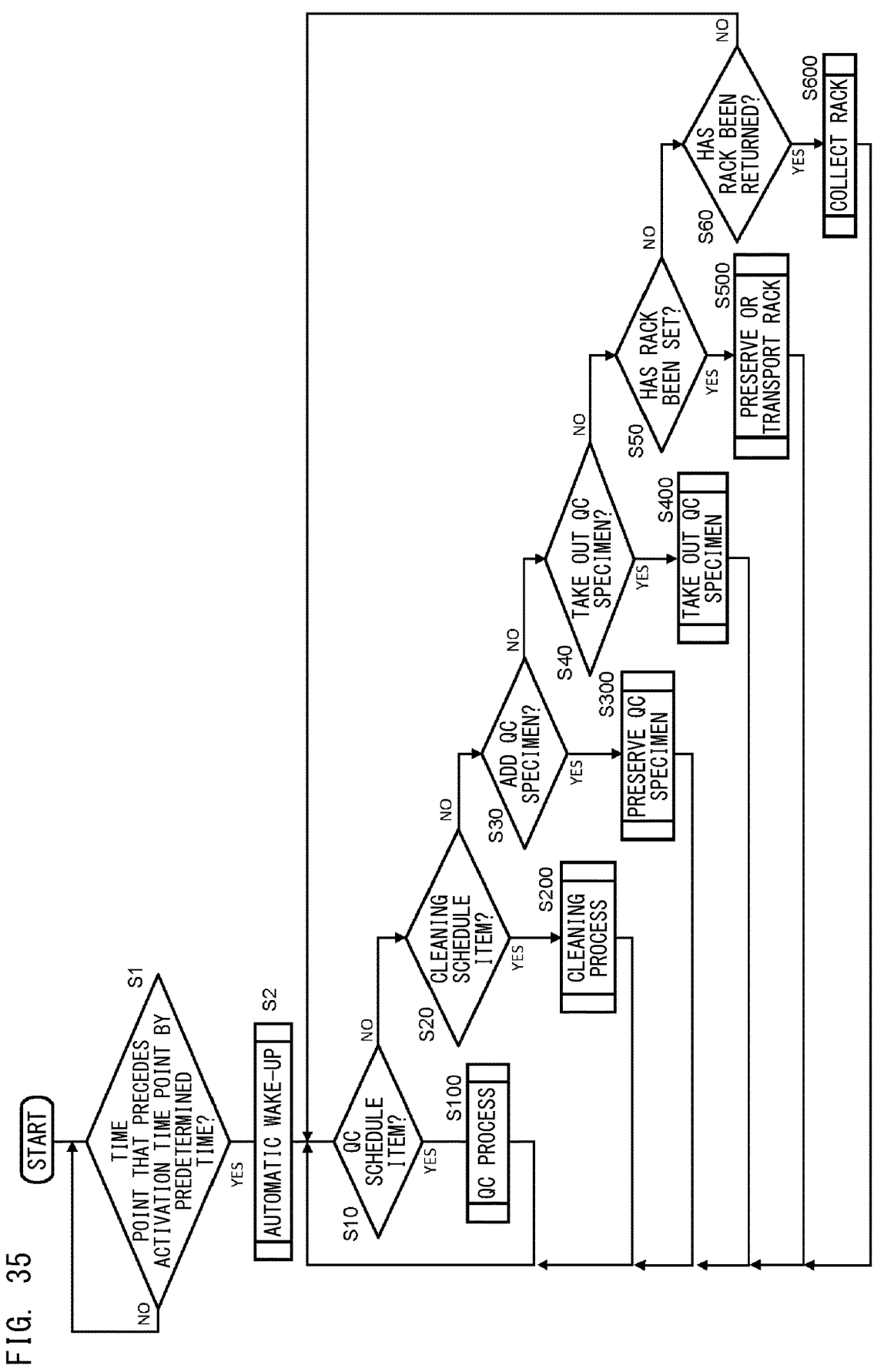
FIG. 35 is a flowchart showing a series of processes to be performed in the specimen analysis system.

FIG. 35 is a flowchart showing an example of a series of processes to be performed in the specimen analysis system 1. The processes in FIG. 35 are executed by the control part 82*a* of the supply unit 80. If a schedule item for automatic wake-up has been registered, the control part 82*a* determines whether or not the present time point has become the time point that precedes the specified time point by the predetermined time (step S1). If the present time point has become the time point that precedes the specified time point by the predetermined time, the control part 82*a* executes automatic wake-up (step S2). The process in S2 is as described with reference to FIG. 6.

When each of the units composing the system is powered on through the automatic wake-up, the control part 82*a* determines whether or not the time point of scheduled automatic QC has arrived (step S10). This determination is performed on the basis of registered information about an automatic QC schedule item saved in the control part 82*a*. If the control part 82*a* determines that the time point of automatic QC has arrived, the control part 82*a* causes quality control measurement with a QC specimen container 150 to be started (step S100). The process in S100 is as described with reference to FIG. 7.

In the case of NO in step S10, the control part 82*a* determines whether or not the time point of scheduled automatic cleaning has arrived (step S20). This determination is performed on the basis of registered information about an automatic cleaning schedule item saved in the control part 82*a*. If the control part 82*a* determines that the time point of automatic cleaning has arrived, the control part 82*a* causes automatic cleaning with a cleaning agent container 180 to be started (step S200). The process in S200 will be described later with reference to FIG. 38.

In the case of NO in step S20, the control part 82*a* determines whether or not a user has given an instruction to add a QC specimen container 150 (step S30). For example, the control part 82a determines whether or not the loading icon 2005 in the device state screen 2000 in FIG. 24 has been operated. If the loading icon 2005 has been operated (YES in step S30), the control part 82a performs a process of causing a QC specimen container 150 to be preserved in the cooling-and-preserving part 84 (step S300). The process in S300 will be described later with reference to FIG. 39.

In the case of NO in step S30, the control part 82a determines whether or not a user has given an instruction to take out a QC specimen container 150 (step S40). For example, the control part 82a determines whether or not the take-out icon 2004 in the device state screen 2000 in FIG. 24 has been operated. If the take-out icon 2004 has been operated (YES in step S40), the control part 82a performs a process of causing a QC specimen container 150 to be taken out from the cooling-and-preserving part 84 (step S400). The process in S400 will be described later with reference to FIG. 40.

In the case of NO in step S40, the control part 82a determines whether or not a rack has been set in the conveyor part 81 of the supply unit 80 (step S50). If the control part 82a determines that a rack has been set (YES in step S50), the control part 82a performs a process of causing the rack to be preserved or transported according to the type of the rack (step S500). The process in S500 will be described later with reference to FIG. 44.

In the case of NO in step S50, the control part 82a determines whether or not a rack sent from the supply unit 80 has been returned to the conveyor part 81 (step S60). If the control part 82a determines that a rack has been returned (YES in step S60), the control part 82a performs a predetermined collection process according to the type of the rack (step S600). The process in S600 will be described later with reference to FIG. 45.

FIG. 35 to FIG. 40, FIG. 44, and FIG. 45 are each a flowchart showing an operation of the supply unit 80. A flowchart showing an example of the automatic wake-up process is as described with reference to FIG. 6. Configuring may be performed such that any of the units that is subjected to automatic wake-up can be specified in the screen 2501 in FIG. 29; and an activation command is transmitted to only the specified unit on the basis of the registered information about the schedule item.

Figure 36:
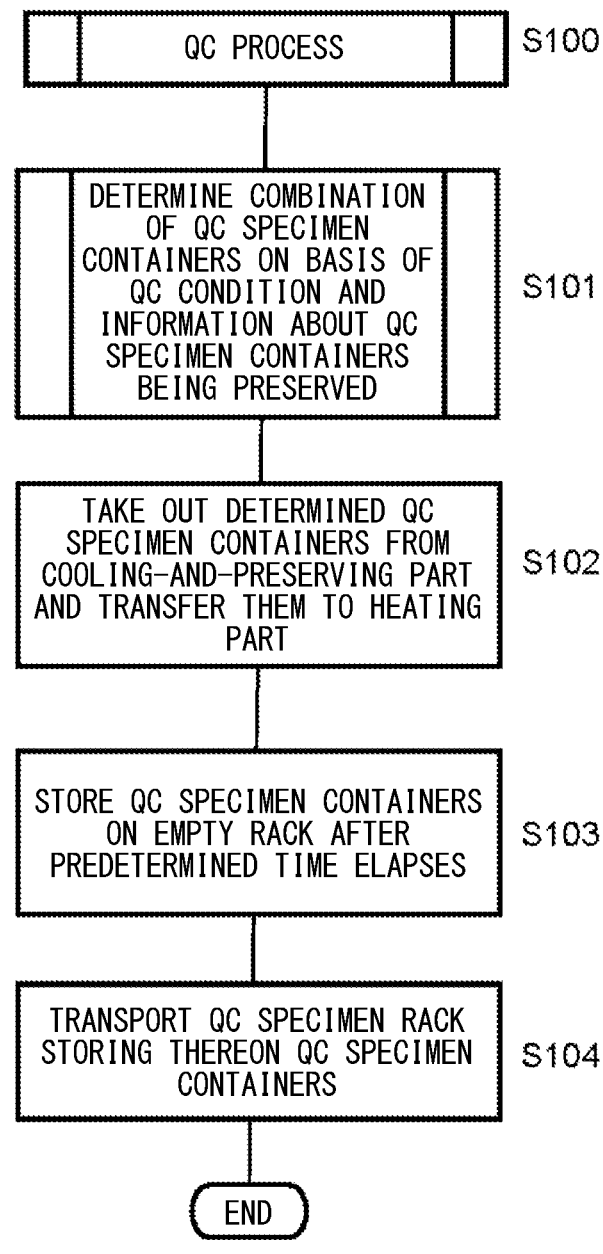
FIG. 36 is a flowchart showing the procedure of an automatic QC process in the supply unit.

FIG. 36 shows a modification of the process in FIG. 7 described as an example of the automatic QC process in the supply unit 80. In step S101, the control part 82a determines a combination of QC specimen containers 150 for use in quality control measurement on the basis of a condition of quality control measurement (QC condition) and information about QC specimens being preserved. For quality control measurement, one QC specimen container 150 may be used, but in general, two or more QC specimen containers 150 accommodating QC specimens having different concentration levels are used.

The QC condition includes one or more specified measurement units that are subjected to quality control measurement. If one or more measurement units that are subjected to quality control measurement have been specified, the control part 82a determines one or more QC specimen containers 150 to be used, according to the number of the specified measurement units. In addition, the information about the QC specimens includes information about the types of the QC specimens, and the QC condition includes specified types of the QC specimens to be used. The control part 82a determines one or more QC specimen containers

150 to be used, on the basis of the specified types of the QC specimens and the information about the types of the QC specimens.

The QC condition may include, as the types of the QC specimens, a plurality of specified concentration levels, specified lots of the QC specimens to be used, or the like. The control part 82a determines a combination of a plurality of QC specimen containers 150 on the basis of, for example, the plurality of specified concentration levels. Alternatively, the control part 82a determines one or more QC specimen containers 150 on the basis of the specified lots and the lot information about the QC specimens. The information about each of the QC specimens may include the remaining amount information about the QC specimen in the corresponding QC specimen container 150, and one or more QC specimen containers 150 may be determined on the basis of the number of the specified measurement units and this remaining amount information.

As described in detail later, if the remaining amount of a first QC specimen container 150 for use in quality control measurement is smaller than the number of tests to be performed on the basis of the number of the specified measurement units, a combination of the first QC specimen container 150 and a second QC specimen container 150 is determined as containers to be used. In this case, a container in which the concentration level is the same as that in the first QC specimen container 150 is selected as the second QC specimen container 150. The remaining amount of each of the QC specimen containers 150 is determined on the basis of, for example, at least the concentration level of and the lot information about the corresponding QC specimen, and the QC condition.

As described above, the information about the QC specimens includes attribute information and remaining amount information about each of the individual QC specimens. Examples of the attribute information include the concentration level of the QC specimen, the lot information about the QC specimen, and the expiration date of the QC specimen. The remaining amount information is, for example, the number of times of possible usage of the QC specimen. The information about the QC specimens is stored in the database 820 in the storage of the control part 82a. Likewise, the QC condition is also stored in the storage.

In step S102, the control part 82a executes control such that the QC specimen containers 150 are taken out from the cooling-and-preserving part 84 and transferred to the heating part 86. Specifically, the control part 82a controls the cooling-and-preserving part 84 to open the cover 842. The control part 82a controls the transfer part 85 to take out, from the cooling-and-preserving part 84, the QC specimen containers 150 determined in S101. The control part 82a stores, in the database 820, information about the QC specimen containers 150 in association with the position numbers of the nine storing portions 841b in the cooling-and-preserving part 84. The control part 82a controls the transfer part 85 to take out the determined QC specimen containers 150 from the storing portions 841b corresponding to the position numbers of the containers and set the containers in the heating part 86. The control part 82a starts clocking when the QC specimen containers 150 are set in the heating part 86.

In step S103, when the predetermined time elapses from the setting of the QC specimen containers 150 in the heating part 86, the control part 82a causes the QC specimen containers 150, each of which has a temperature adjusted to the measurement temperature, to be transferred from the heating part 86 to an empty rack 170 in the rack storing part 88. The control part 82a controls the transfer part 85 to store the QC specimen containers 150 in the empty rack 170. If a plurality of QC specimen containers 150 are used for quality control measurement, each of the QC specimen containers 150 is stored in an empty rack 170 on the basis of an automatic QC condition stored in the storage.

In step S104, the control part 82a executes control such that the QC specimen rack 160 storing thereon the QC specimen containers 150 is transported from the supply unit 80. The control part 82a controls the rack storing part 88 to send the QC specimen rack 160 to the second transport path 812 of the conveyor part 81. The control part 82a controls the conveyor part 81 to transport the QC specimen rack 160 from the supply unit 80 through the third transport path 813 and the fourth transport path 814. The control part 82a notifies the control part 71 of the transport controller 70, of any of the measurement units as a destination for the QC specimen rack 160. The control part 71 of the transport controller 70 controls the corresponding transport unit 20 such that the QC specimen rack 160 is transported to the measurement unit regarding which a notification has been received.

Steps S106A, S107A, and S700 are the same as those in the descriptions of FIG. 7 and FIG. 9.

FIGS. 46A, 46B, and 46C show operations of the supply unit 80 performed in steps S102 to S104 in FIG. 36. As shown in FIG. 46A, the transfer part 85 takes out the QC specimen containers 150 from the corresponding storing portions 841b in the cooling-and-preserving chamber 841a and stores the QC specimen containers 150 in storing portions 86b in the heating part 86 under the control of the control part 82a. Thereafter, the transfer part 85 transfers the QC specimen containers 150 to an empty rack 170 in the rack storing part 88 as shown in FIG. 46B at the moment when a predetermined time has elapsed from transference of the QC specimen containers 150 to the heating part 86.

When a necessary number of QC specimen containers 150 for quality control measurement are stored in the corresponding storing portions 111 of the empty rack 170 (front-end rack), the rack storing part 88 sends the QC specimen rack 160 as a front-end rack storing thereon the QC specimen containers 150 to the second transport path 812 of the conveyor part 81 as shown in FIG. 46C. The QC specimen rack 160 is transported from the supply unit 80 through the third transport path 813 and the fourth transport path 814 of the conveyor part 81.

Figure 37:
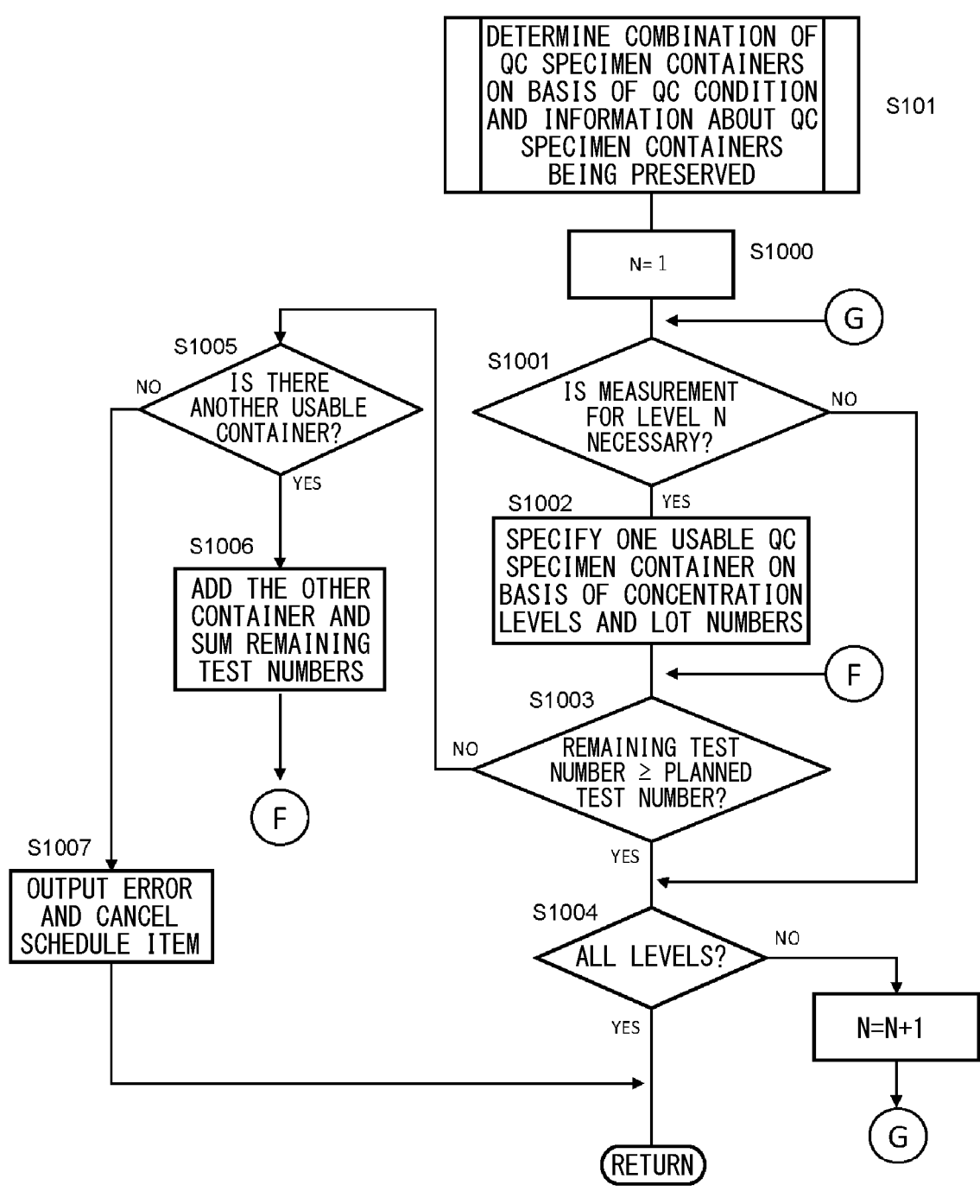
FIG. 37 is a flowchart showing the procedure of a process of determining a combination of QC specimen containers to be used for quality control measurement in automatic QC.

FIG. 37 is a flowchart showing a specific example of the process (step S101 in FIG. 36) of determining a combination of QC specimen containers 150 to be used for quality control measurement. In step S1000, the control part 82a sets, to 1, a variable N representing a concentration level. In step S1001, the control part 82a determines whether or not it is necessary to perform measurement on a QC specimen having the concentration level N. If the variable N is 1, the control part 82a determines whether or not it is necessary to perform measurement on a QC specimen having the concentration level 1. The determination in step S1001 is performed on the basis of the specified concentration levels in the QC condition stored in the storage. For example, if the QC condition includes measurement of a QC specimen having the concentration level 1 as shown in the screen 2502 in FIG. 29, the result of the determination in step S1001 is YES. If measurement of a QC specimen having the concentration level 1 is not specified, steps S1002 and S1003 are skipped, and the process is advanced to step S1004.

In step S1002, the control part 82a specifies, on the basis of the concentration levels and the lot numbers registered in the database 820, one QC specimen container 150 from among the QC specimen containers 150 being preserved in the cooling-and-preserving part 84. For example, the control part 82a specifies a usable QC specimen container 150 from among QC specimen containers 150 having the same lot number as the lot number, of a QC specimen container 150 of the concentration level 1, that is being applied. If there are a plurality of QC specimen containers 150 having the same lot number, a QC specimen container 150 having the smallest remaining test number is specified.

In step S1003, the control part 82a determines whether or not the remaining test number of the specified QC specimen container 150 is equal to or larger than the number of tests in quality control measurement. This determination is performed on the basis of information about the remaining test number of the QC specimen container 150 registered in the database 820. Specifically, the remaining test number of the specified QC specimen container 150 and the execution-planned test number in quality control measurement that is about to be executed are compared with each other, and, if the remaining test number is equal to or larger than the execution-planned test number, the result of the determination is YES.

In step S1004, the control part 82a determines whether or not QC specimen containers 150 of all the concentration levels necessary for quality control measurement have been specified. This determination is performed on the basis of the specified concentration levels in the QC condition stored in the storage. For example, if measurements with the concentration levels being 1 and 2 are specified in the QC condition, steps S1001 to S1003 are executed regarding the concentration level 2.

If, in step S1003, the result of the determination by the control part 82a is NO, i.e., the remaining test number of the specified QC specimen container 150 is smaller than the execution-planned test number, the control part 82a determines in step S1005 whether or not another QC specimen container 150 that is usable and that has the same concentration level is preserved in the cooling-and-preserving part 84. This determination is performed on the basis of the database 820. If another QC specimen container 150 that is usable and that has the same concentration level is preserved (YES in step S1005), the control part 82a adds the remaining test number of the other QC specimen container 150 to the remaining test number of the previously specified QC specimen container 150 (step S1006). Then, the process is returned to step S1003 again, and the control part 82a determines whether or not the remaining test number obtained by the addition is equal to or larger than the execution-planned test number.

The procedure composed of steps S1003, S1005, and S1006 is repeated until the result of determination in step S1003 becomes YES. If no other QC specimen container 150 that is usable and that has the same concentration level is preserved in the cooling-and-preserving part 84 (NO in step S1005), the control part 82a outputs an automatic QC error and cancels the schedule item for automatic QC in step S1007. The automatic QC error is information outputted if preserved QC specimens are insufficient for a registered automatic QC schedule item. A notification about the automatic QC error is displayed on, for example, the monitor 91. In this case, a user needs to set, in the supply unit 80, a QC specimen container 150 of the concentration level 1.

Figure 38:
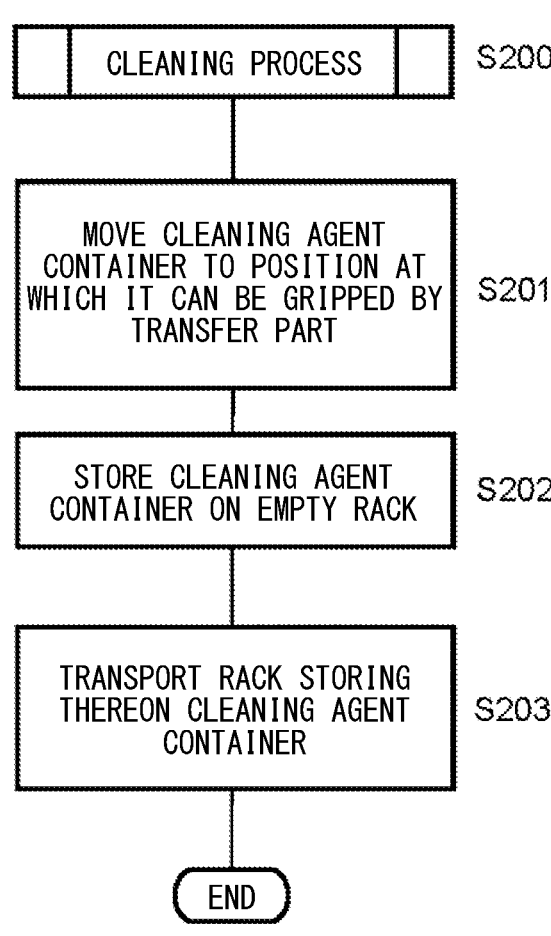
FIG. 38 is a flowchart showing the procedure of an automatic cleaning process in the supply unit.

FIG. 38 is a flowchart showing the process (step S200 in FIG. 35) of automatic cleaning in the supply unit 80. Automatic cleaning is performed on the basis of the automatic cleaning schedule item, and a cleaning agent rack storing thereon a cleaning agent is transported to a unit specified in the schedule item. In step S201, the control part 82a performs control such that a cleaning agent container 180 stored in the second loading part 83B is moved to a position at which the cleaning agent container 180 can be gripped by the transfer part 85. The control part 82a controls the take-out portion 839 of the second loading part 83B such that the cleaning agent container 180 enters a state of being able to be gripped by the transfer part 85.

The control part 82a performs control to transfer the cleaning agent container 180 to an empty rack 170 in the rack storing part 88 in step S202, and performs control to transport the cleaning agent rack storing thereon the cleaning agent container 180 from the supply unit 80 in step S203.

Figure 47A:
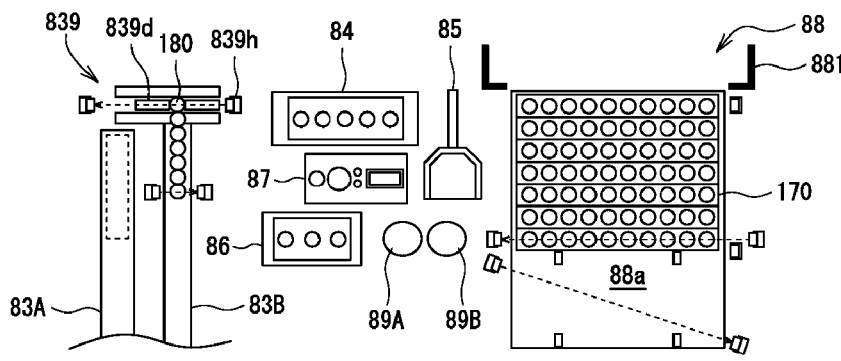
FIGS. 47A, 47B, and 47C show operations of the supply unit during automatic cleaning.
Figure 47B:
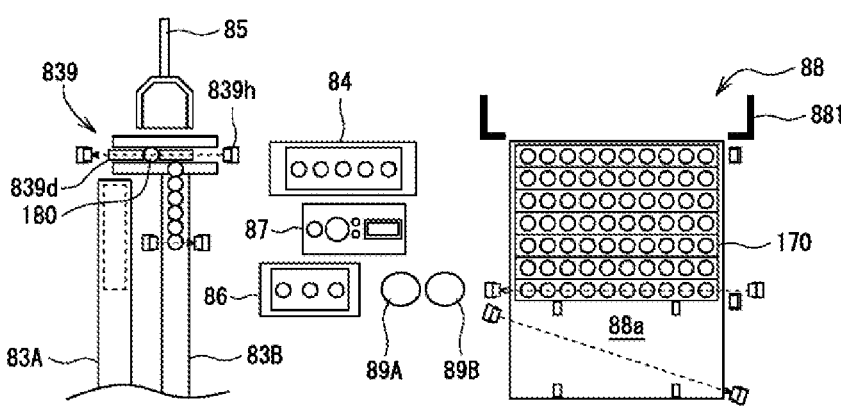
Figure 47C:
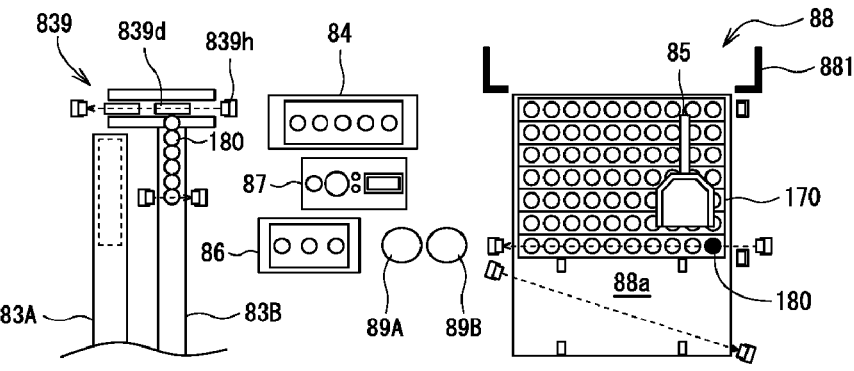

FIGS. 47A, 47B, and 47C show operations of the supply unit 80 performed in steps S201 to S203 in FIG. 38. The cleaning agent container 180 is transferred by the second loading part 83B from the second loading port 831B (see FIG. 14 or the like) to the take-out portion 839 at which access by the transfer part 85 is possible. However, if the transfer plate 839d is positioned on the right end side of the take-out portion 839 as shown in FIG. 47A, the transfer part 85 cannot grip the cleaning agent container 180. In view of this, as shown in FIG. 47B, the transfer plate 839d storing thereon the cleaning agent container 180 is moved to the left end side of the take-out portion 839.

Consequently, the lower end portion of the cleaning agent container 180 is brought into contact with the upper surface of the tilted block 839c (see FIG. 14 or the like) disposed below the transfer plate 839d such that the cleaning agent container 180 is pushed upward, thereby entering a state where the cleaning agent container 180 can be gripped by the transfer part 85. At this time, the cleaning agent container 180 having been pushed upward is detected by the sensor 839h. When the cleaning agent container 180 is detected by the sensor 839h, the transfer part 85 takes out the cleaning agent container 180 from the take-out portion 839 and transfers the cleaning agent container 180 to the empty rack 170 as shown in FIG. 47C. Similar to the QC specimen containers 150, a necessary number of cleaning agent containers 180 for cleaning are transferred from the take-out portion 839 and stored on the front-end rack in the rack storing part 88. Similar to the QC specimen rack 160, the cleaning agent rack storing thereon the cleaning agent containers 180 passes through the second transport path 812, the third transport path 813, and the fourth transport path 814 of the conveyor part 81 from the rack storing part 88 and is transported from the supply unit 80 to any of the measurement units.

Figure 39:
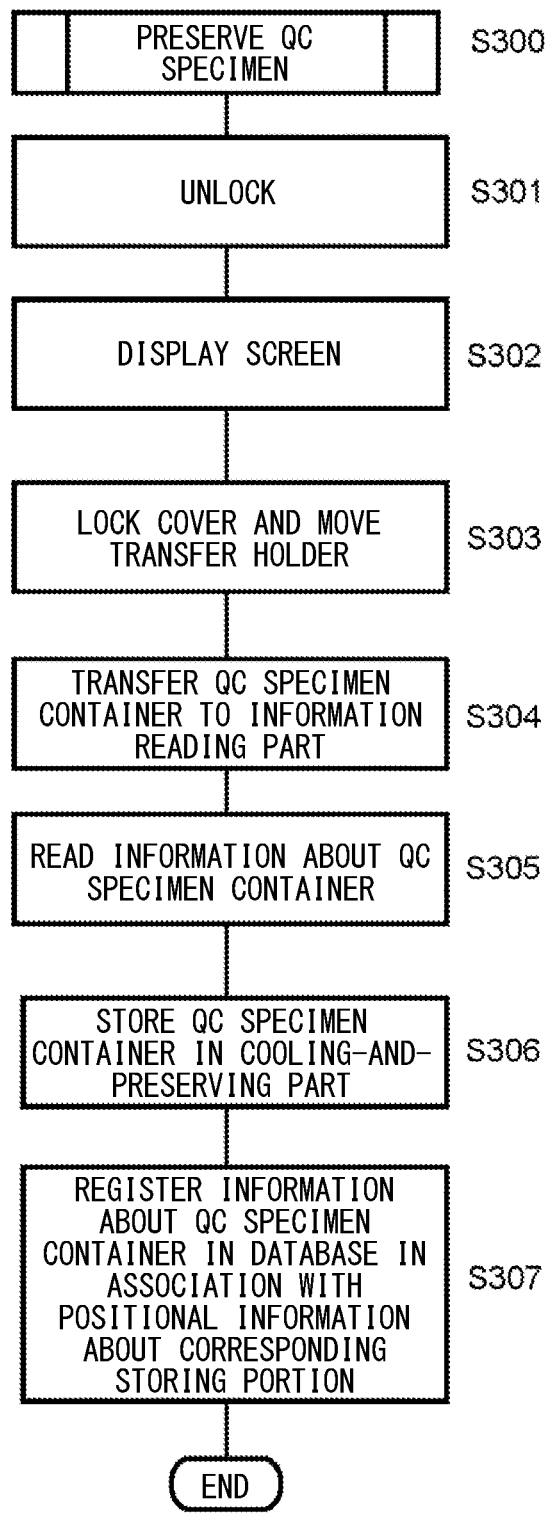
FIG. 39 is a flowchart showing the procedure of a process of preserving QC specimen containers in the cooling-and-preserving part of the supply unit.

FIG. 39 is a flowchart showing the process (step S300 in FIG. 35) of preserving QC specimen containers 150 in the cooling-and-preserving part 84 of the supply unit 80. As described above, the process in FIG. 39 is executed if a user operates the loading icon 2005 in the device state screen 2000. In step S301, the control part 82a controls a lock mechanism for the first cover 832A of the first loading part 83A, to unlock the first cover 832A. When the first cover 832A is unlocked, the control part 82a causes displaying of a screen that prompts setting of QC specimen containers 150 in step S302. An example of this screen is the loading screen 2300 in FIG. 27 and is displayed on the monitor 91.

In step S303, when the OK button in the loading screen 2300 is pressed with QC specimen containers 150 being set in the transfer holder 834 and with the first cover 832A being closed, the control part 82a performs control to lock the first cover 832A. The control part 82a controls the transfer holder 834 to transfer each of the QC specimen containers 150 into the preservation adjustment unit 82. At this time, the transfer holder 834 is moved to the take-out position P5 in the first loading part 83A. In step S304, the control part 82a controls the transfer part 85 to transfer the QC specimen container 150 from the take-out position P5 to the information reading part 87. In step S305, the information reading part 87 reads information about the QC specimen container 150 under the control of the control part 82a.

In step S306, the control part 82a controls the transfer part 85 to transfer the QC specimen container 150 from the information reading part 87 to the cooling-and-preserving part 84. The transfer part 85 stores the QC specimen container 150 in any of the storing portions 841b of the cooling-and-preserving chamber 841a under the control of the control part 82a. In step S307, the control part 82a causes the information about the QC specimen container 150 obtained by the information reading part 87 to be registered in the database 820 in association with the position number of the storing portion 841b storing therein the QC specimen container 150. A storing position for the QC specimen container 150 in the cooling-and-preserving part 84 may be determined at the moment when the information reading part 87 has obtained information. In this case, when the information reading part 87 obtains the information and transmits the information to the control part 82a, the information about the QC specimen container 150 may be registered in the database 820 in association with the position number of the corresponding storing portion 841b.

Figure 48A:
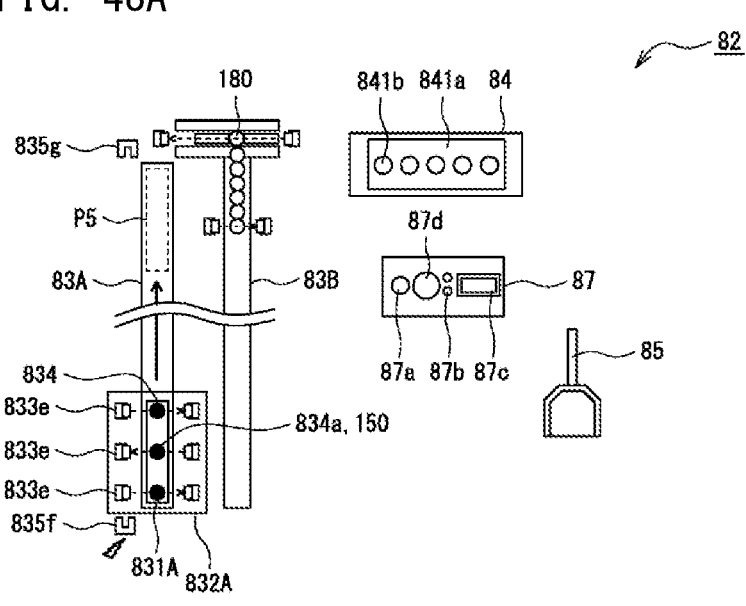
FIGS. 48A, 48B, and 48C show operations of the supply unit at the time of storing QC specimen containers in the cooling-and-preserving part.
Figure 48B:
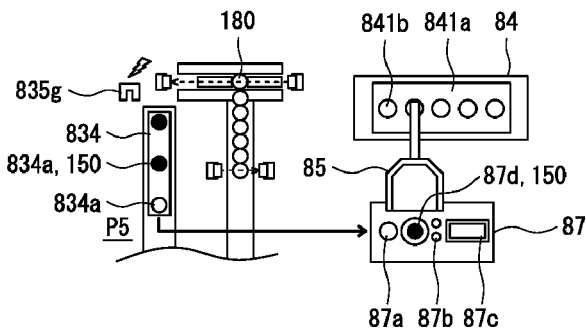
Figure 48C:
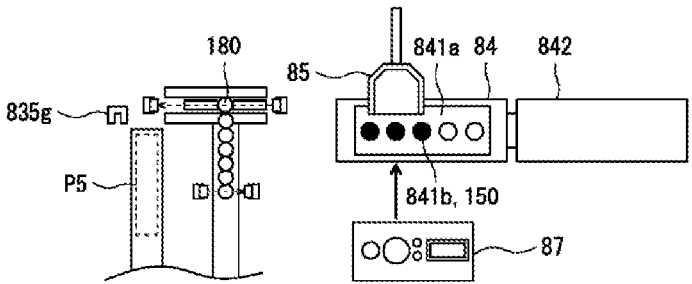

FIGS. 48A, 48B, and 48C show operations of the supply unit 80 performed in steps S301 to S306 in FIG. 39. As shown in FIG. 48A, in the case of preserving QC specimen containers 150 in the cooling-and-preserving part 84 of the supply unit 80, a user sets each of the QC specimen containers 150 in the transfer holder 834 at the first loading port 831A of the first loading part 83A. Since the first loading port 831A is covered with the first cover 832A, the user needs to open the first cover 832A before setting the QC specimen container 150. The first loading part 83A is provided with the lock mechanism for the first cover 832A, and, if the transfer holder 834 exists at the first loading port 831A, the first cover 832A is unlocked so that the first cover 832A can be opened.

At the first loading port 831A, the transfer holder 834 is detected by the sensor 835f. When the sensor 835f detects the transfer holder 834, the loading icon 2005 (see FIG. 24) on the monitor 91 becomes operable, for example, and the first cover 832A is unlocked when the loading icon 2005 is pressed. By configuring the first cover 832A to be openable only if the transfer holder 834 exists at the first loading port 831A, the QC specimen container 150 can be prevented from being mistakenly loaded in the first loading port 831A at which the transfer holder 834 does not exist.

If the QC specimen container 150 is set in any of the storing portions 834a of the transfer holder 834 and the first cover 832A is closed, the control part 82a causes the transfer holder 834 to move and transfer the QC specimen container 150 into the preservation adjustment unit 82. Since the sensors 833e are disposed correspondingly to the respective storing portions 834a in the first loading port 831A, presence or absence of any QC specimen containers 150 and the number of the QC specimen containers 150 having been loaded can be detected from detection information from the sensors 833e.

As shown in FIG. 48B, the transfer holder 834 is moved from the first loading port 831A to the take-out position P5 inside the preservation adjustment unit 82. When the transfer holder 834 arrives at the take-out position P5 and is detected by the sensor 835g, the transfer part 85 takes out the QC specimen containers 150 from the transfer holder 834 and transfers the QC specimen containers 150 one by one to the information reading part 87. In the information reading part 87, the rollers 87a and 87b rotate each QC specimen container 150 disposed in the storing portion 87d, and the reader 87c reads a QC specimen ID from the machine-readable label 103 thereof.

As shown in FIG. 48C, the transfer part 85 transfers the QC specimen container 150 from the information reading part 87 to the cooling-and-preserving part 84 and stores the QC specimen container 150 in any of the storing portions 841b in the cooling-and-preserving chamber 841a. When transference of all the QC specimen containers 150 to the cooling-and-preserving part 84 is ended, the cooling-and-preserving part 84 closes the cover 842 and starts cooling and preserving the QC specimen containers 150. In the example in FIG. 48C, after all the QC specimen containers 150 are taken out from the transfer holder 834, the transfer holder 834 is returned to the first loading port 831A. Information about each QC specimen ID having been read is transmitted to the control part 82a. The QC specimen ID includes information about the concentration level, the lot number, and the expiration date of the QC specimen. The control part 82a updates the database 820 on the basis of the information about the received QC specimen ID. The remaining test number of each QC specimen container 150 in an unused state is 24. Thus, if information about a new QC specimen container 150 is added to the database 820, the control part 82a inputs 24 as an initial value of the remaining test number thereof.

Figure 40:
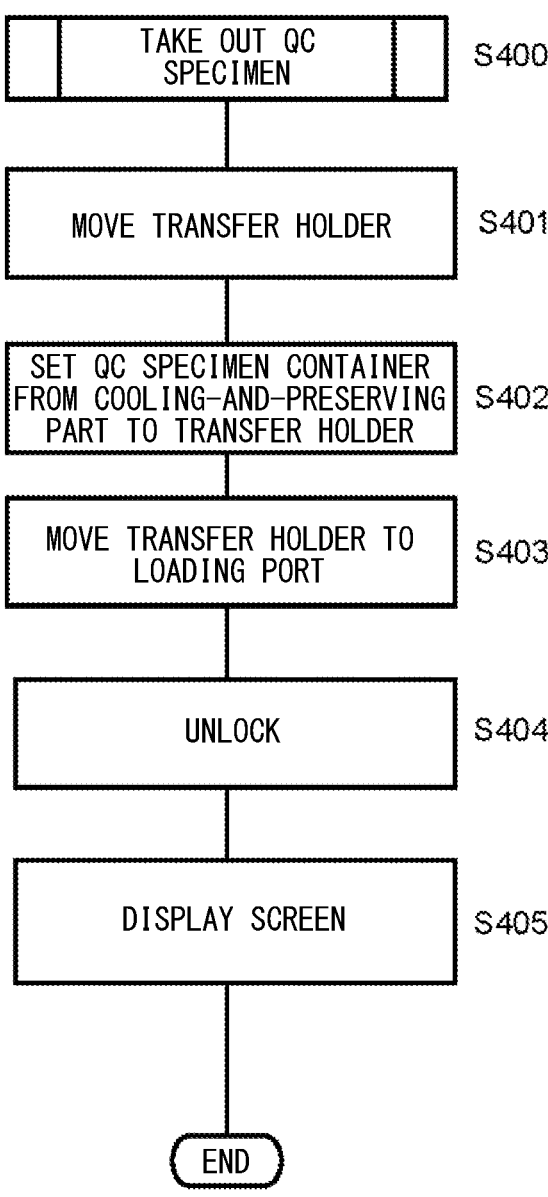
FIG. 40 is a flowchart showing the procedure of a process of taking out a QC specimen container from the cooling-and-preserving part of the supply unit.

FIG. 40 is a flowchart showing the process (S400 in FIG. 35) of taking out a QC specimen container 150 from the cooling-and-preserving part 84 of the supply unit 80. As described above, the process in FIG. 40 is executed if the take-out icon 2004 in the device state screen 2000 is operated. In step S401, the control part 82a controls the transfer holder 834 to be moved into the preservation adjustment unit 82. At this time, the transfer holder 834 is moved to the take-out position P5 in the first loading part 83A. In step S402, the control part 82a controls the transfer part 85 to take out, from the cooling-and-preserving part 84, QC specimen containers 150 stored in the storing portions 841b corresponding to the position numbers specified in the screen 2200 in FIG. 26; and set the QC specimen containers 150 in the transfer holder 834 at the take-out position P5.

In step S403, the control part 82a performs control such that the transfer holder 834 in which the QC specimen containers 150 have been set is moved to the first loading port 831A. The control part 82a unlocks the first cover 832A in step S404 and causes displaying of a screen for giving a notification about arrival of the QC specimen containers 150 in step S405. An example of this screen is the notification screen 2210 in FIG. 26 and is displayed on the monitor 91.

Figure 41:
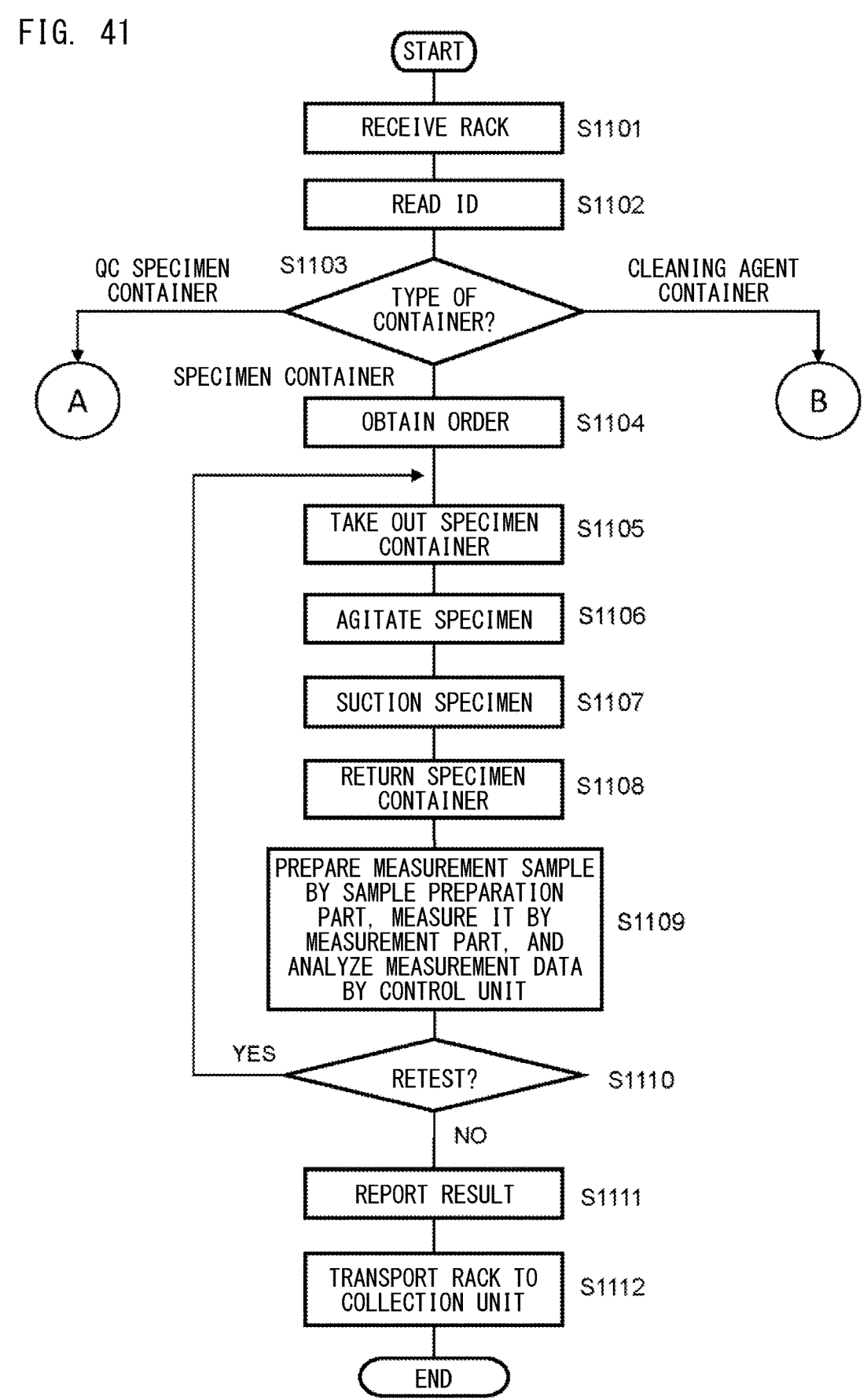
FIG. 41 is a flowchart showing a measurement procedure, for a specimen container, to be performed by the measurement unit.
Figure 42:
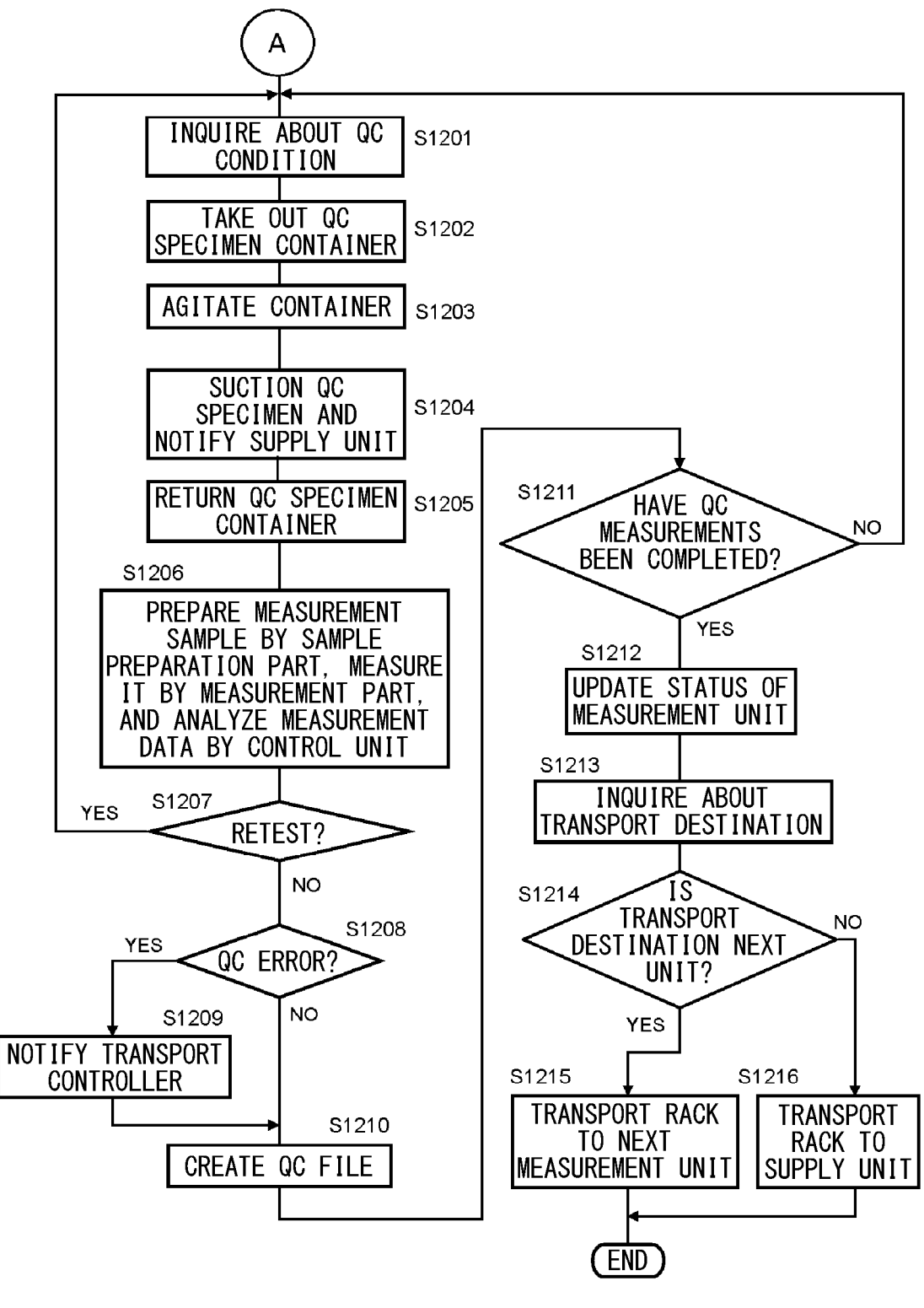
FIG. 42 is a flowchart showing a measurement procedure, for a QC specimen container, to be performed by the measurement unit.
Figure 43:
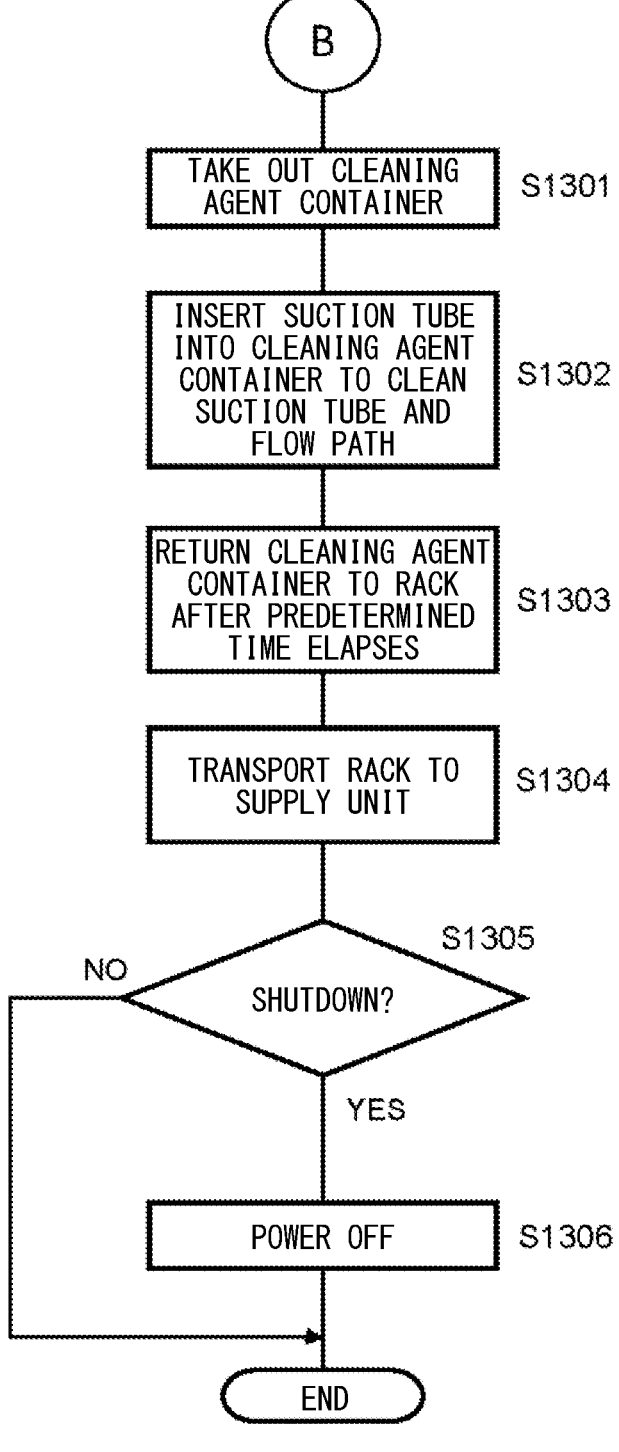
FIG. 43 is a flowchart showing the procedure of a cleaning process to be performed by using a cleaning agent container in the measurement unit.

FIG. 41 to FIG. 43 are flowcharts showing operations of the measurement units. The operation of each of the measurement units is mainly controlled by the corresponding control part 31. Although the operations will be described below with the first measurement unit 10A being taken as an example, the same applies also to the second measurement unit 10B.

FIG. 41 is a flowchart showing an example of a measurement procedure for specimen containers 100, and steps S1101 and S1102 are common to QC specimen containers 150 and cleaning agent containers 180. The control part 31 causes transport of a specimen rack 110 to the second transport path 22 disposed frontward of the first measurement unit 10A in step S1101 and causes the information reading part 26 to read specimen IDs and a rack ID in step S1102. Each of the specimen containers 100 of which the specimen IDs have been read is transported to one of the take-out positions P2 corresponding to the first measurement unit 10A and the second measurement unit 10B. Here, the specimen container 100 is assumed to be transported to the take-out position P2 corresponding to the first measurement unit 10A.

In step S1103, the control part 31 determines the type of the container on the basis of the corresponding specimen ID read in step S1102. If the container transported to the take-out position P2 is determined to be a specimen container 100, the process is advanced to step S1104. Meanwhile, if the container transported to the take-out position P2 is a QC specimen container 150, the process is advanced to step S1201 in FIG. 42. Meanwhile, if the container is a cleaning agent container 180, the process is advanced to step S1301 in FIG. 43.

The control part 31 inquires of the host computer 120 about a measurement order to obtain the measurement order in step S1104, and controls the robot hand 15 to take out the specimen container 100 from the corresponding storing portion 111 of the specimen rack 110 in step S1105. Under the control of the control part 31, the robot hand 15 agitates the taken-out specimen container 100 in an inverting manner in step S1106, and the suction tube 13a of the sample preparation part 13 suctions a specimen from the specimen container 100 in step S1107. When the suction of the specimen is ended, the specimen container 100 is returned to the original storing portion 111 of the specimen rack 110 by the robot hand 15 in step S1108.

Under the control of the control part 31, in step S1109, the sample preparation part 13 prepares a measurement sample from the suctioned specimen, the measurement part 14 performs measurement (first test) on the sample, and measurement data is analyzed. In step S1110, the control part 31 determines, on the basis of the measurement result of the first test, whether or not to perform a retest. In the case of performing a retest, the process is returned to step S1105. Meanwhile, in the case of performing no retest, the result of the first test is transmitted to the host computer 120 (step S1111). When first tests and necessary retests are ended for all the specimen containers 100 stored on the specimen rack 110, the specimen rack 110 stops by, as necessary, the processing unit 40 in which a smear preparation is made. Then, the specimen rack 110 is transported to the collection unit 60 (step S1112).

FIG. 42 is a flowchart showing an example of a procedure in a case where the container is a QC specimen container 150 in step S1103 in FIG. 41. In step S1201, the control part 31 inquires of the control part 82a of the supply unit 80 about a QC condition to obtain the QC condition and, on the basis of the QC condition, causes the QC specimen container 150, on which measurement is to be performed, to be transported to the take-out position P2 of the target first measurement unit. Under the control of the control part 31, the robot hand 15 takes out the QC specimen container 150 from the corresponding storing portion 111 of the QC specimen rack 160 in step S1202 and agitates the taken-out QC specimen container 150 in an inverting manner in step S1203. Alternatively, information about the registered QC condition may be provided to the control part 31 in advance. In this case, the inquiry in step S1201 is unnecessary.

Under the control of the control part 31, the suction tube 13a of the sample preparation part 13 suctions a QC specimen from the QC specimen container 150 in step S1204, and the robot hand 15 returns the QC specimen container 150 to the original storing portion 111 of the QC specimen rack 160 in step S1205. In step S1206, the sample preparation part 13 prepares a measurement sample from the suctioned QC specimen, the measurement part 14 performs measurement (first test) on the sample, and measurement data is analyzed. When the QC specimen is suctioned in step S1204, the control part 31 notifies the control part 82a of the supply unit 80 of information indicating that the suction has been performed. Information about the number of times the QC specimen has been suctioned is used at the time of updating the corresponding remaining test number in the database 820. Alternatively, the control part 82a may update the database 820 so as to reduce the remaining test number of the corresponding QC specimen container 150 upon reception of this notification.

If a retest in which a QC specimen is re-measured is set as a QC condition, the control part 31 determines whether or not a retest is necessary (step S1207). For example, a retest is determined to be necessary in a case where the measurement value is abnormal, such as: a case where the measurement value is outside a predetermined allowable range; or a case where an error of the measurement value from a previous value is outside an allowable range. In the present embodiment, it is assumed that a retest is automatically performed up to one time. That is, if steps S1201 to S1206 are repeated through a retest, the process is advanced to step S1208 regardless of the result of the retest.

In step S1208, the control part 31 determines whether or not to output a QC error. The QC error is outputted in a case where the measurement value of the QC specimen is abnormal even after the retest is performed, e.g., a case where the measurement value of the QC specimen is outside the predetermined allowable range or a case where an error of the measurement value from the previous value is outside the allowable range. The QC error is displayed on, for example, the monitor 91 of the supply unit 80.

When the control part 31 outputs the QC error, the control part 31 gives a predetermined notification to the transport controller 70 (step S1209). The predetermined notification includes information for identifying a measurement unit that has experienced the QC error. The transport controller is programmed to prohibit transport of a specimen container 100 to a measurement unit that has experienced a QC error. Since a plurality of measurement units exist in the specimen analysis system 1, only a measurement unit in which the measurement value of a QC specimen is normal is set as a supply destination for specimen containers 100, and a measurement unit that has experienced an abnormality in the measurement value of the QC specimen is excluded from supply destinations for specimen containers 100. For example, if a QC error has occurred in one of the measurement units 10A and 10B of the measurement block 10 on the upstream side of the specimen analysis system 1 in FIG. 1, the transport controller 70 excludes the measurement block on the upstream side from the supply destinations for specimen containers 100 so that the specimen containers can be supplied to only the measurement block 10 on the downstream side. With this configuration, measurement can be prevented from being mistakenly performed on a specimen by a measurement unit that has experienced a QC error and in which quality is not guaranteed. Further, while the measurement unit that has experienced the QC error is being recovered, measurement can be started by another normal measurement unit, whereby convenience is high.

The control part 31 creates a QC file on the basis of measurement value of the QC specimen (step S1210). As described above, the QC file is a QC specimen measurement result created for each concentration level and each lot, and is saved in the database 310. If a QC file has already been created regarding the same concentration level and lot as those of the QC specimen on which measurement has been performed, the QC file is updated by adding a new measurement value to the file. In step S1211, the control part 31 determines, on the basis of the QC condition, whether or not all quality control measurements in the first measurement unit have been ended. Steps S1201 to S1211 are repeated in, for example, a case where not all measurements have been ended, such as a case where measurement of a QC specimen having a different concentration level is necessary.

If all the measurements in the first measurement unit have been ended (YES in step S1211), the control part 31 updates the status of the first measurement unit on the basis of the QC result (step S1212). Examples of the status include two statuses which are a standby status and an error status. The standby status is a status where the measurement unit can measure a specimen. The error status is a status where the measurement unit has experienced an error; and measurement of a specimen is impossible or is prohibited. The control part 31 sets the status of the measurement unit to the standby status if the QC result is normal, i.e., there is no QC error. The control part 31 is programmed to, if a specimen rack 110 storing thereon a specimen container 100 is transported, control the transport unit 20 to supply the specimen container 100 to the measurement unit that is in the standby status. Meanwhile, the control part 31 sets the status of the measurement unit to the error status if there is a QC error. The control part 31 is programmed such that no specimen is supplied to any of the measurement units that is in the error status. The status of the measurement unit that has experienced an error can be changed to the standby status if, for example, a user manually measures a QC specimen or recovery from error is performed.

The control part 31 inquires of the control part 82a of the supply unit 80 about a transport destination for the QC specimen rack 160 (step S1213), and determines a transport destination (step S1214). If there is a next measurement unit as a transport destination for the QC specimen rack 160 (YES in step S1214), the transport unit 20 transports the QC specimen rack 160 to the next measurement unit under the control of the control part 31 (step S1215). For example, if the next measurement unit is the second measurement unit 10B, the transport unit 20 transports the QC specimen rack 160 from the first measurement unit 10A toward the second measurement unit 10B through the second transport path 22. If the next measurement unit is in the adjacent measurement block, the transport unit 20 transports the QC specimen rack 160 toward the downstream side by the belt 21b (see FIG. 10) of the first transport path 21. If the transport destination for the QC specimen rack 160 is the supply unit (NO in step S1214), the transport unit 20 transports the QC specimen rack 160 through the third transport path 23 in order to transport the QC specimen rack 160 to the supply unit 80 (step S1216).

FIG. 43 is a flowchart showing an example of a procedure in a case where the container is a cleaning agent container 180 in step S1103 in FIG. 41. In this case, the cleaning agent container 180 is taken into the first measurement unit 10A, and a cleaning process is performed. In step S1301, the control part 31 causes the robot hand 15 to take out the cleaning agent container 180 from the corresponding storing portion 111 of the cleaning agent rack. In step S1302, the control part 31 causes the suction tube 13a to be inserted into the cleaning agent container 180, and causes a cleaning agent to be suctioned therefrom, whereby the suction tube 13*a* and a flow path are cleaned.

The cleaning agent container 180 is returned to the rack after a predetermined time elapses (step S1303), and the cleaning agent rack storing thereon the cleaning agent container 180 is transported to the supply unit 80 (step S1304). Thereafter, the control part 82*a* determines whether or not execution of automatic shutdown is set to be ON (step S1305). This determination is performed on the basis of registered information about a schedule item saved in the control part 82*a*. If automatic shutdown is set to be ON, the control part 82*a* powers off the measurement unit 10A or 10B in which cleaning has been performed, after processing of the cleaning agent container 180 having been used is ended, for example (step S1306).

Figure 44:
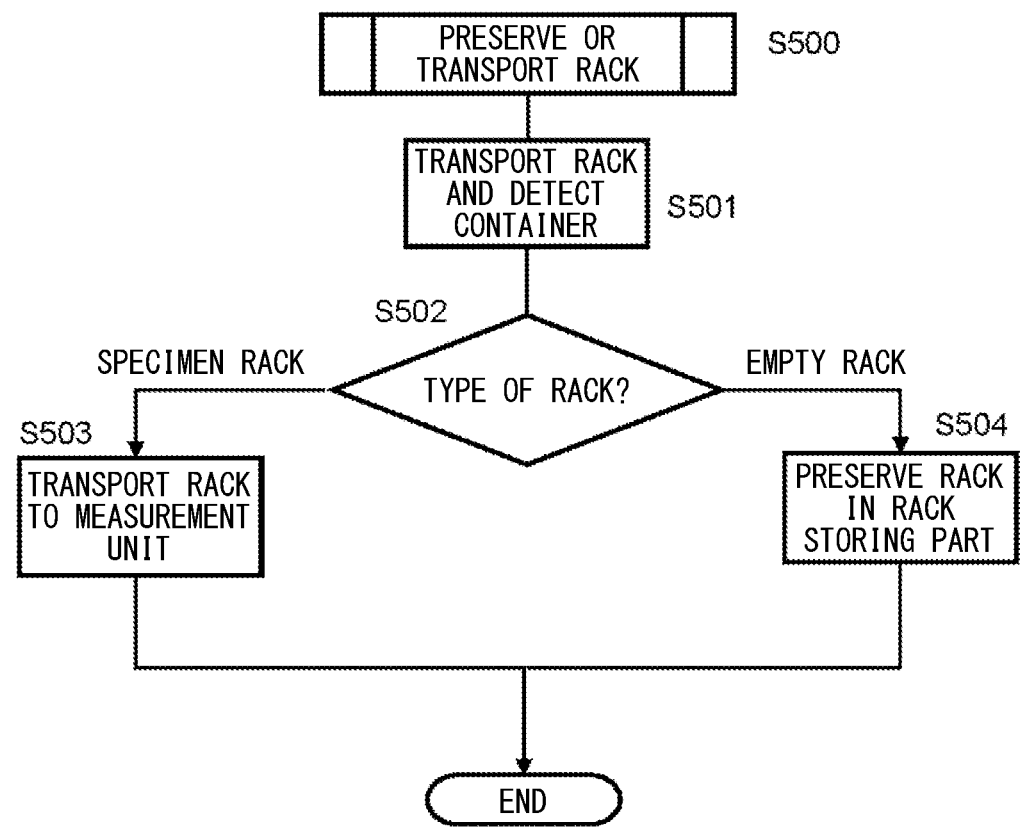
FIG. 44 is a flowchart showing the procedure of a process of transporting or preserving a rack.

FIG. 44 is a flowchart showing the process (S500 in FIG. 35) for a rack set on the first transport path 811 of the conveyor part 81. As described above, the supply unit 80 includes the first transport path 811 accessible from outside in order to set a rack thereon by a user, and a specimen rack 110 and an empty rack 170 are set on the first transport path 811 by the user. Each of the racks set on the first transport path is detected by the sensor 818*b*.

In step S501, the control part 82*a* performs control to transport the rack from the first transport path 811 to the second transport path 812, and the sensor 818*d* detects a container. In step S502, the control part 82*a* determines which of a specimen rack 110 and an empty rack 170 the rack set on the first transport path 811 is. The control part 82*a* determines the type of the rack on the basis of whether or not any container is stored on the rack. If a container is detected, the control part 82*a* determines that the rack is a specimen rack. Meanwhile, if no container is detected, the control part 82*a* determines that the rack is an empty rack. The process in FIG. 44 is executed if a user sets a rack on the first transport path 811, and, in the present embodiment, a QC specimen rack 160 storing thereon a QC specimen container 150 is assumed to be returned to the supply unit 80 via the fifth transport path 815, and thus no branch corresponding to such a QC specimen rack 160 is present regarding determination in S501.

If the rack set on the first transport path 811 is a specimen rack 110, the specimen rack 110 is transported to any of the measurement units under the control of the control part 82*a* and the transport controller 70 (step S503). If the rack set on the first transport path 811 is an empty rack 170, the empty rack 170 is transported to the rack storing part 88 and preserved in the rack storing part 88 (step S504).

Figure 49A:
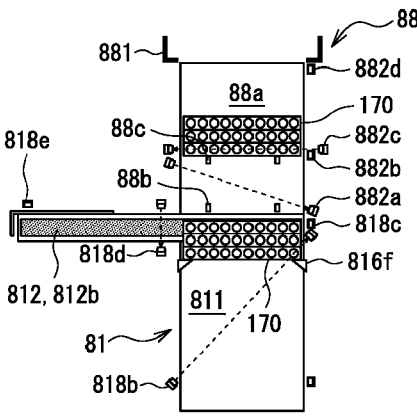
FIGS. 49A, 49B, 49C, and 49D show operations of the supply unit at the time of storing an empty rack in the rack storing part.
Figure 49B:
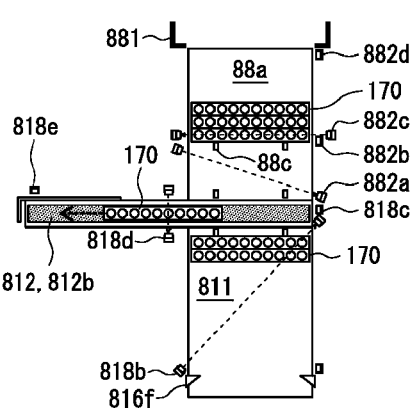

FIGS. 49A, 49B, 49C, and 49D show operations of the supply unit 80 performed in steps S502 and S504 in FIG. 44. As shown in FIG. 49A, when a user sets empty racks 170 on the first transport path 811, each of the empty racks 170 is detected by the sensor 818*b* and pushed out from the first transport path 811 to the right end side of the second transport path 812 by the first sending part 816A. Next, as shown in FIG. 49B, the empty rack 170 is detected by the sensor 818*c* at the position of the right end of the second transport path 812, is moved to the position of the left end by the belt 812*b* of the second transport path 812, and is detected by the sensor 818*e*.

Figure 49C:
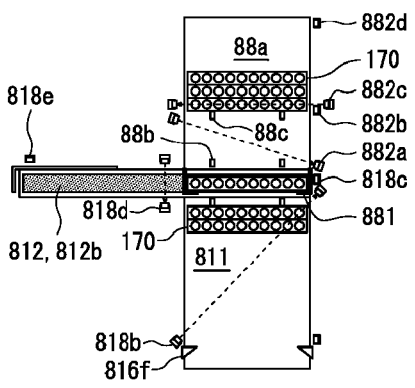
Figure 49D:
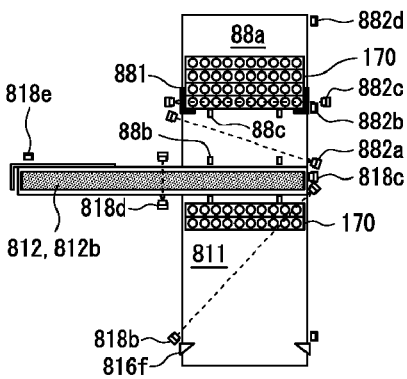

If no container is detected on the second transport path 812 by the sensor 818*d* and the rack is determined to be an empty rack 170, the empty rack 170 is returned to the position of the right end of the second transport path 812 again by the belt 812*b* as shown in FIG. 49C. Then, as shown in FIG. 49D, the empty rack 170 is detected by the sensor 818*c* and drawn to the transport path 88*a* by the transport arms 881. The empty rack 170 is drawn to the position for a front-end rack behind the stopper 88*c* by the transport arms 881. At this time, the stoppers 88*b* and 88*c* are lowered in conjunction so as not to hinder transport of the empty rack 170.

Figure 45:
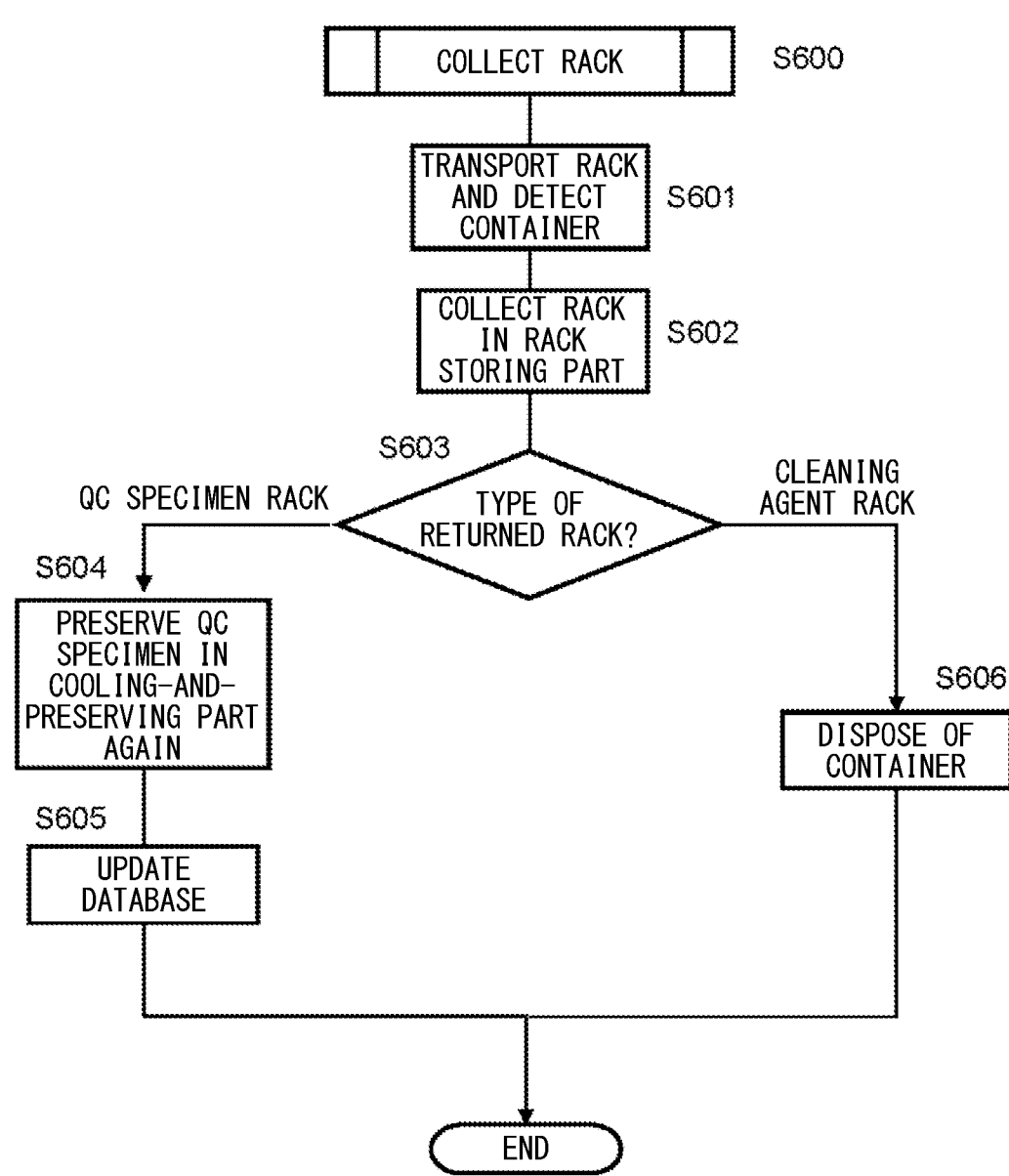
FIG. 45 is a flowchart showing the procedure of a rack collection process.

FIG. 45 is a flowchart showing the process (S600 in FIG. 35) to be performed when a rack is returned to the supply unit 80. As described above, the supply unit 80 includes the fifth transport path 815 for receiving a rack from the adjacent transport unit 20, and, through the fifth transport path 815, a QC specimen rack 160 and a cleaning agent rack are returned to the supply unit 80.

In step S601, the control part 82*a* controls the second transport path 812 such that the rack is transported therethrough, and causes each of the first information reading part 817A and the second information reading part 817B to read an ID of a container stored on the rack.

The control part 82*a* controls the second transport path 812 and the rack storing part 88 such that the rack in which the container ID has been read is collected in the rack storing part 88 (step S602). The control part 82*a* determines, on the basis of the ID read in step S601, which of a QC specimen rack 160 and a cleaning agent rack the returned rack is (step S603). If the container stored on the rack is a QC specimen container 150, the control part 82*a* determines that the rack is a QC specimen rack 160. Meanwhile, if the container stored on the rack is a cleaning agent container 180, the control part 82*a* determines that the rack is a cleaning agent rack.

If the collected rack is a QC specimen rack 160 storing thereon a QC specimen container 150, the control part 82*a* controls the transfer part 85 and the cooling-and-preserving part 84 such that the QC specimen container 150 is stored and preserved again in the cooling-and-preserving part 84 (step S604). The control part 82*a* updates the database 820 on the basis of the process in step S602 (step S605). Specifically, the control part 82*a* updates, on the basis of a notification related to suction from the QC specimen container 150 and received from the measurement unit 10A or 10B, the remaining test number of the QC specimen in the database 820. Although, in the above aspect, the QC specimen container 150 is preserved again regardless of the remaining amount in step S602, processing may be performed on the QC specimen container 150 on the basis of, for example, the remaining amount information. For example, a QC specimen container 150 with a remaining test number of equal to or larger than 1 may be transferred to and preserved in the cooling-and-preserving part 84, and a QC specimen container 150 with a remaining test number of smaller than 1 may be transferred to and disposed of in the first collection part 89A.

If the collected rack is a cleaning agent rack storing thereon a cleaning agent container 180, the control part 82*a* controls the transfer part 85 to transfer the cleaning agent container 180 from the rack to the second collection part 89B in which the cleaning agent container 180 is disposed of (step S606).

Figure 50:
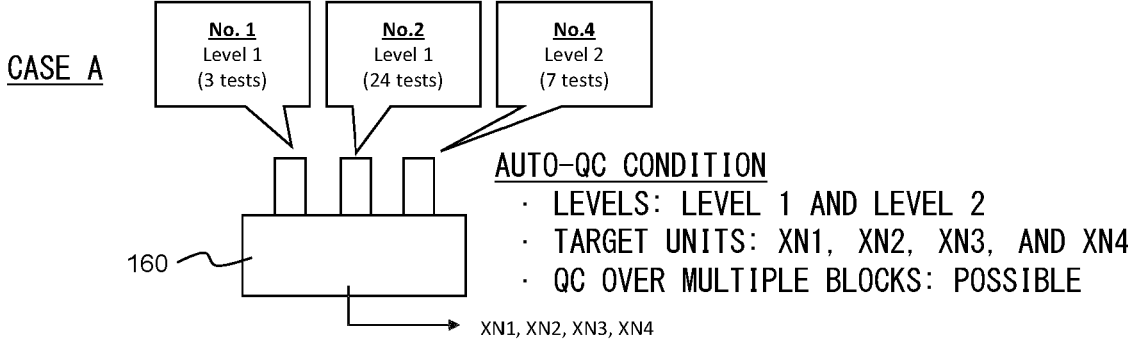
FIG. 50 shows a specific example of the combination of QC specimen containers.
Figure 50:
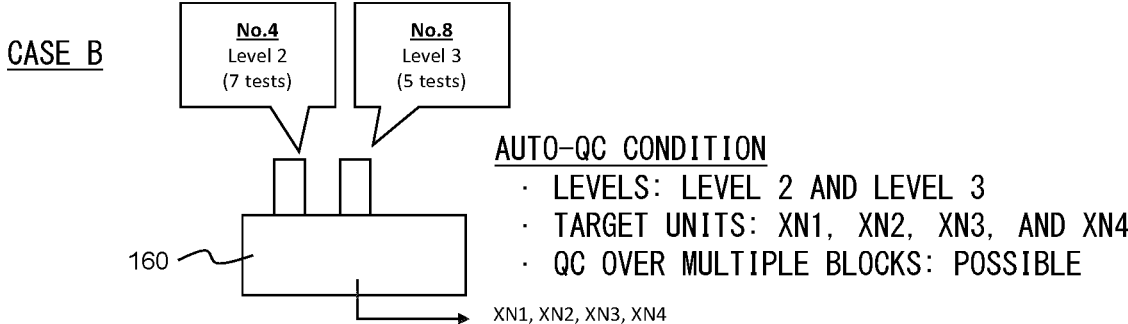
Figure 50:
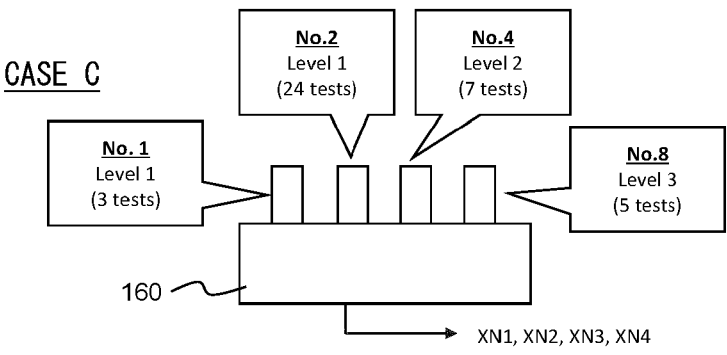
Figure 51:
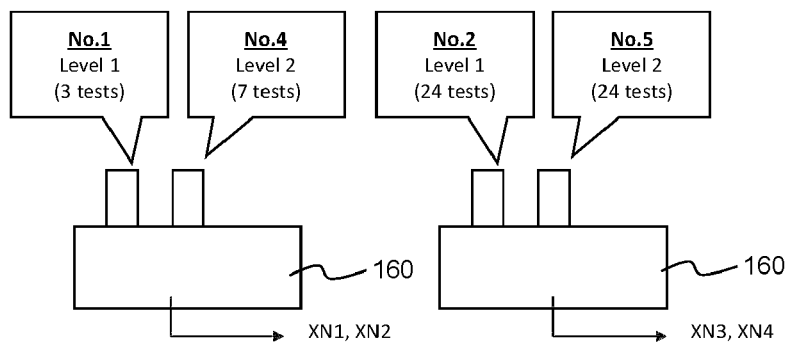
FIG. 51 shows a specific example of the combination of QC specimen containers.
Figure 51:
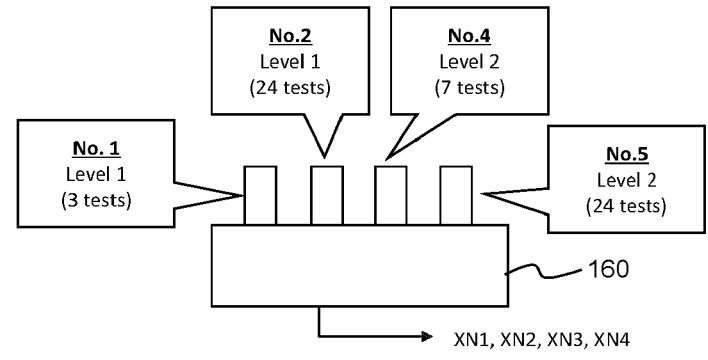
Figure 52:
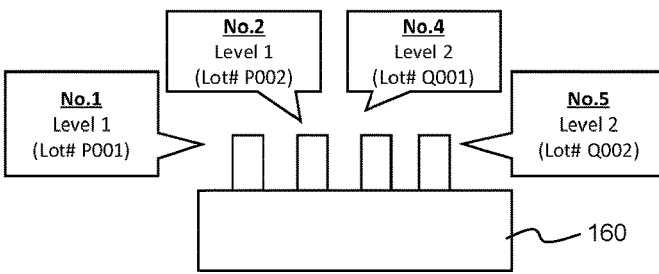
FIG. 52 shows a specific example of the combination of QC specimen containers.

FIG. 50 to FIG. 52 explain details of the process of determining a combination of QC specimen containers 150 in step S101 in FIG. 36 on the basis of the QC condition and information about the QC specimen containers 150 being preserved. Hereinafter, description will be given on the assumption that the QC specimen containers 150 listed in the database 820 in FIG. 34 are preserved in the cooling-and-preserving part 84.

FIG. 50 shows cases A to C.

<Case A>

In case A, the following QC condition is set:

Concentration levels to be used: levels 1 and 2

Units to be subjected to quality control measurement: XN1, XN2, XN3, and XN4

QC over multiple blocks: possible

QC over multiple blocks refers to setting as to whether or not to perform quality control measurement on a plurality of measurement blocks by using one QC specimen rack 160. If the QC over multiple blocks is set to be "possible", quality control measurement is performed on the entire specimen analysis system by using QC specimen containers 150 set on one QC specimen rack 160. The result of determination as to whether to set the QC over multiple blocks to be possible or impossible changes according to the preference of the user. For example, said result changes according to whether to prioritize the efficiency of automatic QC or to prioritize easiness of QC specimen management.

For example, if the QC over multiple blocks is set to be "impossible", QC specimen racks 160 are transported to the plurality of respective measurement blocks. Consequently, quality control measurements can be simultaneously performed on the plurality of measurement blocks, and thus the quality control measurements for the entire specimen analysis system can be efficiently executed.

If the QC over multiple blocks is set to be "possible", quality control can be performed on the plurality of measurement blocks by using a QC specimen container 150 set on one QC specimen rack 160. In the case of simultaneously performing quality control measurements, a plurality of QC specimen containers 150 in which the concentration levels are the same as each other are simultaneously used, for example, and thus management of expiration dates and lot numbers might be complicated. In this respect, if the QC over multiple blocks is set to be "possible", the same QC specimen container 150 is used for the first measurement block and the second measurement block, for example, and thus the number of QC specimen containers 150 that are consumed at one time can be reduced, whereby management becomes easy.

In case A, the QC over multiple blocks is set to be "possible", and thus QC specimen containers 150 having level 1 and level 2 are stored on one rack. The control part 82*a* specifies a usable QC specimen container 150 from among the QC specimen containers 150 each having the same lot number as a lot number being applied. Here, it is assumed that the lot number being applied is "A01XXXX" as for level 1 and is "A002XXX" as for level 2. In this case, as for level 1, the QC specimen containers 150 of the position numbers 1 and 2 are specified as usable containers. As for level 2, the QC specimen containers 150 of the position numbers 4 and 5 are specified as usable containers.

If the number of the usable QC specimen containers 150 is determined to be only one on the basis of each lot number, the control part 82*a* determines whether or not the remaining test number of the container is equal to or larger than the execution-planned test number, i.e., the number of tests planned to be executed in automatic QC. As described above, if the remaining test number is smaller than the execution-planned test number, the control part 82*a* outputs an automatic QC error and cancels the schedule item. If the remaining test number is equal to or larger than said number of tests, the specified QC specimen container 150 is set on a rack.

If two or more usable QC specimen containers 150 are determined to be present on the basis of each lot number, the control part 82*a* determines whether or not the remaining test number of a container having the smallest remaining test number out of the usable QC specimen containers 150 is equal to or larger than the number of tests planned to be executed in automatic QC. If the remaining test number is equal to or larger than the execution-planned test number, the specified container, i.e., the container having the smallest remaining test number, is set on a rack. If the remaining test number is smaller than the execution-planned test number, the control part 82*a* determines whether or not a remaining test number (total remaining test number) obtained by summing the remaining test number of the container having the smallest remaining test number and another one of the containers having the second smallest remaining test number is equal to or larger than the execution-planned test number.

If the total remaining test number is equal to or larger than the execution-planned test number, these two QC specimen containers 150 are set on a rack. If the total remaining test number of the two QC specimen containers 150 is smaller than the execution-planned test number, the remaining test number of a third one of the QC specimen containers 150 is added to the sum, and similar determination is repeated. If, even when the remaining test numbers of all the QC specimen containers 150 determined to be usable on the basis of each lot number are summed, the resultant total remaining test number is smaller than the execution-planned test number, the control part 82*a* outputs an automatic QC error and cancels the schedule item.

In case A, four tests need to be performed on the four respective units XN1 to XN4 as for level 1. Out of the QC specimen containers 150 of the position numbers 1 and 2 specified on the basis of the relevant lot number, the container of the position number 1 having the smallest remaining test number is preferentially selected for use. A remaining test number "3" of the QC specimen container 150 of the position number 1 is compared with an execution-planned test number "4". The remaining test number of the QC specimen container 150 of the position number 1 is 3 and is smaller than the execution-planned test number 4. Thus, with the QC specimen container 150 of the position number 1 alone, the remaining test number is insufficient, by 1 test, for performing quality control measurement on the units XN1 to XN4. Therefore, a total remaining test number "27" obtained by summing a remaining test number "24" of the QC specimen container 150 of the position number 2 having the second smallest remaining test number and the remaining test number "3" of the QC specimen container 150 of the position number 1 is compared with the execution-planned test number "4". "27 tests" is equal to or larger than the execution-planned test number, and thus, in this case, an automatic QC error is avoided, and the QC specimen containers 150 of the position numbers 1 and 2 are set in combination on a rack. In other words, quality control measurement for level 1 is executed with the QC specimen containers 150 of the position numbers 1 and 2 being combined.

In case A, four tests need to be performed on the four respective units XN1 to XN4 also as for level 2. The usable QC specimen containers 150 specified on the basis of the relevant lot number are containers of the position numbers 4 and 5. The remaining test number of the QC specimen container 150 of the position number 4 is 7 and is larger than the execution-planned test number 4. Thus, the QC specimen container 150 of the position number 4 alone suffices. Therefore, the QC specimen container 150 of the position number 4 is set on the rack.

That is, in case A, the QC specimen containers 150 of the position numbers 1, 2, and 4 are set in combination on the one rack.

<Case B>

In case B, the following QC condition is set:

Concentration levels to be used: levels 2 and 3

Units to be subjected to quality control measurement: XN1, XN2, XN3, and XN4

QC over multiple blocks: possible

As for level 2, quality control measurement can be executed on the four units by using only the QC specimen container 150 of the position number 4 in the same manner as in case A, and thus the QC specimen container 150 of the position number 4 is specified as a container for use in quality control measurement.

As for level 3, only the QC specimen container 150 of the position number 8 is preserved in the cooling-and-preserving part 84. The remaining test number of the QC specimen container 150 of the position number 8 is 5 and is larger than the execution-planned test number 4. Thus, the QC specimen container 150 of the position number 8 is specified as a container for use in quality control measurement.

Therefore, in case B, the QC specimen containers 150 of the position numbers 4 and 8 are set in combination on one rack.

<Case C>

In case C, the following QC condition is set:

Concentration levels to be used: levels 1, 2, and 3

Units to be subjected to quality control measurement: XN1, XN2, XN3, and XN4

QC over multiple blocks: possible

In case C, the QC specimen containers 150 of the position numbers 1, 2, 4, and 8 are specified as containers for use in quality control measurement according to the algorithms described regarding the above case A and case B. Therefore, in case C, the four specified QC specimen containers 150 are set in combination on one rack.

FIG. 51 shows cases D and E.

<Case D>

In case D, the following QC condition is set:

Concentration levels to be used: levels 1 and 2

Units to be subjected to quality control measurement: XN1, XN2, XN3, and XN4QC over multiple blocks: impossible In case D, the QC over multiple blocks is set to be "impossible" unlike in case A. In this case, the number of measurement blocks to which one QC specimen rack 160 is transported is limited to one. That is, different QC specimen racks 160 need to be transported to the respective measurement blocks.

QC specimen containers 150 for use in quality control measurement of a first one of the measurement blocks are set on a first one of the QC specimen racks 160. QC specimen containers 150 each having a remaining test number of equal to or larger than 2 are specified as for the respective levels 1 and 2 and set in combination on the first QC specimen rack 160. The same applies to a second one of the QC specimen racks 160. In case D, a combination of the QC specimen containers 150 of the position numbers 1 and 4 is set on the first QC specimen rack 160, and a combination of the QC specimen containers 150 of the position numbers 2 and 5 is set on the second QC specimen rack 160.

<Case E>

In case E, the following QC condition is set:

Concentration levels to be used: levels 1 and 2

Units to be subjected to quality control measurement: XN1, XN2, XN3, and XN4

QC over multiple blocks: possible

Retest setting: enabled

In case E, the condition of "retest being enabled" is added unlike in case A. "Retest being enabled" means a condition in which a retest is automatically performed in a case where a retest is necessitated as a result of measurement of a QC specimen. The case where a retest is necessitated is exemplified by a case where, as a result of measuring a QC specimen in any of the measurement units, the measurement value is outside an allowable range, or an error of the measurement value from a previous value is outside an allowable range.

In case E, it is assumed that a retest is automatically performed up to one time in a case where a retest is necessitated as a result of quality control measurement performed through automatic QC. That is, it is assumed that each of the measurement units performs, on one QC specimen container 150, up to two times of measurements including a first test and a retest. A QC specimen container 150 is taken out from the cooling-and-preserving part 84 and then heated for a certain time (for example, 15 minutes) in the heating part 86 before being used. Therefore, in a case where the remaining test number of a QC specimen container 150 set on a rack is smaller than the number of tests necessary for retests, and a retest is necessitated, it is necessary to newly take out a QC specimen container 150 from the cooling-and-preserving part 84 and heat the QC specimen container 150 for the certain time, whereby a time loss occurs. In view of this, in the present embodiment, if the QC condition includes the "retest setting being enabled", QC specimen containers are set on a rack with inclusion of the number of tests necessary for automatic retests.

In case E, the four measurement units XN1 to XN4 are specified as targets. Therefore, as for each of the concentration levels, 8 tests need to be ensured with inclusion of first tests and retests. As for level 1, the remaining test number of the QC specimen container 150 of the position number 1 is 3 and is smaller than 8. Therefore, as for level 1, the QC specimen containers 150 of the position numbers 1 and 2 are set in combination on a rack. As for level 2, the remaining test number of the QC specimen container 150 of the position number 4 is 7 and is smaller than 8. Therefore, as for level 2, the QC specimen containers 150 of the position numbers 4 and 5 are set in combination on the rack. FIG. 52 shows case F.

<Case F>

In case F, the following QC condition is set:

Concentration levels to be used: levels 1 and 2

Units to be subjected to quality control measurement: XN1, XN2, XN3, and XN4

QC over multiple blocks: possible

Inter-lot difference checking: ON

In case F, the condition of "inter-lot difference checking function being ON" is added unlike in case A. The inter-lot difference checking function refers to a function of measuring both a QC specimen of a lot being applied and a QC specimen of a new lot according to a schedule item for one time of automatic QC. In the case of switching between QC specimen lots, measurement is sometimes performed on both a QC specimen of a lot being applied and a QC specimen of a new lot by the same measurement unit for a certain period (for example, one week), and quality control results regarding the two lots are sometimes compared with each other. In other words, configuring is sometimes performed such that there is a certain period during which a usage period of the lot being applied and a usage period of the new lot overlap with each other. This configuring is performed to confirm that there is no significant deviation between the lot being applied and the new lot. The inter-lot difference checking function is a function of automatically performing automatic QC with the two lots.

In case F, it is assumed that a QC specimen list shown in FIG. 52 is stored in the database 820 of the control part 82*a*. As shown in FIG. 52, as for concentration level 1, a QC specimen container 150 of a lot P001 and QC specimen containers 150 of a lot P002 are preserved in the cooling-and-preserving part 84. As for level 1, P001 is a lot being applied, and P002 is a new lot. As for level 2, a QC specimen container 150 of a lot Q001 and QC specimen containers 150 of a lot Q002 are preserved. Q001 is a lot being applied, and Q002 is a new lot. In this case, one lot being applied and one new lot are combined as for each of the concentration levels.

In case F, for example, the QC specimen containers 150 of the position numbers 1 and 2 are combined as for level 1, and the QC specimen containers 150 of the position numbers 4 and 5 are combined as for level 2. That is, a QC specimen rack 160 storing thereon the QC specimen containers 150 of the position numbers 1, 2, 4, and 5 is transported to the measurement units XN1 to XN4, and the four QC specimens are measured in each of the measurement units.

FIG. 53 shows an example of a screen 3000 for comparing quality control results regarding previous lots and quality control results regarding new lots with each other. The screen 3000 is displayed on, for example, the display part 32 (see FIG. 3) of the control unit 30. In the screen 3000, QC charts 3001 each for checking a day-to-day variation in the measurement value of a QC specimen are displayed as quality control results. As shown in FIG. 53, if a QC file regarding each of the previous lots and a QC file regarding a corresponding one of the new lots are read and a super-position operation is performed, a QC chart 3002 of the previous lot and a QC chart 3003 of the new lot can be displayed in a superposed manner. A user checks the two QC charts through comparison therebetween, thereby being able to ascertain the inter-lot difference between the quality control results. If the inter-lot difference checking function in the present embodiment is used, complicated switching between lots can be smoothly performed.

Figure 54:
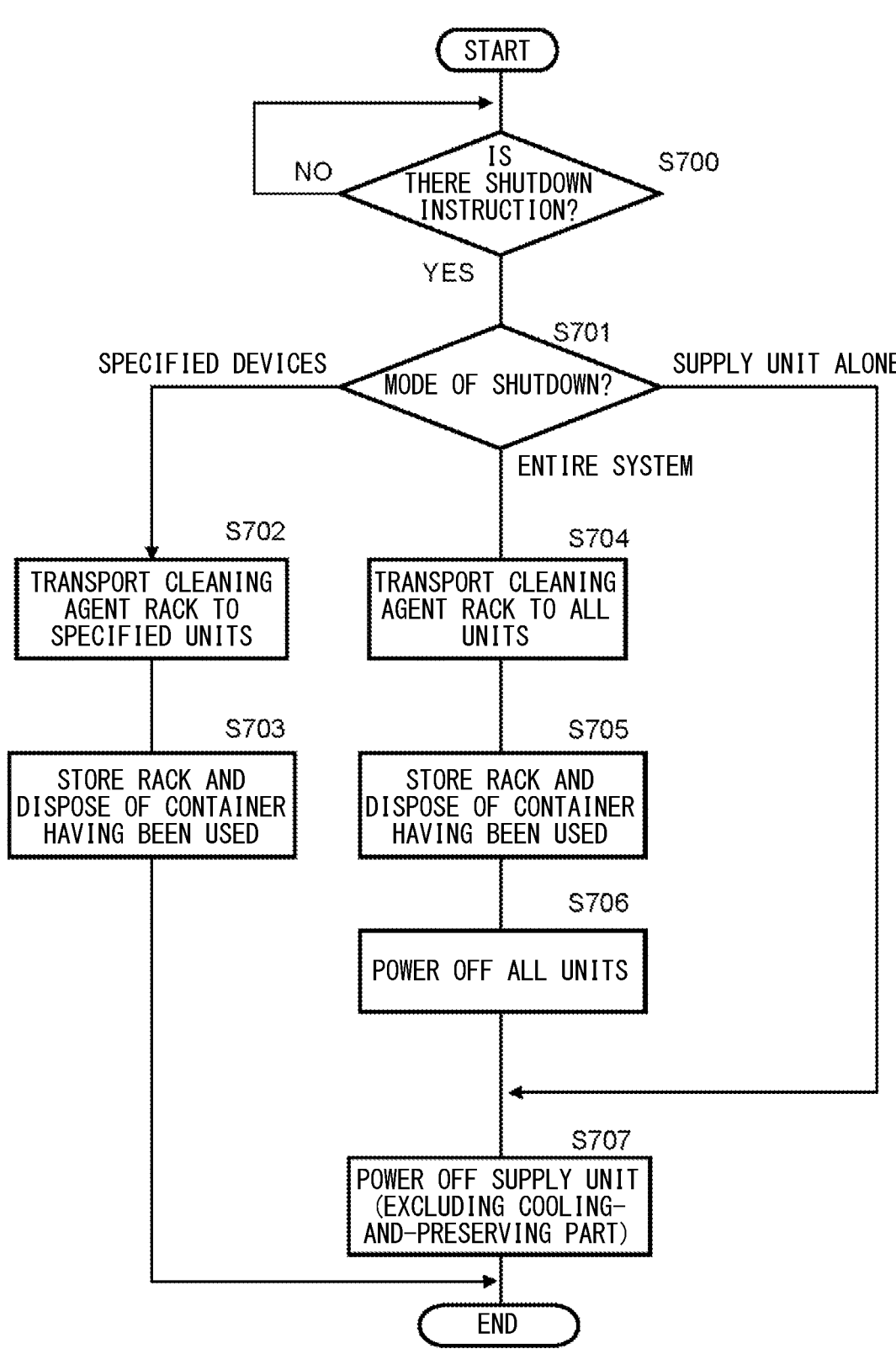
FIG. 54 is a flowchart for explaining a process to be performed by the supply unit when a shutdown instruction is received.

FIG. 54 is a flowchart for explaining a process to be performed by the supply unit 80 when a shutdown instruction is received. The control part 82*a* determines whether or not a shutdown instruction has been received (step S700). As described with reference to FIG. 25, the control part 82*a* of the supply unit 80 can receive a shutdown instruction from a user in response to pressing of the OK button in any of the screens 2100 to 2103. When the OK button is pressed in any of the screens, the control part 82*a* determines that a shutdown instruction has been received (YES in step S700).

The control part 82*a* identifies a shutdown mode selected by the user (step S701). If the shutdown instruction has been given through the device-specifying screen 2101 in FIG. 25, the control part 82*a* determines that the shutdown mode is a device-specifying mode. Then, the control part 82*a* controls each part of the supply unit 80 to set, on a rack, cleaning agent containers 180 the number of which corresponds to the number of the devices specified in the screen 2101, and transport the cleaning agent rack to the specified units (step S702). Control of the supply unit 80 related to cleaning agent setting and transport is as described with reference to FIG. 38. In addition, control of each of the measurement units 10A and 10B having received a cleaning agent container 180 is as described with reference to FIG. 43, and, when cleaning with the cleaning agent is completed, the unit is automatically powered off. Although shutdown of the measurement unit is presented as an example in FIG. 43, the processing unit 40 is also automatically powered off after cleaning in the same manner.

When the cleaning agent rack transported in step S702 has been returned, the control part 82*a* controls each part of the supply unit 80 to store the rack in the rack storing part 88 and dispose of each cleaning agent container 180 having been used (step S703), and ends the process. Consequently, only the devices specified by the user are shut down.

If an instruction to shut down the entire system has been given through the system screen 2102 in FIG. 25, the control part 82*a* determines that the shutdown mode is an entire system mode. Then, the control part 82*a* controls each part of the supply unit 80 to transport a cleaning agent rack to all of the measurement units 10A and 10B and the processing unit 40 (step S704).

In the same manner as in step S703, the control part 82*a* controls each part of the supply unit 80 to store the returned cleaning agent rack in the rack storing part 88 and dispose of each cleaning agent container 180 having been used (step S705). The control part 82*a* transmits commands for powering off to all the units of the specimen analysis system 1 (step S706). Consequently, all the devices that compose the specimen analysis system 1 are shut down.

In step S707, the control part 82*a* powers off the supply unit 80 and ends the process (step S707). However, as described above, even after the supply unit 80 is shut down, the cooling-and-preserving part 84 is kept powered on, and the QC specimens are continuously cooled and preserved.

If an instruction to shut down the supply unit 80 alone has been given through the screen 2103 in FIG. 25, the control part 82*a* skips steps S702 to 706, executes processing in step S707, and ends the process.

As described above, according to the above specimen analysis system 1 and quality control method, quality control substances are cooled and preserved in the system, and quality control measurement is automatically started in, for example, a time period in which specimen measurement is not hindered. Therefore, at the time of performing quality control measurement, a user does not need to set a quality control substance in the system, and thus burden on the user is mitigated, and usability is significantly improved. In addition, the temperature of each of the quality control substances being cooled and preserved is adjusted to the measurement temperature before the quality control substance is supplied to any of the measurement units. Consequently, measurement is performed on the quality control substance at a stable temperature, and thus quality control measurement can be performed with higher reliability.

Figure 55:
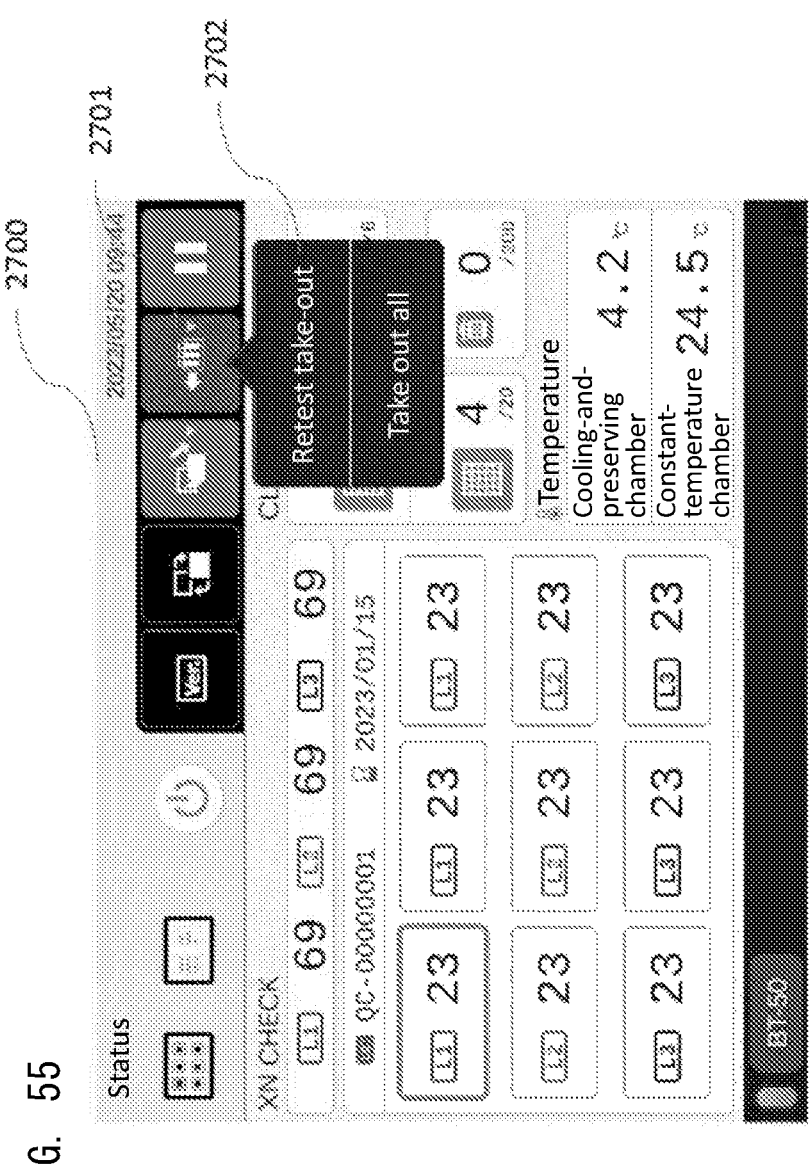
FIG. 55 shows an example of a screen displayed on the monitor of the supply unit.
Figure 56:
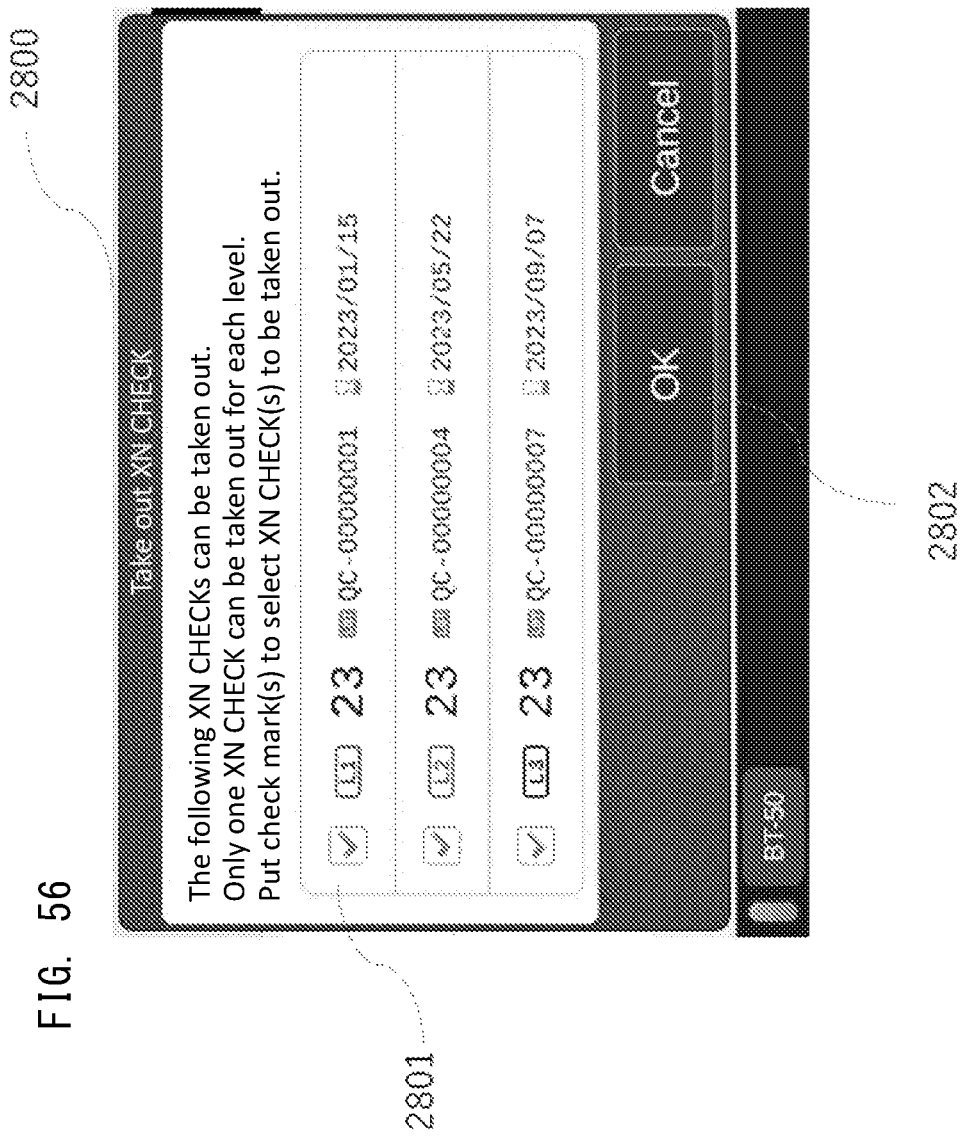
FIG. 56 shows an example of a screen in which information about a QC specimen to be retested is displayed.

Next, an operation performed by a user and an operation of the specimen analysis system 1 in a case where a quality control substance is retested will be described with reference to FIG. 55 to FIG. 57. FIG. 55 shows an example of a screen displayed on the monitor 91 of the supply unit 80. A screen 2700 in FIG. 55 is an example of a screen in a case where a user takes out a quality control substance from the supply unit 80. The screen 2700 is provided with a take-out icon 2701 for taking out a quality control substance. When a user operates the icon 2701, "Retest take-out" and "Take out all" are displayed as choices as in FIG. 55. When the user selects "Retest take-out" as a choice 2702, the screen is transitioned from the screen 2700 to a screen 2800 (FIG. 56). In the screen 2800, information about QC specimens to be retested is displayed. In the example in FIG. 56, as for each of levels L1 to L3, information about one QC specimen is displayed so as to be selectable. For example, as for level 1, information about a QC specimen of a lot number QC-0000001 is displayed. The information includes the remaining test number of the QC specimen. In the example in FIG. 56, the numeral "23" is the remaining test number.

In the screen 2800, the user checks off a checkbox corresponding to each of QC specimens that need to be retested, and presses an OK button 2802. When the OK button 2802 is pressed, a QC specimen container 150 accommodating the selected QC specimen is taken out from the cooling-and-preserving part 84 and becomes able to be taken out from the first loading port 831A. The take-out process is the same as that described with reference to the screen 2200 (see FIG. 21). The user rolls the QC specimen container 150 on, for example, a hand so as to agitate the QC specimen container 150 while warming it. Thus, the user can perform a retest through manual measurement in each of the measurement units 10A and 10B.

The QC specimens displayed as candidates in the screen 2800 are automatically selected by the control part 82a of the supply unit 80. The QC specimen candidates are selected on the basis of, for example, the following degrees of priority:

1) Most recently measured QC specimen
2) Another QC specimen of the same lot as that of the most recently measured QC specimen If there is a QC specimen with a degree of priority of 1, the QC specimen with a degree of priority of 1 is displayed as a candidate in the screen 2800. If there is no QC specimen with a degree of priority of 1, i.e., if the remaining test number of the most recently measured QC specimen is zero or this QC specimen is already disposed of, a QC specimen with a degree of priority of 2 is displayed as a candidate. If none of QC specimens with degrees of priority of 1 and 2 exist, no candidate is displayed in the screen 2800.

With the functions in FIG. 55 and FIG. 56, the user can omit operation of selecting a QC specimen to be retested from up to nine QC specimen containers 150 preserved in the cooling-and-preserving part 84, whereby convenience is increased.

In the example in FIG. 55 and FIG. 56, the function of taking out a QC specimen from the supply unit 80 in order to perform a retest through manual measurement by a user has been presented as an example. However, the QC specimen may be automatically retested (an automatic retest may be performed).

Figure 57:
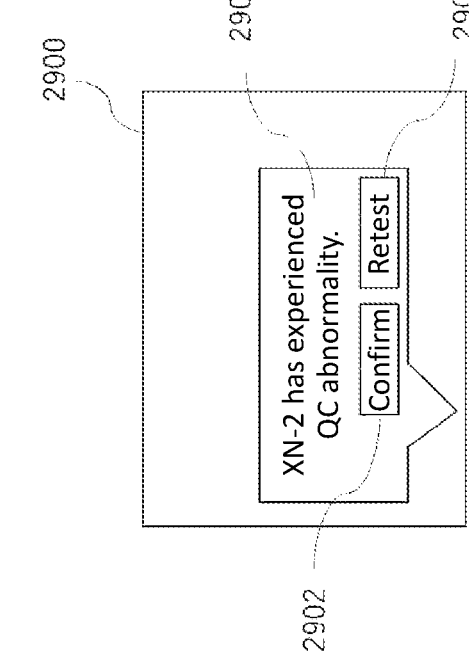
FIG. 57 shows an example of each of a screen displayed when a QC abnormality has occurred and a screen for receiving selection of a retest mode for the QC specimen.

FIG. 57 shows examples of screens in a case where an automatic retest is performed. A screen 2900 is displayed on, for example, the display part of the control unit 30. The screen 2900 is displayed when, for example, a QC abnormality has occurred as a result of measurement of a QC specimen in either of the measurement units 10A and 10B. The screen 2900 includes an error message 2901, a confirmation button 2902, and a retest button 2903. If a user presses the confirmation button 2902 after reading the error message, a measurement result of the measurement in which the QC abnormality has occurred is displayed on the screen. If the user presses the retest button 2903, the screen is transitioned from the screen 2900 to a screen 3000. The screen 3000 is a screen for receiving selection of a retest mode for the QC specimen. The screen 3000 includes an auto button 3001 and a manual button 3002. The auto button 3001 is a button for giving an instruction to automatically retest the QC specimen that is the cause of the QC abnormality. The manual button 3002 is a button for giving an instruction to take out the QC specimen that is the cause of the QC abnormality, in order to manually retest the QC specimen. If the auto button 3001 is pressed, the control part 31 of the control unit 30 transmits a signal for giving an instruction to execute QC to the control part 82a of the supply unit 80. The supply unit 80 takes out, from the cooling-and-preserving part 84, the QC specimen measured in the measurement unit (in the example in FIG. 57, XN-2) having experienced the QC abnormality, heats the QC specimen, sets the QC specimen on a rack, and transports the rack toward the measurement unit having experienced the QC abnormality. The operation in the case of operating the manual button 3002 is the same as that described with reference to FIG. 56.

In this manner, when a QC abnormality occurs, the button for giving an instruction for an automatic retest is displayed together with an error message, whereby a user does not need to identify a QC specimen container that is the cause of the QC abnormality. In addition, labor for a retest of the QC specimen in the measurement unit having experienced the QC abnormality can also be reduced, whereby convenience is increased.

The quality control method and the specimen analysis system according to the present disclosure can be changed in terms of design as appropriate so as to be implemented in embodiments and modifications other than those described above unless the object of the present disclosure is impaired.

Figure 58:
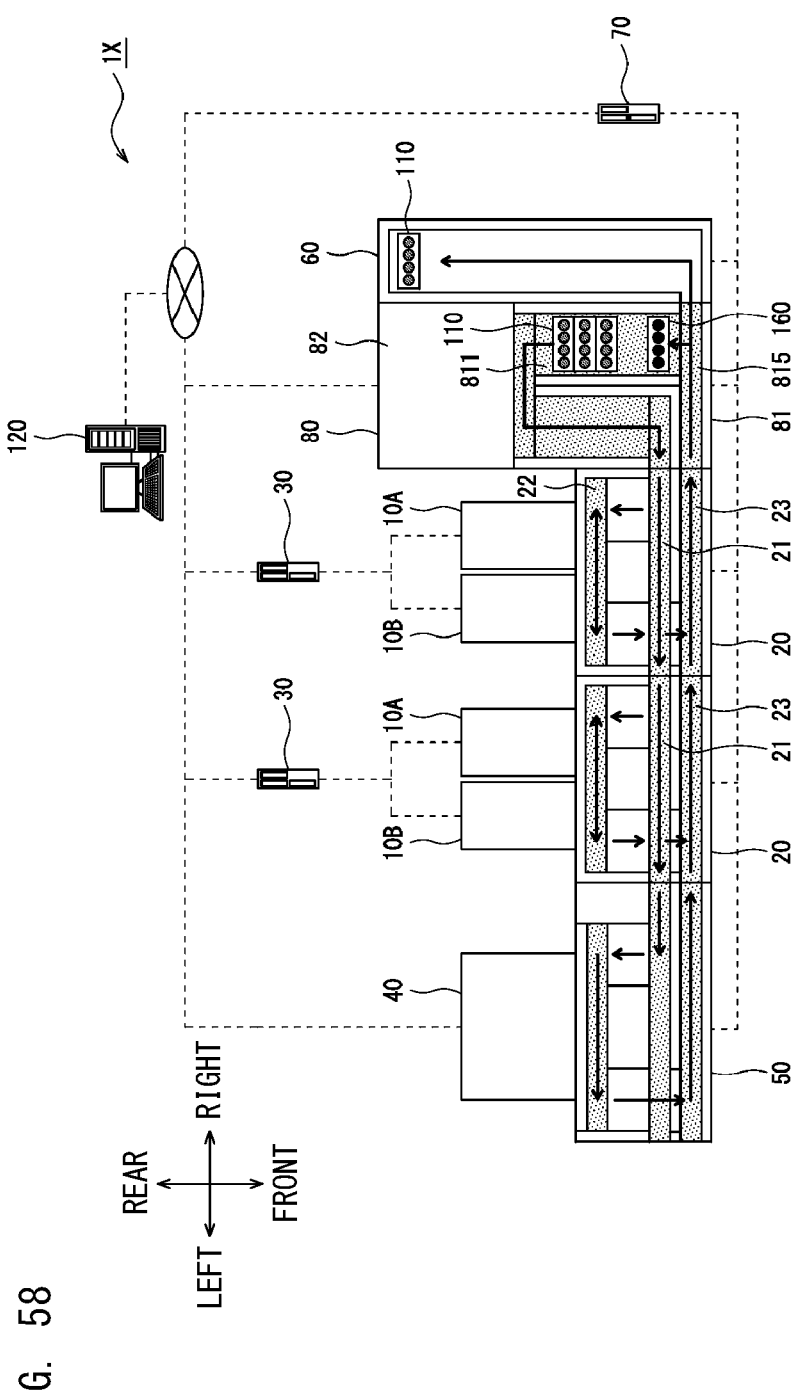
FIG. 58 schematically shows a configuration of a first modification of the specimen analysis system.

FIG. 58 and FIG. 59 schematically show configurations of specimen analysis systems 1X and 1Y according to first and second modifications. As shown in FIG. 58, the specimen analysis system 1X differs from the specimen analysis system 1 in that the collection unit 60 is provided to be adjacent to the right side, of the supply unit 80, which is the opposite side to the analyzer AN1. In the case of the specimen analysis system 1X, the rack transport path of the collection unit 60 is connected to the fifth transport path 815 of the conveyor part 81. In the specimen analysis system 1, the third transport path 23 of the transport unit 20 and the fifth transport path 815 are transport paths for collecting QC specimen racks 160 and cleaning agent racks. Meanwhile, in the specimen analysis system 1X, the third transport path 23 and the fifth transport path 815 are used also for collecting specimen racks 110.

As shown in FIG. 59, the specimen analysis system 1Y differs from the specimen analysis systems 1 and 1X in that an additional second supply unit 140 is provided to be adjacent to the right side of the supply unit 80. The second supply unit 140 is a unit in which a specimen rack 110 or the like is set by a user. The second supply unit 140 does not have, for example, a function of cooling and preserving QC specimen containers 150. In the example shown in FIG. 59, the second supply unit 140 is interposed between the supply unit 80 and the collection unit 60. A rack transport path of the second supply unit 140 is connected to the sixth transport path 819 of the conveyor part 81. In this case, the sixth transport path 819 functions as a transport path through which a specimen rack 110 or the like is carried in from the second supply unit 140.

Figure 60:
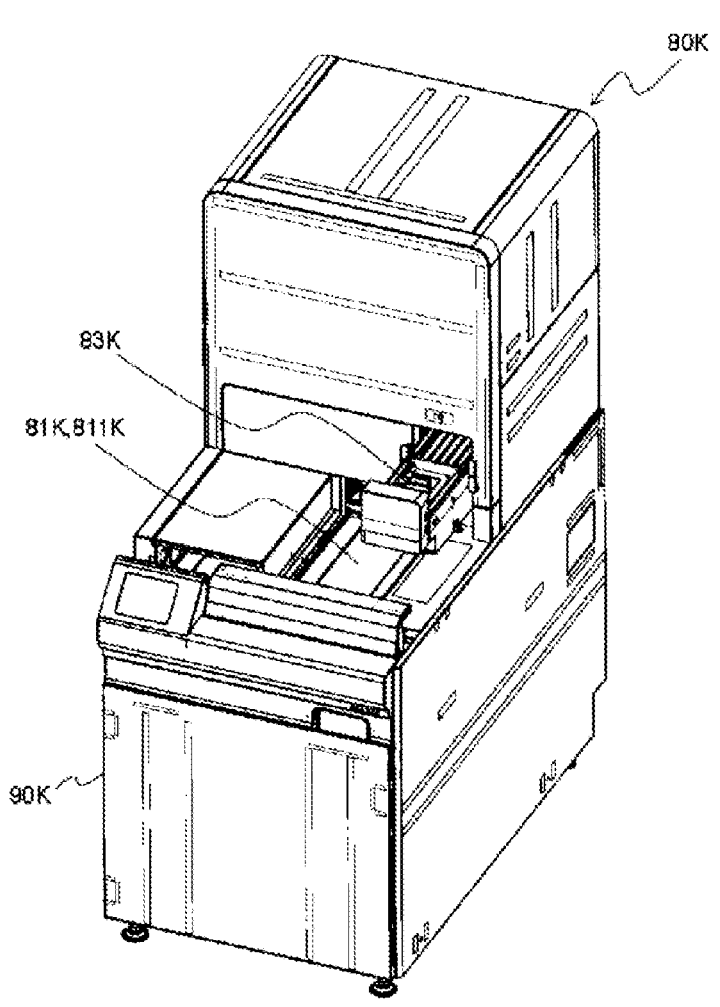
FIG. 60 is a perspective view showing the appearance of a first modification of the supply unit.
Figure 61:
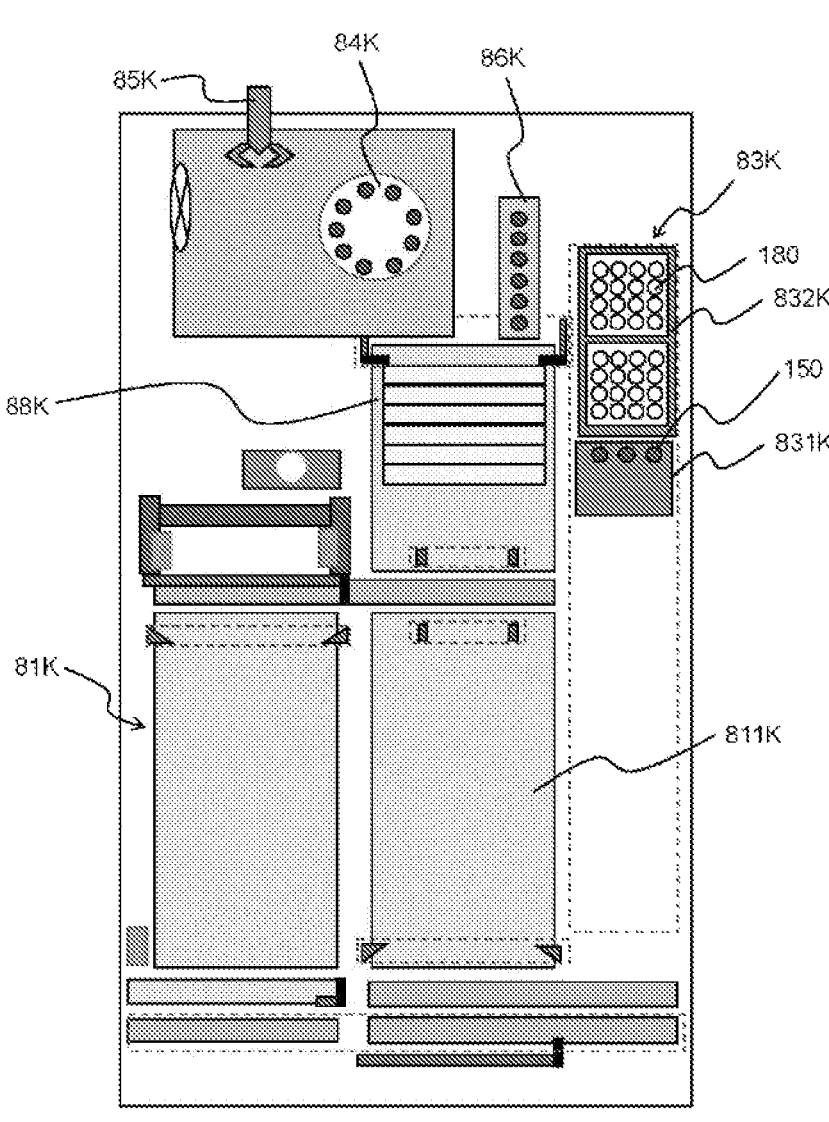
FIG. 61 schematically shows a configuration of the first modification of the supply unit.

FIG. 60 and FIG. 61 show the supply unit 80K according to the first modification. The supply unit 80K includes a conveyor part 81K including a first transport path 811K on which a rack is set by a user. The configuration of the conveyor part 81K is the same as that in the supply unit 80. The supply unit 80K further includes a cooling-and-preserving part 84K, a transfer part 85K, a heating part 86K, a rack storing part 88K, and a wagon 90K. Although the coolingand-preserving part 84K of a carousel type is shown in FIG. 61, these constituents may be the same as those in the supply unit 80. In addition, constituents (not shown) such as an information reading part 86 may also be the same as those in the supply unit 80.

In the supply unit 80K, the structure of a loading part 83K in which QC specimen containers 150 and cleaning agent containers 180 are set differs from the structure of the loading part 83 of the supply unit 80. The loading part 83K is disposed to be adjacent to the first transport path 811K and has a drawer-type structure so as to be slidable in the front-rear direction of the supply unit 80K. The loading part 83K has a first storing portion 831K in which a plurality of QC specimen containers 150 are set; and a second storing portion 832K in which a plurality of cleaning agent containers 180 are set. In the first storing portion 831K, for example, three QC specimen containers 150 can be set.

The loading part 83K is configured to be manually drawable frontward at the time of setting QC specimen containers 150 and cleaning agent containers 180 in the supply unit 80K. Alternatively, the loading part 83K may be of an electrically-driven type. When the loading part 83K is drawn frontward of the device, QC specimen containers 150 are set in the first storing portion 831K, and the loading part 83K is pushed to a predetermined position on the rear side of the device, the transfer part 85K transfers the QC specimen containers 150 from the first storing portion 831K to the cooling-and-preserving part 84K in the same manner as in the supply unit 80. Cleaning agent containers 180 are stored in the second storing portion 832K. The supply unit 80K is provided with, for example, a sensor for detecting the number of the cleaning agent containers 180, and the number of the cleaning agent containers 180 is displayed in the cleaning agent container stock window 2006 shown in FIG. 24.

Figure 62:
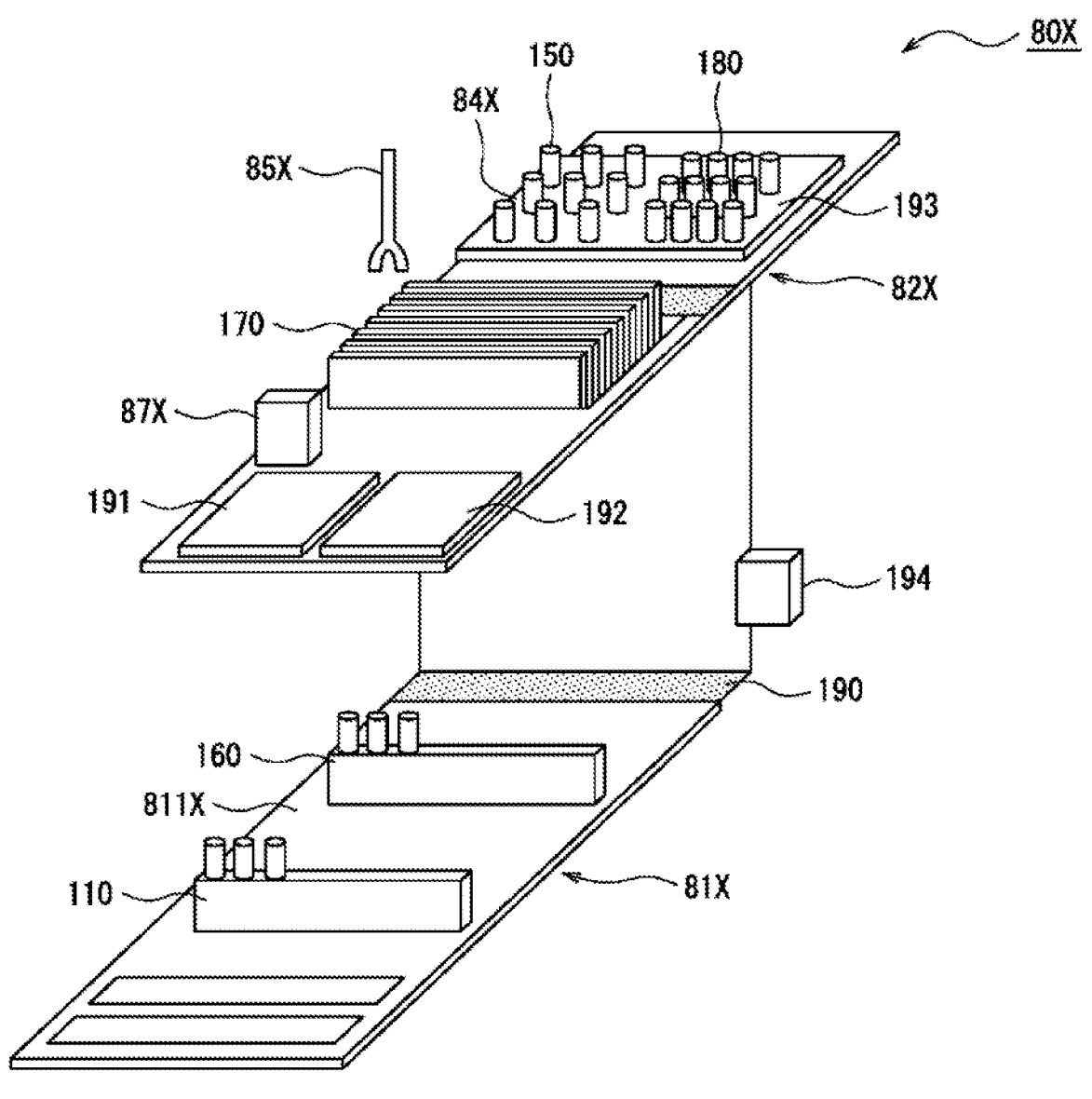
FIG. 62 schematically shows a configuration of a second modification of the supply unit.

FIG. 62 schematically shows a supply unit 80X according to a second modification. As shown in FIG. 62, the supply unit 80X includes: a first floor part 81X provided with a transport path 811X through which specimen racks 110 and QC specimen racks 160 are each transported to any of the measurement units; and a second floor part 82X provided with a cooling-and-preserving part 84X, a cleaning agent container preserving part 193, and the like. In addition, the supply unit 80X includes: a liftable movement part 190 for transporting each rack between the first floor part 81X and the second floor part 82X; and an information reading part 194 for reading a rack ID and a specimen ID of a specimen container 100 or the like from the rack being moved through the movement part 190.

Similar to the case of the supply unit 80, the second floor part 82X is provided with a transfer part 85X for gripping and transferring a QC specimen container 150 and an information reading part 87X for reading a QC specimen ID of the QC specimen container 150, and a plurality of empty racks 170 for storing thereon QC specimen containers 150 and cleaning agent containers 180 and transporting these containers are stored on the second floor part 82X. In addition, the second floor part 82X is provided with a first loading-and-collecting part 191 which functions as both a loading port and a collecting port for QC specimen containers 150; and a second loading-and-collecting part 192 which functions as both a loading port and a collecting port for cleaning agent containers 180.

As described above, after the temperature of each QC specimen container 150 is adjusted to the measurement temperature in the supply unit, the QC specimen container 150 is stored on a rack, and the rack is transported to any of the measurement units. However, it is preferable that, if only some of the plurality of measurement units are being operated, the QC specimen rack 160 is transported to only the measurement units being operated and are not transported to the measurement units not being operated.

A control part of the supply unit may execute a process of measuring a time T1 during which a QC specimen container 150 taken out from the cooling-and-preserving part 84 is left in the room temperature environment; and, if the time T1 exceeds a predetermined time T2, returning the QC specimen container 150 to the cooling-and-preserving part 84. In this case, if the time T1 exceeds the time T2, the QC specimen container 150 is returned to the cooling-and-preserving part 84 without performing any retest regardless of a measurement result of the QC specimen, i.e., even if the measurement result is abnormal in a case where retesting has been set as a QC condition. By this process, the QC specimen can be prevented from being left in the room temperature environment for a long time, and the state of the QC specimen can be kept satisfactory. Alternatively, if the time T1 exceeds the predetermined time T2, the container may be treated as a container to be disposed of.

In addition, the control part of the supply unit may, in a collection process for each of QC specimen containers 150, determine whether or not the QC specimen container 150 satisfies a predetermined continuous usage condition, and, if the QC specimen container 150 does not satisfy the continuous usage condition, cause disposal of the QC specimen container 150 (for example, step S602 in FIG. 45). Alternatively, the QC specimen container 150 that does not satisfy the continuous usage condition may be returned to the cooling-and-preserving part 84 and may be regarded as being unusable, to be continuously cooled and preserved. Since QC specimens are expensive, it is also considered that automatic disposal of QC specimen containers 150 is not preferable. However, the present configuration can satisfy the need to make such automatic disposal unnecessary.

The above predetermined continuous usage condition refers to a condition for determining whether or not the QC specimen container 150 can be used in the next and subsequent times of quality control measurement. Examples of the continuous usage condition include the expiration date as well as the remaining amount of the QC specimen. For example, if the next time of quality control measurement is to be performed on the next day, the QC specimen container 150 with an expiration date which is the present day may be determined not to satisfy the continuous usage condition and may be disposed of.

The heating part for heating a QC specimen so as to adjust the temperature thereof to the measurement temperature may be provided with, in addition to the heater and the fans, a device for assistance in heating, e.g., an agitator, a vibration generator, or a rotation device such as a carousel.

In the above embodiment, heating of a QC specimen is performed through heating of the corresponding QC specimen container 150 by heating means of the heating part 86. However, the heating may be performed through exposure of the QC specimen container 150 to an atmosphere at room temperature. In addition, in the above embodiment, the cooling-and-preserving part 84 and the heating part 86 are formed as separate devices and are provided at separate locations. However, for example, the cooling-and-preserving part can be used also as the heating part. In general, a Peltier element built in a cooling-and-preserving part has not only a cooling function but also a heating function. Thus, at the moment when the above predetermined condition is satisfied, the mode of the Peltier element can be switched from a cooling mode to a heating mode to heat the QC specimen.

In the above embodiment, a blood cell counter has been presented as an example of each measurement unit. However, the measurement unit is not limited thereto and may be intended for blood coagulation tests, immunological tests, biochemical tests, or the like. In addition, the specimen to be supplied to the measurement unit is not limited to whole blood and may be plasma, serum, urine, lymph, celomic fluid, or the like.

What is claimed is:

1. A blood analysis system comprising:

a plurality of blood cell analyzers configured to perform the blood sample measurement on a blood sample;

a supply device including a storage configured to store a quality control sample in a controlled temperature environment, wherein the quality control sample contains a known red blood cell concentration, a known leukocyte concentration and a known platelet concentration, and wherein the supply device is configured to supply the blood sample to the plurality of blood cell analyzers and to retrieve the quality control sample from the storage;

a transporter configured to transport the blood sample and the quality control sample between the supply device and the plurality of blood cell analyzers; and a controller configured to control the transporter, wherein the controller is programmed to perform a quality control operation according to a schedule by:

(i) controlling the supply device to retrieve the quality control sample from the storage;

(ii) controlling the transporter to transport the retrieved quality control sample from the supply device to the plurality of blood cell analyzers; and (iii) controlling the transporter and the supply device to return the quality control sample to the storage after the quality control sample is transported to the plurality of blood cell analyzers, wherein the controller is further programmed to receive information regarding a deficiency occurring during the quality control operation and to execute, in response to the deficiency, a recovery operation of returning the quality control sample to the storage, thereby preventing the quality control sample from being left outside the storage without being returned due to the deficiency, wherein the deficiency is at least one of:

(a) an insufficiency of a reagent to be used in at least one of the plurality of blood cell analyzers;

(b) an error in reading of identification information provided on the quality control sample;

(c) a measurement value abnormality of the quality control sample;

(d) an error in a pressure of a pump for suctioning samples or reagents of at least one of the plurality of blood cell analyzers;

(e) an error in a temperature of a reaction chamber of at least one of the plurality of blood cell analyzers; and (f) an error in an operation of a mechanism in at least one of the plurality of blood cell analyzers.

2. The blood analysis system according to claim 1, wherein the controller is programmed to cancel the quality control measurement by the at least one of the plurality of blood cell analyzers in response to the deficiency occurring in the at least one of the plurality of blood cell analyzers.

3. The blood analysis system according to claim 1, wherein the controller is programmed to, in response to a deficiency occurring in a blood cell analyzer of the plurality of blood cell analyzers, control the transporter to transport the quality control sample to another blood cell analyzer of the blood cell analyzers scheduled to perform the quality control measurement, before returning the quality control sample to the storage.

4. The blood analysis system according to claim 1, wherein the controller is programmed to, in response to a deficiency occurring in a blood cell analyzer of the plurality of blood cell analyzers:

determine whether the quality control measurement has been performed by the plurality of blood cell analyzers according to the schedule;

control the transporter to transport the quality control sample to another blood cell analyzer of the blood cell analyzers scheduled to perform the quality control measurement, before returning the quality control sample to the storage, upon determining that the quality control measurement by the another blood cell analyzer of the blood cell analyzers has not been performed; and control the transporter and the supply device to return the quality control sample to the storage upon determining that the quality control measurement has been performed for the plurality of blood cell analyzers.

5. The blood analysis system according to claim 1, further comprising a monitor configured to display the deficiency.

6. The blood analysis system according to claim 1, wherein the controller is further programmed to control the at least one of the plurality of blood cell analyzers to automatically turn on based on the schedule.

7. The blood analysis system according to claim 1, further comprising a memory configured to store the schedule.

8. The blood analysis system according to claim 1, wherein the supply device further comprises a temperature adjustment section configured to heat the quality control sample by holding the retrieved quality control sample for a predetermined time.

9. The blood analysis system according to claim 8, wherein the controller is programmed to:

control the supply device to retrieve the quality control sample from the storage based on the schedule;

control the supply device to transfer the quality control sample to the temperature adjustment section;

control the supply device to retrieve the quality control sample from the temperature adjustment section after the predetermined time; and control the supply device to transfer the quality control sample to a rack.

10. The blood analysis system according to according to claim 8, wherein the storage is configured to hold a container, the container containing the quality control sample and having a cap, in a first upright position with the cap of the container disposed above the container; and wherein the temperature adjustment section is configured to hold the container in a second upright position with the cap of the container disposed above the container.

11. The blood analysis system according to claim 8, wherein the temperature adjustment section comprises a heating part body defining an upward-facing hole formed to a depth such that an upper portion of a container containing the quality control sample protrudes from the upward-facing hole when the container is positioned in the temperature adjustment section.

12. The blood analysis system according to claim 1, wherein the storage is configured to cool and preserve the quality control sample at a temperature between 2° C. and 8° C.

13. The blood analysis system according to claim 1, wherein the supply device further comprises a transferring unit configured to grip and retrieve the quality control sample from the storage.

14. The blood analysis system according to claim 13, wherein the storage comprises a cooling chamber and a cover enclosing the cooling chamber, wherein the cooling chamber is configured to hold the quality control sample, and wherein the cover is configured to open and close to provide access to the quality control sample.

15. The blood analysis system according to claim 14, wherein the cover is configured to open from a closed state, the transferring unit is configured to retrieve the quality control sample from the cooling chamber, and the cover is controlled to close after the quality control sample is retrieved from the cooling chamber.

16. The blood analysis system according to claim 15, wherein the cover constitutes an upper portion of the cooling chamber, wherein the cover in an opened state is configured to provide access to the quality control sample held in the cooling chamber, and wherein the transferring unit is positioned above the cooling chamber.

17. The blood analysis system according to claim 1, wherein the cooling chamber comprises a housing portion defining an upward-facing hole configured to hold a container containing the quality control sample in an upright position.

18. The blood analysis system according to claim 1, wherein the plurality of blood cell analyzers is configured to measure at least one of WBC (white blood cell count), RBC (red blood cell count), HGB (hemoglobin content), HCT (hematocrit value), MCV (mean corpuscular volume), MCH (mean corpuscular hemoglobin), MCHC (mean corpuscular hemoglobin concentration), PLT (platelet count), NEUT #(neutrophil count), LYMPH #(lymphocyte count), MONO #(monocyte count), EO #(eosinophil count), and BASO #(basophil count).

19. The blood analysis system according to claim 1, wherein the controller is further programmed to control the transporter to transport a rack holding a blood sample to at least one of the plurality of blood cell analyzers for blood sample measurement.

* * * * *